US006091407A

United States Patent [19]

Boetje et al.

[11] Patent Number: 6,091,407

[45] Date of Patent: Jul. 18, 2000

[54] METHOD AND APPARATUS FOR MANIFESTING REPRESENTATIONS OF SCHEDULED ELEMENTS IN A BROADCAST ENVIRONMENT

[75] Inventors: Gerard J. Boetje, San Ramon; David C. Collier, Gilroy, both of Calif.

[73] Assignees: Sony Corporation, Tokyo, Japan; Sony Electronics, Inc., Park Ridge, N.J.

[21] Appl. No.: 08/727,754

[22] Filed: Oct. 7, 1996

[51] Int. Cl.[7] .................... H04N 7/00

[52] U.S. Cl. .................... 345/327; 345/328; 348/722

[58] Field of Search .................... 345/327, 328; 707/1, 3–5, 100–104; 705/500; 348/906, 460, 552, 722; 455/4.2, 6.3, 3.1

[56] References Cited

U.S. PATENT DOCUMENTS

| | | | |
|---|---|---|---|
| 5,115,310 | 5/1992 | Takano et al. . | |
| 5,450,134 | 9/1995 | Legate | 348/467 |
| 5,760,767 | 6/1998 | Shore et al. | 348/328 |

OTHER PUBLICATIONS

Allen et al., "Reasoning About Plans", Chapter 1, 1991.

Vilain et al., "Constraint Propagation Algoriths for Temporal Reasoning", Processings aaaa1–86, 1986.

Mackworth, "Consistency in Networks on Relations", Artificial Intelligence, pp. 99–117, 1977.

Bessiere, "A SImple Way to Improve Path Consistency Processing in Interval Algebra Networks", Proceedings of the Thirteenth Nation Conference on Artificial Intelligence, pp. 375–380.

van Beek, "Reasoning About Qualitative Temporal Information", Artificial Intelligence vol. 53, pp. 297–326, 1992.

Ladkin et al. "On Binary Constraint Problems", Journal of the Association for Computing Machinery, pp. 435–469, 1994.

Nebel et al. "Reasoning About Temporal Relations: A Maximal Tractable Subclass of Allen's Interval Algebra", Journal of the Association for Computing Machinery, pp. 42–66, 1995.

Allen, "Maintaing Knowledge about Temporal Intervals", Communications of the ACM, vol. 26, No. 11, 1983.

*Primary Examiner*—Nathan Flynn

*Attorney, Agent, or Firm*—Blakely, Sokoloff, Taylor & Zafman LLP

[57] ABSTRACT

The method and apparatus of the present invention enables scheduled broadcast elements to be represented by a material indicative of the signal and media indicative of where the signal is coming from. For each element, at least one corresponding material that represents the broadcast element and at least one corresponding media that represents the material are specified. Thus, for a particular broadcast element, the media that manifests the broadcast element based upon the material and media specified is easily determined.

2 Claims, 62 Drawing Sheets

| INTERAL RELATIONSHIP | SYMBOL | PICTORIAL EXAMPLE | ENDPOINT RELATIONS |
|---|---|---|---|
| X PRECEDES Y | $<$ | xxx | $X^- < Y^-, X^- < Y^+$ |
| Y FOLLOWS X | $>$ | yyy | $X^+ < Y^-, X^+ < Y^+$ |
| X MEETS Y | m | xxxxx | $X^- < Y^-, X^- < Y^+$ |
| X MET-BY X | mi | yyyyyy | $X^+ = Y^-, X^+ < Y^+$ |
| X OVERLAPS Y | o | xxxxx | $X^- < Y^-, X^- < Y^+$ |
| Y OVERLAPPED-BY X | oi | yyyyy | $X^+ > Y^-, X^+ < Y^+$ |
| X DURING Y | d | xxxx | $X^- > Y^-, X^- < Y^+$ |
| Y INCLUDES X | di | yyyyyyy | $X^+ > Y^-, X^+ < Y^+$ |
| X STARTS Y | s | xxx | $X^- = Y^-, X^- < Y^+$ |
| Y STARTED-BY X | si | yyyyyyy | $X^+ < Y^-, X^+ < Y^+$ |
| X FINISHES Y | f | xxx | $X^- > Y^-, X^- < Y^+$ |
| Y FINISHED-BY X | fi | yyyyyy | $X^+ > Y^-, X^+ = Y^+$ |
| X EQUALS Y | ≡ | xxxx | $X^- = Y^-, X^- < Y^+$ |
| | | yyyy | $X^+ > Y^-, X^+ = Y^+$ |

FIG. 3

1. False
2. Equals
3. Precedes
4. Follows
5. During
6. Equals, During
7. Includes
8. Equals, Includes
9. Overlaps
10. Equals, Overlaps
11. Precedes, Overlaps
12. Equals, Precedes, Overlaps
13. During, Overlaps
14. Equals, During, Overlaps
15. Precedes, During, Overlaps
16. Equals, Precedes, During, Overlaps
17. Includes, Overlaps
18. Equals, Includes, Overlaps
19. Precedes, Includes, Overlaps
20. Equals, Precedes, Includes, Overlaps
21. Overlapped-By
22. Equals, Overlapped-By
23. Follows, Overlapped-By
24. Equals, Follows, Overlapped-By
25. During, Overlapped-By
26. Equals, During, Overlapped-By
27. Follows, During, Overlapped-By
28. Equals, Follows, During, Overlapped-By
29. Includes, Overlapped-By
30. Equals, Includes, Overlapped-By
31. Follows, Includes, Overlapped-By
32. Equals, Follows, Includes, Overlapped-By
33. During, Includes, Overlaps, Overlapped-By
34. Equals, During, Includes, Overlaps, Overlapped-By

FIG. 4a

35. Precedes, During, Includes, Overlaps, Overlapped-By
36. Equals, Precedes, During, Includes, overlaps, Overlapped-By
37. Follows, During, Includes, Overlaps, Overlapped-By
38. Equals, Follows, During, Includes, Overlaps, Overlapped-By
39. Precedes, Follows, During, Includes, overlaps, Overlapped-By
40. Equals, Precedes, Follows, During, Includes, Overlaps, Overlapped-By
41. Meets
42. Precedes, Meets
43. Overlaps, Meets
44. Equals, Overlaps, Meets
45. Precedes, overlaps, Meets
46. Equals, Precedes, overlaps, Meets
47. During, overlaps, Meets
48. Equals, During, Overlaps, Meets
49. Precedes, During, Overlaps, Meets
50. Equals, Precedes, During, Overlaps, Meets
51. Includes, Overlaps, Meets
52. Equals, Includes, Overlaps, Meets
53. Precedes, Includes, overlaps, Meets
54. Equals, Precedes, Includes, Overlaps, Meets
55. During, Includes, overlaps, overlapped-By, Meets
56. Equals, During, Includes, Overlaps, Overlapped-By, Meets
57. Precedes, During, Includes, overlaps, Overlapped-By, Meets
58. Equals, Precedes, During, Includes, Overlaps, overlapped-By, Meets
59. Follows, During, Includes, overlaps, Overlapped-By, Meets
60. Equals, Follows, During, Includes, Overlaps, Overlapped-By, Meets
61. Precedes, Follows, During, Includes, Overlaps, overlapped-By, Meets
62. Equals, Precedes, Follows, During, Includes, overlaps, Overlapped-By, Meets
63. Met-By
64. Follows, Met-By
65. Overlapped-By, Met-By
66. Equals, Overlapped-By, Met-By
67. Follows, Overlapped-By, Met-By
68. Equals, Follows, Overlapped-By, Met-By

FIG. 4b

69. During, Overlapped-By, Met-By
70. Equals, During, Overlapped-By, Met-By
71. Follows, During, Overlapped-By, Met-By
72. Equals, Follows, During, Overlapped-By, Met-By
73. Includes, Overlapped-By, Met-By
74. Equals, Includes, Overlapped-By, Met-By
75. Follows, Includes, Overlapped-By, Met-By
76. Equals, Follows, Includes, overlapped-By, Met-By
77. During, Includes, Overlaps, Overlapped-By, Met-By
78. Equals, During, Includes, overlaps, overlapped-By, Met-By
79. Precedes, During, Includes, Overlaps, Overlapped-By, Met-By
80. Equals, Precedes, During, Includes, Overlaps, Overlapped-By, met-By
81. Follows, During, Includes, Overlaps, Overlapped-By, Met-By
82. Equals, Follows, During, Includes, Overlaps, Overlapped-By, met-By
83. Precedes, Follows, During, Includes, Overlaps, Overlapped-By, Met-By
84. Equals, Precedes, Follows, During, Includes, overlaps, Overlapped-By, Met-By
85. During, Includes, Overlaps, overlapped-By, Meets, Met-By
86. Equals, During, Includes, Overlaps, Overlapped-By, Meets, Met-By
87. Precedes, During, Includes, Overlaps, Overlapped-By, Meets, Met-By
88. Equals, Precedes, During, Includes, Overlaps, Overlapped-By, Meets, Met-By
89. Follows, During, Includes, Overlaps, Overlapped-By, Meets, Met-By
90. Equals, Follows, During, Includes, Overlaps, Overlapped-By, Meets, Met-By
91. Precedes, Follows, During, Includes, Overlaps, Overlapped-By, Meets, Met-By
92. Equals, Precedes, Follows, During, Includes, Overlaps, Overlapped-By, Meets, Met-By
93. Starts
94. Equals, Starts
95. During, Starts
96. Equals, During, Starts
97. Overlaps, Starts
98. Equals, Overlaps, Starts
99. Precedes, Overlaps, Starts
100. Equals, Precedes, Overlaps, Starts
101. During, Overlaps, Starts
102. Equals, During, Overlaps, Starts

FIG. 4c

103. Precedes, During, Overlaps, Starts
104. Equals, Precedes, During, Overlaps, Starts
105. Includes, Overlaps, Starts
106. Equals, Includes, Overlaps, Starts
107. Precedes, Includes, Overlaps, Starts
108. Equals, Precedes, Includes, Overlaps, Starts
109. During, Overlapped-By, Starts
110. Equals, During, Overlapped-By, Starts
111. Follows, During, Overlapped-By, Starts
112. Equals, Follows, During, Overlapped-By, Starts
113. During, Includes, Overlaps, Overlapped-By, Starts
114. Equals, During, Includes, Overlaps, Overlapped-By, Starts
115. Precedes, During, Includes, overlaps, Overlapped-By, Starts
116. Equals, Precedes, During, Includes, Overlaps, Overlapped-By, Starts
117. Follows, During, Includes, Overlaps, Overlapped-By, Starts
118. Equals, Follows, During, Includes, Overlaps, overlapped-By, Starts
119. Precedes, Follows, During, Includes, Overlaps, Overlapped-By, Starts
120. Equals, Precedes, Follows, During, Includes, Overlaps, Overlapped-By, Starts
121. Overlaps, Meets, Starts
122. Equals, Overlaps, Meets, Starts
123. Precedes, Overlaps, Meets, Starts
124. Equals, Precedes, Overlaps, Meets, Starts
125. During, Overlaps, Meets, Starts
126. Equals, During, Overlaps, Meets, Starts
127. Precedes, During, Overlaps, Meets, Starts
128. Equals, Precedes, During, Overlaps, Meets, Starts
129. Includes, Overlaps, Meets, Starts
130. Equals, Includes, Overlaps, Meets, Starts
131. Precedes, Includes, Overlaps, Meets, Starts
132. Equals, Precedes, Includes, Overlaps, Meets, Starts
133. During, Includes, Overlaps, Overlapped-By, Meets, Starts
134. Equals, During, Includes, Overlaps, Overlapped-By, Meets, Starts
135. Precedes, During, Includes, Overlaps, Overlapped-By, Meets, Starts
136. Equals, Precedes, During, Includes, Overlaps, Overlapped-By, Meets, Starts

FIG. 4d

137. Follows, During, Includes, Overlaps, Overlapped-By, Meets, Starts
138. Equals, Follows, During, Includes, Overlaps, Overlapped-By, Meets, Starts
139. Precedes, Follows, During, Includes, Overlaps, Overlapped-By, Meets, Starts
140. Equals, Precedes, Follows, During, Includes, Overlaps, Overlapped-By, Meets, Starts
141. During, Overlapped-By, Met-By, Starts
142. Equals, During, Overlapped-By, Met-By, Starts
143. Follows, During, Overlapped-By, Met-By, Starts
144. Equals, Follows, During, Overlapped-By, Met-By, Starts
145. During, Includes, Overlaps, Overlapped-By, Met-By, Starts
146. Equals, During, Includes, Overlaps, Overlapped-By, Met-By, Starts
147. Precedes, During, Includes, Overlaps, Overlapped-By, Met-By, Starts
148. Equals, Precedes, During, Includes, Overlaps, Overlapped-By, Met-By, Starts
149. Follows, During, Includes, Overlaps, Overlapped-By, Met-By, Starts
150. Equals, Follows, During, Includes, Overlaps, Overlapped-By, Met-By, Starts
151. Precedes, Follows, During, Includes, Overlaps, Overlapped-By, Met-By, Starts
152. Equals, Precedes, Follows, During, Includes, Overlaps, Overlapped-By, Met-By, Starts
153. During, Includes, Overlaps, Overlapped-By, Meets, Met-By, Starts
154. Equals, During, Includes, Overlaps, Overlapped-By, Meets, Met-By, Starts
155. Precedes, During, Includes, Overlaps, Overlapped-By, Meets, Met-By, Starts
156. Equals, Precedes, During, Includes, Overlaps, Overlapped-By, Meets, Met-By, Starts
157. Follows, During, Includes, Overlaps, Overlapped-By, Meets, Met-By, Starts
158. Equals, Follows, During, Includes, Overlaps, Overlapped-By, Meets, Met-By, Starts
159. Precedes, Follows, During, Includes, Overlaps, Overlapped-By, Meets, Met-By, Starts
160. Equals, Precedes, Follows, During, Includes, Overlaps, Overlapped-By, Meets, Met-By, Starts
161. Started-By
162. Equals, Started-By
163. Includes, Started-By
164. Equals, Includes, Started-By
165. Includes, Overlaps, Started-By
166. Equals, Includes, Overlaps, Started-By
167. Precedes, Includes, Overlaps, Started-By
168. Equals, Precedes, Includes, Overlaps, Started-By
169. Overlapped-By, Started-By
170. Equals, Overlapped-By, Started-By

FIG. 4e

171. Follows, Overlapped-By, Started-By
172. Equals, Follows, Overlapped-By, Started-By
173. During, Overlapped-By, Started-By
174. Equals, During, Overlapped-By, Started-By
175. Follows, During, Overlapped-By, Started-By
176. Equals, Follows, During, Overlapped-By, Started-By
177. Includes, Overlapped-By, Started-By
178. Equals, Includes, Overlapped-By, Started-By
179. Follows, Includes, Overlapped-By, Started-By
180. Equals, Follows, Includes, Overlapped-By, Started-By
181. During, Includes, Overlaps, Overlapped-By, Started-By
182. Equals, During, Includes, overlaps, Overlapped-By, Started-By
183. Precedes, During, Includes, Overlaps, Overlapped-By, Stared-By
184. Equals, Precedes, During, Includes, Overlaps, Overlapped-By, Started-By
185. Follows, During, Includes, Overlaps, Overlapped-By, Started-By
186. Equals, Follows, During, Includes, Overlaps, Overlapped-By, Started-By
187. Precedes, Follows, During, Includes, Overlaps, Overlapped-By, Started-By
188. Equals, Precedes, Follows, During, Includes, Overlaps, Overlapped-By, Started-By
189. Includes, Overlaps, Meets, Started-By
190. Equals, Includes, Overlaps, Meets, Started-By
191. Precedes, Includes, Overlaps, Meets, Started-By
192. Equals, Precedes, Includes, Overlaps, Meets, Started-By
193. During, Includes, Overlaps, Overlapped-By, Meets, Started-By
194. Equals, During, Includes, Overlaps, Overlapped-By, Meets, Started-By
195. Precedes, During, Includes, Overlaps, Overlapped-By, Meets, Started-By
196. Equals, Precedes, During, Includes, Overlaps, Overlapped-By, Meets, Started-By
197. Follows, During, Includes, Overlaps, Overlapped-By, Meets, Started-By
198. Equals, Follows, During, Includes, Overlaps, Overlapped-By, Meets, Started-By
199. Precedes, Follows, During, Includes, Overlaps, Overlapped-By, Meets, Started-By
200. Equals, Precedes, Follows, During, Includes, Overlaps, Overlapped-BY, Meets, Started-By
201. Overlapped-By, Met-By, Started-By
202. Equals, Overlapped-By, Met-By, Started-By
203. Follows, Overlapped-By, Met-By, Started-By
204. Equals, Follows, Overlapped-By, Met-By, Started-By

FIG. 4f

205. During, Overlapped-By, Met-By, Started-By
206. Equals, During, Overlapped-By, Met-By, Started-By
207. Follows, During, Overlapped-By, Met-By, Started-By
208. Equals, Follows, During, Overlapped-By, Met-By, Started-By
209. Includes, Overlapped-By, Met-By, Started-By
210. Equals, Includes, Overlapped-By, Met-By, Started-By
211. Follows, Includes, Overlapped-By, Met-By, Started-By
212. Equals, Follows, Includes, Overlapped-By, Met-By,
213. During, Includes, Overlaps, Overlapped-By, Met-By, Started-By
214. Equals, During, Includes, Overlaps, Overlapped-By, Met-By, Started-By
215. Precedes, During, Includes, Overlaps, Overlapped-By, Met-By, Started-By
216. Equals, Precedes, During, Includes, Overlaps, Overlapped-By, Met-By, Started-By
217. Follows, During, Includes, Overlaps, Overlapped-By, Met-By, Started-By
218. Equals, Follows, During, Includes, Overlaps, Overlapped-By, met-By, Started-By
219. Precedes, Follows, During, Includes, Overlaps, Overlapped-By, Met-By, Started-By
220. Equals, Precedes, Follows, During, includes, Overlaps, Overlapped-By, Met-By, Started-By
221. During, Includes, Overlaps, Overlapped-By, Meets, Met-By, Started-By
222. Equals, During, Includes, Overlaps, Overlapped-By, Meets, Met-By, Started-By
223. Precedes, During, Includes, Overlaps, Overlapped-By, Meets, Met-By, Started-By
224. Equals, Precedes, During, Includes, Overlaps, Overlapped-By, Meets, Met-By, Started-By
225. Follows, During, Includes, Overlaps, Overlapped-By, Meets, Met-By, Started-By
226. Equals, Follows, During, Includes, Overlaps, Overlapped-By, Meets, Met-By, Started-By
227. Precedes, Follows, During, Includes, Overlaps, Overlapped-By, Meets, Met-By, Started-By
228. Equals, Precedes, Follows, During, Includes, Overlaps, Overlapped-By, Meets, Met-By, Started-By
229. Starts, Started-By
230. Equals, Starts, Started-By
231. Includes, Overlaps, Starts, Started-By
232. Equals, Includes, Overlaps, Starts, Started-By
233. Precedes, Includes, Overlaps, Starts, Started-By
234. Equals, Precedes, Includes, Overlaps, Starts, Started-By
235. During, Overlapped-By, Starts, Started-By
236. Equals, During, Overlapped-By, Starts, Started-By
237. Follows, During, Overlapped-By, Starts, Started-By
238. Equals, Follows, During, Overlapped-By, Starts, Started-By

FIG. 4g

239. During, Includes, Overlaps, Overlapped-By, Starts, Started-By
240. Equals, During, Includes, Overlaps, Overlapped-By, Starts, Started-By
241. Precedes, During, Includes, Overlaps, Overlapped-By, Starts, Started-By
242. Equals, Precedes, During, Includes, Overlaps, Overlapped-By, Starts, Started-By
243. Follows, During, Includes, Overlaps, Overlapped-By, Starts, Started-By
244. Equals, Follows, During, Includes, Overlaps, Overlapped-By, Starts, Started-By
245. Precedes, Follows, During, Includes, Overlaps, Overlapped-By, Starts, Started-By
246. Equals, Precedes, Follows, During, Includes, Overlaps Overlapped-By, Starts, Started-By
247. Includes, Overlaps, Meets, Starts, Started-By
248. Equals, Includes, Overlaps, Meets, Starts, Started-By
249. Precedes, Includes, Overlaps, Meets, Starts, Started-By
250. Equals, Precedes, Includes, Overlaps, Meets, Starts, Started-By
251. During, Includes, Overlaps, Overlapped-By, Meets, Starts, Started-By
252. Equals, During, Includes, Overlaps, Overlapped-By, Meets, Starts, Started-By
253. Precedes, During, Includes, Overlaps, Overlapped-By, Meets, Starts, Started-By
254. Equals, Precedes, During, Includes, Overlaps, Overlapped-By, Meets, Starts, Started-By
255. Follows, During, Includes, Overlaps, Overlapped-By, Meets, Starts, Started-By
256. Equals, Follows, During, Includes, Overlaps, Overlapped-By, Meets, Starts, Started-By
257. Precedes, Follows, During, Includes, Overlaps, Overlapped-By, Meets, Starts, Started-By
258. Equals, Precedes, Follows, During, Includes, Overlaps, Overlapped-By, Meets, Starts, Started-By
259. During, Overlapped-By, Met-By, Starts, Started-By
260. Equals, During, Overlapped-By, Met-By, Starts, Started-By
261. Follows, During, Overlapped-By, Met-By, Starts, Started-By
262. Equals, Follows, During, Overlapped-By, Met-By, Starts, Started-By
263. During, Includes, Overlaps,(Overlapped-By, Met-By, Starts, Started-By
264. Equals, During, Includes, Overlaps, Overlapped-By, Met-By, Starts, Started-By
265. Precedes, During, Includes, Overlaps, Overlapped-By, Met-By, Starts, Started-By
266. Equals, Precedes, During, Includes, Overlaps, Overlapped-By, Met-By, Starts, Started-By
267. Follows, During, Includes, Overlaps, Overlapped-By, Met-By, Starts, Started-By
268. Equals, Follows, During, Includes, Overlaps, Overlapped-By, Met-By, Starts, Started-By
269. Precedes,' Follows, During, Includes, Overlaps, Overlapped-By, Met-By, Starts, Started-By
270. Equals, Precedes, Follows, During, Includes, Overlaps, Overlapped-By, Met-By, Starts, Started-By
271. During, Includes, Overlaps, Overlapped-By,.Meets, Met-By, Starts, Started-By
272. Equals, During, Includes, Overlaps, Overlapped-By, Meets, Met-By, Starts, Started-By

FIG. 4h

273. Precedes, During, Includes, Overlaps, Overlapped-By, Meets, HeL-By, Starts, Started-By
274. Equals, Precedes, During, Includes, Overlaps, Overlapped-By, Meets, Met-By, Starts, Started-By
275. Follows, During, Includes, Overlaps, Overlapped-By, Meets, Met-By, Starts, Started-By
276. Equals, Follows, During, Includes, Overlaps, Overlapped-By, Meets, Met-By, Starts, Started-By
277. Precedes, Follows, During, Includes, Overlaps, Overlapped-By, Meets, Met-By, Starts, Started-By
278. Equals, Precedes, Follows, During, Includes, Overlaps, Overlapped-By, Meets, Met-By, Starts, Started-By
279. Finishes
280. Equals, Finishes
281. During, Finishes
282. Equals, During, Finishes
283. During, Overlaps, Finishes
284. Equals, During, Overlaps, Finishes
285. Precedes, During, Overlaps, Finishes
286. Equals, Precedes, During, Overlaps, Finishes
287. Overlapped-By, Finishes
288. Equals, Overlapped-By, Finishes
289. Follows, Overlapped-By, Finishes
290. Equals, Follows, Overlapped-By, Finishes
291. During, Overlapped-By, Finishes
292. Equals, During, Overlapped-By, Finishes
293. Follows, During, Overlapped-By, Finishes
294. Equals, Follows, During, Overlapped-By, Finishes
295. Includes, Overlapped-By, Finishes
296. Equals, Includes, Overlapped-By, Finishes
297. Follows, Includes, Overlapped-By, Finishes
298. Equals, Follows, Includes, Overlapped-By, Finishes
299. During, Includes, Overlaps, Overlapped-By, Finishes
300. Equals, During, Includes, Overlaps, Overlapped-By, Finishes
301. Precedes, During, Includes, Overlaps, Overlapped-By, Finishes
302. Equals, Precedes, During, Includes, Overlaps, Overlapped-By, Finishes
303. Follows, During, Includes, Overlaps, Overlapped-By, Finishes
304. Equals, Follows, During, Includes, Overlaps, Overlapped-By, Finishes
305. Precedes, Follows, During, Includes, Overlaps, Overlapped-By, Finishes
306. Equals, Precedes, Follows, During, Includes, Overlaps, Overlapped-By, Finishes

FIG. 4i

307. During, Overlaps, Meets, Finishes
308. Equals, During, Overlaps, Meets, Finishes
309. Precedes, During, Overlaps, Meets, Finishes
310. Equals, Precedes, During, Overlaps, Meets, Finishes
311. During, Includes, Overlaps, Overlapped-By, Meets, Finishes
312. Equals, During, Includes, Overlaps, Overlapped-By, Meets, Finishes
313. Precedes, During, Includes, Overlaps, Overlapped-By, Meets, Finishes
314. Equals, Precedes, During, Includes, Overlaps, Overlapped-By, Meets, Finishes
315. Follows; During, Includes, Overlaps, Overlapped-By, Meets, Finishes
316. Equals, Follows, During, Includes, Overlaps, Overlapped-By, Meets, Finishes
317. Precedes, Follows, During, Includes, Overlaps, Overlapped-By, Meets, Finishes
318. Equals, Precedes, Follows, During, Includes, Overlaps, Overlapped-By, Meets, Finishes
319. Overlapped-By, Met-By, Finishes
320. Equals, Overlapped-By, Met-By, Finishes
321. Follows, Overlapped-By, Met-By, Finishes
322. Equals, Follows, Overlapped-By, Met-By, Finishes
323. During, Overlapped-By, Met-By, Finishes
324. Equals, During, Overlapped-By, Met-By, Finishes
325. Follows, During, Overlapped-By, Met-By, Finishes
326. Equals, Follows, During, Overlapped-By, Met-By, Finishes
327. Includes, Overlapped-By, Met-By, Finishes
328. Equals, Includes, Overlapped-By, Met-By, Finishes
329. Follows, Includes, Overlapped-By, Met-By, Finishes
330. Equals, Follows, Includes, Overlapped-By, Met-By, Finishes
331. During, Includes, Overlaps, Overlapped-By, Met-By, Finishes
332. Equals, During, Includes, Overlaps, Overlapped-By, Met-By, Finishes
333. Precedes, During, Includes, Overlaps, Overlapped-By, Met-By, Finishes
334. Equals, Precedes, During, Includes, Overlaps, Overlapped-By, Met-By, Finishes
335. Follows, During, Includes, Overlaps, Overlapped-By, Met-By, Finishes
336. Equals, Follows, During, Includes, Overlaps, Overlapped-By, Met-By, Finishes
337. Precedes, Follows, During, Includes, Overlaps, Overlapped-By, Met-By, Finishes
338. Equals, Precedes, Follows, During, Includes, Overlaps, Overlapped-By, Met-By, Finishes
339. During, Includes, Overlaps, Overlapped-By, Meets, Met-By, Finishes
340. Equals, During, Includes, Overlaps, Overlapped-By, Meets, Met-By, Finishes

FIG. 4j

341. Precedes, During, Includes, Overlaps, Overlapped-By, Meets, Met-By, Finishes
342. Equals, Precedes, During, Includes, Overlaps, Overlapped-By, Meets, Met-By, Finishes
343. Follows, During, Includes, Overlaps, Overlapped-By, Meets, Met-By, Finishes
344. Equals, Follows, During, Includes, Overlaps, Overlapped-By, Meets, Met-By, Finishes
345. Precedes, Follows, During, Includes, Overlaps, Overlapped-By, Meets, Met-By, Finishes
346. Equals, Precedes, Follows, During, Includes, Overlaps, Overlapped-By, Meets, Met-By, Finishes
347. During, Starts, Finishes
348. Equals, During, Starts, Finishes
349. During, Overlaps, Starts, Finishes
350. Equals, During, Overlaps, Starts, Finishes
351. Precedes, During Overlaps, Starts, Finishes
352. Equals, Precedes, During Overlaps, Starts, Finishes
353. During, Overlapped-By, Starts, Finishes
354. Equals, During, Overlapped-By, Starts, Finishes
355. Follows, During, Overlapped-By, Starts, Finishes
356. Equals, Follows, During, Overlapped-By, Starts, Finishes
357. During, Includes, Overlaps, Overlapped-By, Starts, Finishes
358. Equals, During, Includes, Overlaps, Overlapped-By, Starts, Finishes
359. Precedes, During, Includes, Overlaps, Overlapped-By, Starts, Finishes
360. Equals, Precedes, During, Includes, Overlaps, overlapped-By, Starts, Finishes
361. Follows, During, Includes, Overlaps, overlapped-By, Starts, Finishes
362. Equals, Follows, During, Includes, Overlaps, Overlapped-By, Starts, Finishes
363. Precedes, Follows, During, Includes, Overlaps, Overlapped-By, Starts, Finishes
364. Equals, Precedes, Follows, During, Includes, Overlaps, overlapped-By, Starts, Finishes
365. During, Overlaps, Meets, Starts, Finishes
366. Equals, During, Overlaps, Meets, Starts, Finishes
367. Precedes, During, Overlaps, Meets, Starts, Finishes
368. Equals, Precedes, During, Overlaps, Meets, Starts, Finishes
369. During, Includes, Overlaps, Overlapped-By, Meets, Starts, Finishes
370. Equals, During, Includes, Overlaps, Overlapped-By, Meets, Starts, Finishes
371. Precedes, During, Includes, Overlaps, Overlapped-By, Meets, Starts, Finishes
372. Equals, Precedes, During, Includes, Overlaps, Overlapped-By, Meets, Starts, Finishes
373. Follows, During, Includes, Overlaps, Overlapped-By, Meets, Starts, Finishes
374. Equals, Follows, During, Includes, Overlaps, Overlapped-By, Meets, Starts, Finishes

FIG. 4k

375. Precedes, Follows, During, Includes, Overlaps, Overlapped-By, Meets, Starts, Finishes
376. Equals, Precedes, Follows, During, Includes, Overlaps, Overlapped-By, Meets, Starts, Finishes
377. During, Overlapped-By, Met-By, Starts, Finishes
378. Equals, During, Overlapped-By, Met-By, Starts, Finishes
379. Follows, During, Overlapped-By, Met-By, Starts, Finishes
380. Equals, Follows, During, Overlapped-By, Met-By, Starts, Finishes
381. During, Includes, Overlaps, Overlapped-By, Met-By, Starts, Finishes
382. Equals, During, Includes, Overlaps, Overlapped-By, Met-By, Starts, Finishes
383. Precedes, During, Includes, Overlaps, Overlapped-By, Met-By, Starts, Finishes
384. Equals, Precedes, During, Includes, Overlaps, Overlapped-By, Met-By, Starts, Finishes
385. Follows, During, Includes, Overlaps, Overlapped-By, Met-By, Starts, Finishes
386. Equals, Follows, During, Includes, Overlaps, Overlapped-By, Met-By, Starts, Finishes
387. Precedes, Follows, During, Includes, Overlaps, Overlapped-By, Met-By, Starts, Finishes
388. Equals, Precedes, Follows, During, Includes, Overlaps, Overlapped-By, Met-By, Starts, Finishes
389. During, Includes, Overlaps, Overlapped-By, Meets, Met-By, Starts, Finishes
390. Equals, During, Includes, Overlaps, Overlapped-By, Meets, Met-By, Starts, Finishes
391. Precedes, During, Includes, Overlaps, Overlapped-By, Meets, Met-By, Starts, Finishes
392. Equals, Precedes, During, Includes, Overlaps, Overlapped-By, Meets, Met-By, Starts, Finishes
393. Follows, During, Includes, Overlaps, Overlapped-By, Meets, Met-By, Starts, Finishes
394. Equals, Follows, During, Includes, Overlaps, Overlapped-By, Meets, Met-By, Starts, Finishes
395. Precedes, Follows, During, Includes, Overlaps, Overlapped-by, Meets, Met-By, Starts, Finishes
396. Equals, Precedes, Follows, During, Includes, Overlaps, Overlapped-By, Meets, Met-By, Starts, Finishes
397. Overlapped-By, Started-By, Finishes
398. Equals, Overlapped-By, Started-By, Finishes
399. Follows, Overlapped-By, Started-By, Finishes
400. Equals, Follows, Overlapped-By, Started-By, Finishes
401. During, Overlapped-By, Started-By, Finishes
402. Equals, During, Overlapped-By, Started-By, Finishes
403. Follows, During, Overlapped-By, Started-By, Finishes
404. Equals, Follows, During, Overlapped-By, Started-By, Finishes
405. Includes, Overlapped-By, Started-By, Finishes
406. Equals, Includes, Overlapped-By, Started-By, Finishes
407. Follows, Includes, Overlapped-By, Started-By, Finishes
408. Equals, Follows, Includes, Overlapped-By,

FIG. 41

409. During, Includes, Overlaps, Overlapped-By, Started-By, Finishes
410. Equals, During, Includes, Overlaps, Overlapped-By, Started-By, Finishes
411. Precedes, During, Includes, Overlaps, Overlapped-By, Started-By, Finishes
412. Equals, Precedes, During, Includes, Overlaps, Overlapped-By, Started-By, Finishes
413. Follows, During, Includes, Overlaps, Overlap, Overlapped-By, Started-By, Finishes
414. Equals, Follows, During, Includes, Overlaps, overlapped-By, Started-By, Finishes
415. Precedes, Follows, During, Includes, Overlaps, Overlapped-By, Started-By, Finishes
416. Equals, Precedes, Follows, During, Includes, Overlaps, overlapped-By, Started-By, Finishes
417. During, Includes, Overlaps, Overlapped-By, Meets, Started-By, Finishes
418. Equals, During, Includes, Overlaps, Overlapped-By, Meets, Started-By, Finishes
419. Precedes, During, Includes, Overlaps, overlapped-By, Meets, Started-By, Finishes
420. Equals, Precedes, During, Includes, Overlaps, overlapped-By, Meets, -Started-By, Finishes
421. Follows, During, Includes, Overlaps, overlapped-By, Meets, Started-By, Finishes
422. Equals, Follows, During, Includes, Overlaps, Overlapped-By, Meets, Started-By, Finishes
423. Precedes, Follows, During, Includes, Overlaps, Overlapped-By, Meets, Started-By, FiniAes
424. Equals, Precedes, Follows, During, Includes, Overlaps, overlapped-By, Meets, Started-By, Finishes
425. Overlapped-By, Met-By, Started-By, Finishes
426. Equals, Overlapped-By, Met-By, Started-By, Finishes
427. Follows, Overlapped-By, Met-By, Started-By, Finishes
428. Equals, Follows, Overlapped-By, Met-By, Started-By, Finishes
429. During, Overlapped-By, Met-By, Started-By, Finishes.
430. Equals, During, Overlapped-By, Met-By, Started-By, Finishes
431. Follows, During, Overlapped-By, Met-By, Started-Ay, Finishes
432. Equals, Follows, During, Overlapped-By, Met-By, Started-By, Finishes
433. Includes, overlapped-By, Met-By, Started-By, Finishes
434. Equals, Includes, Overlapped-By, Met-By, Started-By, Finishes
435. Follows, Includes, overlapped-By, Met-By, Started-By, Finishes
436. Equals, Follows, Includes, Overlapped-By, Met-By, Started-By, Finishes
437. During, Includes, Overlaps, Overlapped-By, Met-By, Started-By, Finishes
438. Equals, During, Includes, Overlaps, Overlapped-By, Met-By, Started-By, Finishes
439. Precedes, During, Includes, Overlaps, overlapped-By, Met-By, Started-By, Finishes
440. Equals, Precedes, During, Includes, Overlaps, Overlapped-By, Met-By, Started-By, Finishes
441. Follows, During, Includes, Overlaps, Overlapped-By, Met-By, Started-By, Finishes
442. Equals, Follows, During, Includes, Overlaps, Overlapped-By, Met-By, Started-By, Finishes

FIG. 4m

443. Precedes, Follows, During, Includes, Overlaps, Overlapped-By, Met-By, Started-By, Finishes
444. Equals, Precedes, Follows, During, Includes, Overlaps, Overlapped-By, Met-By, Started-By, Finishes
445. During, Includes, Overlaps, overlapped-By, Meets, Met-By, Started-By, Finishes
446. Equals, During, Includes, Overlaps, overlapped-By, Meets, Met-By, Started-By, Finishes
447. Precedes, During, Includes, (Overlaps, overlapped-By, Meets, Met-By, Started-By, Finishes
449. Equals, Precedes, During, Includes, Overlaps, Overlapped-By, Meets, Met-By, Started-By, Finishes
449. Follows, During, Includes, Overlaps, Overlapped-By, Meets, Met-By, Started-By, Finishes
450. Equals, Follows, During, Includes, Overlaps, Overlapped-By, Meets, Met-By, Started-By, Finishes
451. Precedes, Follows, During, Includes, Overlaps, Overlapped-By, Meets, Met-By, Started-By, Finishes
452. Equals, Precedes, Follows, During, Includes, Overlaps, Overlapped-By, Meets, Met-By, Started-By, Finishes
453. During, Overlapped-By, Starts, Started-By, Finishes
454. Equals, During, Overlapped-By, Starts, Started-By, Finishes
455. Follows, During, Overlapped-By, Starts, Started-By, Finishes
456. Equals, Follows, During, overlapped-By, Starts, Started-By, Finishes
457. During, Includes, Overlaps, Overlapped-By, Starts, Started-By, Finishes
458. Equals, During, Includes, Overlaps, overlapped-By, starts, Started-By, Finishes
459. Precedes, During, Includes, Overlaps, Overlapped-By, Starts, Started-By, Finishes
460. Equals, Precedes, During, Includes, Overlaps, Overlapped-By, Starts, Started-By, Finishes
461. Follows, During, Includes, Overlaps, Overlapped-By, Starts, Started-By, Finishes
462. Equals, Follows, During, Includes, Overlaps, Overlapped-By, Starts, started-By, Finishes
463. Precedes, Follows, During, Includes, Overlaps, Overlapped-By, Starts, Started-By, Finishes
464. Equals, Precedes, Follows, During, Includes, Overlaps, Overlapped-By, Starts, Started-By, Finishes
465. During, Includes, Overlaps, Overlapped-By, Meets, Starts, Started-By, Finishes
466. Equals, During, Includes, Overlaps, Overlapped-By, Meets, Starts, Started-By, Finishes
467. Precedes, During, Includes, Overlaps, Overlapped-By, Meets, Starts, Started-By, Finishes
468. Equals, Precedes, During, Includes, Overlaps, Overlapped-By, Meets, Starts, Started-By Finishes
469. Follows, During, Includes, Overlaps, Overlapped-By, Meets, Starts, Started-By, Finishes
470. Equals, Follows, During, Includes, Overlaps, Overlapped-By, Meets, Starts, Started-By, Finishes
471. Precedes, Follows, During, Includes, Overlaps, Overlapped-By, Meets, Starts, Started-By, Finishes
472. Equals, Precedes, Follows, During, Includes, Overlaps, Overlapped-By, Meets, Starts, Started-By, Finishes
473. During, Overlapped-By, Met-By, Starts, Started-By, Finishes
474. Equals, During, Overlapped-By, Met-By, Starts, Started-By, Finishes
475. Follows, During, Overlapped-By, Met-By, Starts, Started-By, Finishes
476. Equals, Follows, During, Overlapped-By, Met-By, Starts, Started-By, Finishes

FIG. 4n

477. During, Includes, Overlaps, Overlapped-By, Met-By, Starts, Started-By, Finishes
478. Equals, During, Includes, Overlaps, Overlapped-By, Met-By, Starts, Started-By, Finishes
479. Precedes, During, Includes, Overlaps, Overlapped-By, Met-By, Starts, Started-By, Finishes
480. Equals, Precedes, During, includes, Overlaps, Overlapped-By, Met-By, Starts, Started-By, Finishes
481. Follows, During, Includes, Overlaps, Overlapped-By, Met-By, Starts, Started-By, Finishes
482. Equals, Follows, During, Includes, Overlaps, Overlapped-By, Met-By, Starts, Started-By, Finishes
483. Precedes, Follows, During, Includes, Overlaps, Overlapped-By, Met-By, Starts, Started-By, Finishes
484. Equals, Precedes, Follows, During, Includes, Overlaps, Overlapped-By, Met-By, Starts, Started-By, Finishes
485. During, Includes, Overlaps, Overlapped-By, Meets, Met-B~' Starts, Started-By, Finishes
486. Equals, During, Includes, Overlaps, Overlapped-By, Meets, Met-By, Starts, Started-By, Finishes
487. Precedes, During, Includes, Overlaps, Overlapped-By, Meets,. Met-By, Starts, Started-By, Finishes
488. Equals, Precedes, During, Includes, Overlaps, Overlapped-By, Meets, Met-By, Starts, Started-By, Finishes
489. Follows, During, Includes, Overlaps, Overlapped-By, Meets, Met-By, Starts, Started-By, Finishes
490. Equals, Follows, During, Includes, Overlaps, Overlapped-By, Meets, Met-By, Starts, Started-By, Finishes
491. Precedes, Follows, During, Includes, Overlaps, Overlapped-By, Meets, Met-By, Starts, Started-By, Finishes
492. Equals, Precedes, Follows, During, Includes, Overlaps, Overlapped-By, Meets, Met-By, Starts, Started-By, Finishes
493. Finished-By
494. Equals, Finished-By
495. Includes, Finished-By
496. Equals, Includes, Finished-By
497. Overlaps, Finished-By
498. Equals, Overlaps, Finished-By
499. Precedes, Overlaps, Finished-By
500. Equals, Precedes, Overlaps, Finished-By
501. During, Overlaps, Finished-By
502. Equals, During, Overlaps, Finished-By
503. Precedes, During, Overlaps, Finished-By
504. Equals, Precedes, During, Overlaps, Finished-By
505. Includes, overlaps, Finished-By
506. Equals, Includes, overlaps, Finished-By
507. Precedes, Includes, overlaps, Finished-By
508. Equals, Precedes, Includes, overlaps, Finished-By
509. Includes, Overlapped-By, Finished-By
510. Equals, Includes, Overlapped-By, Finished-By

FIG. 4o

511. Follows, Includes, Overlapped-By, Finished-By
512. Equals, Follows, Includes, Overlapped-By, Finished-By
513. During, Includes, overlaps, Overlapped-By, Finished-By
514. Equals, During, Includes, Overlaps, Overlapped-By, Finished-By
515. Precedes, During, Includes, Overlaps, Overlapped-By, Finished-By
516. Equals, Precedes, During, Includes, Overlaps, Overlapped-By, Finished-By
517. Follows, During, Includes, Overlaps, Overlapped-By, Finished-By
518. Equals, Follows, During, Includes, overlaps, Overlapped-By, Finished-By
519. Precedes, Follows, During, Includes, Overlaps, Overlapped-By, Finished-By
520. Equals, Precedes, Follows, During, Includes, Overlaps, Overlapped-By, Finished-By
521. Overlaps, Meets, Finished-By
522. Equals, Overlaps, Meets, Finished-By
523. Precedes, Overlaps, Meets, Finished-By
524. Equals, Precedes, Overlaps, Meets, Finished-By
525. During, Overlaps, Meets, Finished-By
526. Equals, During, Overlaps, Meets, Finished-By
527. Precedes, During, Overlaps, Meets, Finished-By
528. Equals, Precedes, During, Overlaps, Meets, Finished-By
529. Includes, Overlaps, Meets, Finished-By
530. Equals, Includes, Overlaps, Meets, Finished-By
531. Precedes, Includes, overlaps, Meets, Finished-By
532. Equals, Precedes, Includes, Overlaps, Meets, Finished-By
533. During, Includes, Overlaps, Overlapped-By, Meets, Finished-By
534. Equals, During, Includes, Overlaps, Overlapped-By, Meets, Finished-By
535. Precedes, During, Includes, overlaps, Overlapped-By, Meets, Finished-By
536. Equals, Precedes, During, Includes, Overlaps, Overlapped-By, Meets, Finished-By
537. Follows, During, Includes, overlaps, Overlapped-By, Meets, Finished-By
538. Equals, Follows, During, Includes, Overlaps, Overlapped-By, Meets, Finished-By
539. Precedes, Follows, During, Includes, Overlaps, Overlapped-By, Meets, Finished-By
540. Equals, Precedes, Follows, During, Includes, Overlaps, Overlapped-By, Meets, Finished-B
541. Includes, Overlapped-By, Met-By, Finished-By
542. Equals, Includes, Overlapped-By, Met-By, Finished-By
543. Follows, Includes, Overlapped-By, Met-By, Finished-By
544. Equals, Follows, includes, Overlapped-By, Met-By, Finished-By

FIG. 4p

545. During, Includes, overlaps, Overlapped-By, Met-By, Finished-By
546. Equals, During, Includes, Overlaps, Overlapped-By, Met-By, Finished-By
547. Precedes, During, Includes, Overlaps, Overlapped-By, Met-By, Finished-By
548. Equals, Precedes, During, Includes, Overlaps, Overlapped-By, Met-By, Finished-By
549. Follows, During, Includes, Overlaps, Overlapped-By, Met-By, Finished-By
550. Equals, Follows, During, Includes, overlaps, Overlapped-By, Met-By, Finished-By
551. Precedes, Follows, During, Includes, Overlaps, Overlapped-By, Met-By, Finished-By
552. Equals, Precedes, Follows, During, Includes, Overlaps, Overlapped-By, Met-By,Finished-By
553. During, Includes, Overlaps, Overlapped-By, Meets, Met-By, Finished-By
554. Equals, During, Includes, Overlaps, Overlapped-By, Meets, Met-By, Finished-By
555. Precedes, During, Includes, Overlaps, Overlapped-By, Meets, Met-By, Finished-By
556. Equals, Precedes, During, Includes, Overlaps, Overlapped-By, Meets, Met-By, Finished-By
557. Follows, During, Includes, Overlaps, Overlapped-By, Meets, Met-By, Finished-By
558. Equal3, Follows, During, Includes, Overlaps, Overlapped-By, Meets, met-By, Finished-By
559. Precedes, Follows, During, Includes, Overlaps, Overlapped-By, Meets, Met-By, Finished-By
560. Equals, Precedes, Follows, During, Includes, Overlaps, Overlapped-By, Meets, Met-By, Finished-By
561. Overlaps, Starts, Finished-By
562. Equals, Overlaps, Starts, Finished-By
563. Precedes, Overlaps, Starts, Finished-By
564. Equals, Precedes, Overlaps, Starts, Finished-By
565. During, Overlaps, Starts, Finished-By
566. Equals, During, Overlaps, Starts, Finished-By
567. Precedes, During, Overlaps, Starts, Finished-By
568. Equals, Precedes, During, Overlaps, Starts, Finished-By
569. Includes, Overlaps, Starts, Finished-By
570. Equals, Includes, Overlaps, Starts, Finished-By
571. Precedes, Includes, Overlaps, Starts, Finished-By
572. Equals, Precedes, Includes, Overlaps, Starts, Finished-By
573. During, Includes, Overlaps, Overlapped-By, Starts, Finished-By
574. Equals, During, Includes, Overlaps, Overlapped-By, Starts, Finished-By
575. Precedes, During, Includes, Overlaps, Overlapped-By, Starts, Finished-By
576. Equals, Precedes, During, Includes, Overlaps, Overlapped,-By, Starts, Finished-By
577. Follows, During, Includes, Overlaps, Overlapped-By, Starts, Finished-By
578. Equals, Follows, During, Includes, Overlaps, Overlapped-By, Starts, Finished-By

FIG. 4q

579. Precedes, Follows, During, Includes, Overlaps, Overlapped-By, Starts, Finished-By
580. Equals, Precedes, Follows, During, Includes, Overlaps, Overlapped-By, Starts, Finished-By
581. Overlaps, Meets, Starts, Finished-By
582. Equals, Overlaps, Meets, Starts, Finished-By
583. Precedes, Overlaps, Meets, Starts, Finished-By
584. Equals, Precedes, Overlaps, Meets, Starts, Finished-By
585. During, Overlaps, Meets, Starts, Finished-By
586. Equals, During, Overlaps, Meets, Starts, Finished-By
587. Precedes, During, Overlaps, Meets, Starts, Finished-By
588. Equals, Precedes, During, Overlaps, Meets, Starts, Finished-By
589. Includes, Overlaps, Meets, Starts, Finished-By
590. Equals, Includes, Overlaps, Meets, Starts, Finished-By
591. Precedes, Includes, Overlaps, Meets, Starts, Finished-By
592. Equals, Precedes, Includes, Overlaps, Meets, Starts, Fished-By
593. During, Includes, Overlaps, Overlapped-By, Meets, Starts, Finished-By
594. Equals, During, Includes, Overlaps, Overlapped-By, Meets, Starts, Finished-By
595. Precedes, During, Includes, Overlaps, Overlapped-By, Meets, Starts, Finished-By
596. Equals, Precedes, During, Includes, Overlaps, Overlapped-By, Meets, Starts, Finished-By
597. Follows, During, Includes, Overlaps, Overlapped-By, Meets, Starts, Finished-By
598. Equals, Follows, During, Includes, Overlaps, Overlapped-By, Meets, Starts, Finished-By
599. Precedes, Follows, During, Includes, Overlaps, Overlapped-By, Meets, Starts, Finished-By
600. Equals, Precedes, Follows, During, Includes, Overlaps, Overlapped-By, Meets, Starts, Finished-By
601. During, Includes, Overlaps, Overlapped-By, Met-By, Starts, Finished-By
602. Equals, During, Includes, Overlaps, Overlapped-By, Met-By, Starts, Finished-By
603. Precedes, During, Includes, Overlaps, Overlapped-By, Met-By, Starts, Finished-By
604. Equals, Precedes, During, Includes, Overlaps, Overlapped-By, Met-By, Starts, Finished-By 605. Follows, During, Includes, Overlaps, Overlapped-By, Met-By, Starts, Finished-By
606. Equals, Follows, During, Includes, Overlaps, Overlapped-By, Met-By, Starts, Finished-By
607. Precedes, Follows, During, Includes, Overlaps, Overlapped-By, Met-By, Starts, Finished-By
608. Equals, Precedes, Follows, During, Includes, Overlaps, Overlapped-By, Met-By, Starts, Finished-By
609. During, Includes, Overlaps, Overlapped-By, Meets, Met-By, Starts, Finished-By
610. Equals, During, Includes, Overlaps, Overlapped-By, Meets, Met-By, Starts, Finished-By
611. Precedes, During, Includes, Overlaps, Overlapped-By, Meets, Met-By, Starts, Finished-By
612. Equals, Precedes, During, Includes, Overlaps, Overlapped-By, Meets, Met-By, Starts, Finished-By

FIG. 4r

613. Follows, During, Includes, Overlaps, Overlapped-By, Meets, Met-By, Starts, Finished-By
614. Equals, Follows, During, Includes, Overlaps, Overlapped-By, Meets, Met-By, Starts, Finished-By
615. Precedes, Follows, During, Includes, Overlaps, Overlapped-By, Meets, Met-By, Starts, Finished-By
616. Equals, Precedes, Follows, During, Includes, Overlaps, Overlapped-By, Meets, Met-By, Starts, Finished-By
617. Includes, Started-By, Finished-By
618. Equals, Includes, Started-By, Finished-By
619. Includes, Overlaps, Started-By, Finished-By
620. Equals, Includes, Overlaps, Started-By, Finished-By
621. Precedes, Includes, Overlaps, Started-By, Finished-By
622. Equals, Precedes, Includes, Overlaps, Started-By, Finished-By
623. Includes, Overlapped-By, Started-By, Finished-By
624. Equals, Includes, Overlapped-By, Started-By, Finished-By
625. Follows, Includes, Overlapped-By, Started-By, Finished-By
626. Equals, Follows, Includes, Overlapped-By, Started-By, Finished-By
627. During, Includes, Overlaps, Overlapped-By, Started-By, Finished-By
628. Equals, During, Includes, Overlaps, Overlapped-By, Started-By, Finished-By
629. Precedes, During, Includes, Overlaps, Overlapped-By, Started-By, Finished-By
630. Equals, Precedes, During, Includes, Overlaps, Overlapped-By, Started-By, Finished-By
631. Follows, During, Includes, Overlaps, Overlapped-By, Started-By, Finished-By
632. Equals, Follows, During, Includes, Overlaps, Overlapped-By, Started-By, Finished-By
633. Precedes, Follows, During, Includes, Overlaps, Overlapped-By, Started-By, Finished-By
634. Equals, Precedes, Follows, During, Includes, Overlaps, Overlapped-By, Started-By, Finished-By
635. Includes, Overlaps, Meets, Started-By, Finished-By
636. Equals, Includes, Overlaps, Meets, Started-By, Finished-By
637. Precedes, Includes, Overlaps, Meets, Started-By, Finished-By
638. Equals, Precedes, Includes, Overlaps, Meets, Started-By, Finished-By
639. During, Includes, Overlaps, Overlapped-By, Meets, Started-By, Finished-By
640. Equals, During, Includes, Overlaps, Overlapped-By, Meets, Started-By, Finished-By
641. Precedes, During, Includes, Overlaps, Overlapped-By, Meets, Started-By, Finished-By
642. Equals, Precedes, During, Includes, Overlaps, Overlapped-By, Meets, Started-By, Finished-By
643. Follows, During, Includes, Overlaps, Overlapped-By, Meets, Started-By, Finished-By
644. Equals, Follows, During, Includes, Overlaps, Overlapped-By, Meets, Started-By, Finished-By
645. Precedes, Follows, During, Includes, Overlaps, Overlapped-By, Meets, Started-By, Finished-By
646. Equals, Precedes, Follows, During, Includes, Overlaps, Overlapped-By, Meets, Started-By, Finished-By

FIG. 4s

647. Includes, Overlapped-By, Met-By, Started-By, Finished-By
648. Equals, Includes, Overlapped-By, Met-By, Started-By, Finished-By
649. Follows, Includes, Overlapped-By, Met-By, Started-By, Finished-By
650. Equals, Follows, Includes, Overlapped-By, Met-By, Started-By, Finished-By
651. During, Includes, Overlaps, Overlapped-By, Met-By, Started-By, Finished-By
652. Equals, During, Includes, Overlaps, Overlapped-By, Met-By, Started-By, Finished-By
653. Precedes, During, Includes, Overlaps, Overlapped-By, Met-By, Started-By, Finished-By
654. Equals, Precedes, During, Includes, Overlaps, Overlapped-By, Met-By, Started-By, Finished-By
655. Follows, During, Includes, Overlaps, Overlapped-By, Met-By, Started-By, Finished-By
656. Equals, Follows, During, Includes, Overlaps, Overlapped-By, Met-By, Started-By, Finished-By
657. Precedes, Follows, During, Includes, Overlaps, Overlapped-By, Met-By, Started-By, Finished-By
658. Equals, Precedes, Follows, During, Includes, Overlaps, Overlapped-By, Met-By, Started-By, Finished-By
659. During, Includes, Overlaps, Overlapped-By, Meets, Met-By, Started-By, Finished-By
660. Equals, During, Includes, Overlaps, Overlapped-By, Meets, Met-By, Started-By,Finished-By
661. Precedes, During, Includes, Overlaps, Overlapped-By, Meets, Met-By, Started-By, Finished-By
662. Equals, Precedes, During, Includes, Overlaps, Overlapped-By, Meets, Met-By, Started-By, Finished-By
663.Follows, During, Includes, Overlaps, Overlapped-By, Meets, Met-By, Started-By, Finished-By
664. Equals, Follows, During, Includes, Overlaps, Overlapped-By, Meets, Met-By, Started-By, Finished-By
665. Precedes, Follows, During, Includes, Overlaps, Overlapped-By, Meets, Met-By, Started-By, Finished-By
666. Equals, Precedes, Follows, During, Includes, Overlaps, Overlapped-By, Meets, Met-By, Started-By, Finished-By
667. Includes, Overlaps, Starts, Started-By, Finished-By
668. Equals, Includes, Overlaps, Starts, Started-By, Finished-By
669. Precedes, Includes, Overlaps, Starts, Started-By, Finished-By
670. Equals, Precedes, Includes, Overlaps, Starts, Started-By, Finished-By
671. During, Includes, Overlaps, Overlapped-By, Starts, Started-By, Finished-By
672. Equals, During, Includes, Overlaps, Overlapped-By, Starts, Started-By, Finished-By
673. Precedes, During, Includes, Overlaps, Overlapped-By, Starts, Started-By, Finished-By
674. Equals, Precedes, During, Includes, Overlaps, Overlapped-By, Starts, Started-By, Finished-By
675. Follows, During, Includes, Overlaps, Overlapped-By, Starts, Started-By, Finished-By
676. Equals, Follows, During, Includes, Overlaps, Overlapped-By, Starts, Started-By, Finished-By
677. Precedes, Follows, During, Includes, Overlaps, Overlapped-By, Starts, Started-By, Finished-By
678. Equals, Precedes, Follows, During, Includes, Overlaps, Overlapped-By, Starts, Started-By, Finished-By
679. Includes, Overlaps, Meets, Starts, Started-By, Finished-By
680. Equals, Includes, Overlaps, Meets, Starts, Started-By, Finished-By

FIG. 4t

681. Precedes, Includes, Overlaps, Meets, Starts, Started-By, Finished-By
682. Equals, Precedes, Includes, Overlaps, Meets, Starts, Started-By, Finished-By
683. During, Includes, Overlaps, Overlapped-By, Meets, Starts, Started-By, Finished-By
684. Equals, During, Includes, Overlaps, Overlapped-By, Meets, Starts, Started-By, Finished-By
685. Precedes, During, Includes, Overlaps, Overlapped-By, Meets, Starts, Started-By, Finished-By
686. Equals, Precedes, During, Includes, Overlaps, Overlapped-By, Meets, Starts, Started-By, Finished-By
687. Follows, During, Includes, Overlaps, Overlapped-By, Meets, Stares, Started-By, Finished-By
688. Equals, Follows, During, Includes, Overlaps, Overlapped-By, Meets, starts, Started-By, Finished-By
689. Precedes, Follows, During, Includes, Overlaps, Overlapped-By, Meets, Starts, Started-By, Finished-By
690. Equals, Precedes, Follows, During, Includes, Overlaps, Overlapped-By, Meets, Starts, Started-By, Finished-By
691. During, Includes, Overlaps, Overlapped-By, Met-By, Starts, Started-By, Finished-By
692. Equals, During, Includes, Overlaps, Overlapped-By, Met-By, Starts, Started-By, Finished-By
693. Precedes, During, Includes, Overlaps, Overlapped-By, Met-By, Starts, Started-By, Finished-By
694. Equals, Precedes, During, Includes, Overlaps, Overlapped-By, Met-By, Starts, Started-By, Finished-By
695. Follows, During, Includes, Overlaps, Overlapped-By, Met-By, Starts, Started-By, Finished-By
696. Equals, Follows, During, Includes, Overlaps, Overlapped-By, Met-By, Starts, Started-By, Finished-By
697. Precedes, Follows, During, Includes, Overlaps, Overlapped-By, Met-By, Starts, Started-By, Finished-By
698. Equals, Precedes, Follows, During, Includes, Overlaps, Overlapped-By, Met-By, Starts, Started-By, Finished-By
699. During, Includes, Overlaps, Overlapped-By, Met-By, Starts, Started-By, Finished-By
700. Equal, During, Includes, Overlaps, Overlapped-By, Met-By, Starts, Started-By, Finished-By
701. Precedes, During, Includes, Overlaps, Overlapped-By, Met-By, Starts, Started-By, Finished-By
702. Equals, Precedes, During, Includes, Overlaps, Overlapped-By, Met-By, Starts, Started-By, Finished-By
703. Follows, During, Includes, Overlaps, Overlapped-By, Met-By, Starts, Started-By, Finished-By
704. Equals, Follows, During, includes, Overlaps, Overlapped-By. Met-By, Starts, Started-By, Finished-By
705. Precedes, Follows, During, Includes, Overlaps, Overlapped-By, Met-By, Starts, Started-By, Finished-By
706. Equals, Precedes, Follows, During, Includes, Overlaps, Overlapped-By, Meets, Met-By, Starts, Started-By, Finished-By
707. Finishes, Finished-By
708. Equals, Finishes, Finished-By
709. During, Overlaps, Finishes, Finished-By
710. Equals, During, Overlaps, Finishes, Finished-By
711. Precedes, During, Overlaps, Finishes, Finished-By
712. Equals, Precedes, During, Overlaps, Finishes, Finished-By
713. Includes, Overlapped-By, Finishes, Finished-By
714. Equals, Includes, Overlapped-By, Finishes, Finished-By

FIG. 4u

715. Follows, Includes, Overlapped-By, Finishes, Finished-By
716. Equals, Follows, Includes, Overlapped-By, Finishes, Finished-By
717. During, Includes, Overlaps, Overlapped-By, Finishes, Finished-By
718. Equals, During, Includes, 0verlaps, Overlapped-By, Finishes, Finished-By
719. Precedes, During, Includes, Overlaps, Overlapped-By, Finishes, Finished-By
720. Equals, Precedes, During, Includes, Overlaps, Overlapped-By, Finishes, Finished-By
721. Follows, During, Includes, Overlaps, Overlapped-By, Finishes, Finished-By
722. Equals, Follows, During, Includes, Overlaps, Overlapped-By, Finishes, Finished-By
723. Precedes, Follows, During, Includes, Overlaps, Overlapped-By, Finishes, Finished-By
724. Equals, Precedes, Follows, During, Includes, Overlaps, Overlapped-By, Finishes, Finished-By
725. During, Overlaps, Meets, Finishes, Finished-By
726. Equals, During, Overlaps, Meets, Finishes, Finished-By
727. Precedes, During, Overlaps, Meets, Finishes, Finished-By
728. Equals, Precedes, During, Overlaps, Meets, Finishes, Finished-By
729. During, Includes, Overlaps, Overlapped-By, Meets, Finishes, Finished-By
730. Equals, During, Includes, Overlaps, Overlapped-By, Meets, Finishes, Finished-By
731. Precedes, During, Includes, Overlaps, Overlapped-By, Meets, Finishes, Finished-By
732. Equals, Precedes, During, Includes, Overlaps, Overlapped-By, Meets, Finishes, Finished-By
733. Follows, During, Includes, Overlaps, Overlapped-By, Meets, Finishes, Finished-By
734. Equals, Follows, During, Includes, Overlaps, Overlapped-By, Meets, Finishes, Finished-By
735. Precedes, Follows, During, Includes, Overlaps, Overlapped-By, Meets, Finishes, Finished-By
736. Equals, Precedes, Follows, During, Includes, Overlaps, Overlapped-By, Meets, Finishes, Finished-By
737. Includes, Overlapped-By, Met-By,
738. Equals, Includes, Overlapped-By, Met-By, Finishes, Finished-By
739. Follows, Includes, Overlapped-By, Met-By, Finishes, Finished-By
740. Equals, Follows, Includes, Overlapped-By, Met-gy, Finishes, Finished-By
741. During, Includes, Overlaps, Overlapped-By, Met-By, Finishes, Finished-By
742. Equals, During, Includes, Overlaps, Overlapped-By, Met-By, Finishes, Finished-By
743. Precedes, During, Includes, Overlaps, Overlapped-By, Met-By, Finishes, Finished-By
744. Equals, Precedes, During, Includes, Overlaps, Overlapped-By, Met-By, Finishes, Finished-By
745. Follows, During, Includes, Overlaps, Overlapped-By, Met-By, Finishes, Finished-By
746. Equals, Follows, During, Includes, Overlaps, Overlapped-By, Met-By, Finishes, Finished-By
747. Precedes, Follows, Includes, Overlaps, Overlapped-By, Met-By, Finishes, Finished-By
748. Equals, Precedes, During, Includes, Overlaps, Overlapped-By, Met-By, Finishes, Finished-By

FIG. 4v

749. During, Includes, Overlaps, Overlapped-By, Meets, Met-By, Finishes, Finished-By
750. Equals, During, Includes, Overlaps, Overlapped-By, Meets, Met-By, Finishes, Finished-By
751. Precedes, During, Includes, Overlaps, Overlapped-By, Meets, Met-By, Finishes, Finished-By
752. Equals, Precedes, During, Includes, Overlaps, Overlapped-By, Meets, Met-By, Finishes, Finished-By
753. Follows, During, Includes, Overlaps, Overlapped-By," Meets, Met-By, Finishes, Finished-By
754. Equals, Follows, During, Includes, Overlaps, Overlapped-By, Meets, Met-By, Finishes, Finished-By
755. Precedes, Follows, During, Includes, Overlaps, Overlapped-By, Meets, Met-By, Finishes, Finished-By
756. Equals, Precedes, Follows, During, Includes, Overlaps, Overlapped-By, Meets, Met-By, Finishes, Finished-By
757. During, Overlaps, Starts, Finishes, Finished-By
758. Equals, During, Overlaps, Starts, Finishes, Finished-By
759. Precedes, During, Overlaps, Starts, Finishes, Finished-By
760. Equals, Precedes, During, Overlaps, Starts, Finishes, Finished-By
761. During, Includes, Overlaps, Overlapped-By, Starts, Finishes, Finished-By
762. Equals, During, Includes, Overlaps, Overlapped-By, Starts, Finishes, Finished-By
763. Precedes, During, Includes, Overlaps, Overlapped-By, Starts, Finishes, Finished-By.
764. Equals, Precedes, During, Includes, Overlaps, Overlapped-By, Starts, Finishes, Finished-By
765. Follows, During, Includes, Overlaps, Overlapped-By, Starts, Finishes, Finished-By
766. Equals, Follows, During, Includes, Overlaps, Overlapped-By, Starts, Finishes, Finished-By
767. Precedes, Follows, During, Includes, Overlaps, Overlapped-By, Starts, Finishes, Finished-By
768. Equals, Precedes, Follows, During, Includes, Overlaps, Overlapped-By, Starts, Finishes, Finished-By
769. During, Overlaps, Meets, Starts, Finishes, Finished-By
770. Equals, During, Overlaps, Meets, Starts, Finishes, Finished-By
771. Precedes, During, Overlaps, Meets, Starts, Finishes, Finished-By
772. Equals, Precedes, During, Overlaps, Meets, Starts, Finishes, Finished-By
773. During, Includes, Overlaps, Overlapped-By, Meets, Starts, Finishes, Finished-By
774. Equals, During, Includes, Overlaps, Overlapped-By, Meets, Starts, Finishes, Finished-By
775. Precedes, During, Includes, Overlaps, Overlapped-By, Meets, Starts, Finishes, Finished-By
776. Equals, Precedes, During, Includes, Overlaps, Overlapped-By, Meets, Starts, Finishes, Finished-By
777. Follows, During, includes, Overlaps, Overlapped-By, Meets, Starts, Finishes, Finished-By
778. Equals, Follows, During, Includes, Overlaps, Overlapped-By, Meets, Starts, Finishes, Finished-By
779. Precedes, Follows, During, Includes, Overlaps, Overlapped-By, Meets, Starts, Finishes, Finished-By
780. Equals, Precedes, Follows, During, Includes, Overlaps, Overlapped-By, Meets, Starts, Finishes, Finished-By
781. During, Includes, Overlaps, Overlapped-By, Met-By, Starts, Finishes, Finished-By
782. Equals, During, includes, Overlaps, Overlapped-By, Met-By, Starts, Finishes, Finished-By

FIG. 4w

783. Precedes, During, Includes, Overlaps, Overlapped-By, Met-By, Starts, Finishes, Finished-By
784. Equals, Precedes, During, Includes, Overlaps, Overlapped-By, Met-By, Starts, Finishes, Finished-By
785. Follows, During, includes, Overlaps, Overlapped-By, Met-By, Starts, Finishes, Finished-By
786. Equals, Follows, During, Includes, Overlaps, Overlapped-By, Met-By, Starts, Finishes, Finished-By
787. Precedes, Follows, During, Includes, Overlaps, Overlapped-By, Met-By, Starts, Finishes, Finished-By
788. Equals, Precedes, Follows, During, Includes, Overlaps, Overlapped-By, Met-By, Starts, Finishes, Finished-By
789. During, Includes, Overlaps, Overlapped-By, Meets, Met-By, Starts, Finishes, Finished-By
790. Equals, During, Includes, Overlaps, Overlapped-By, Meets, Met-By, Starts, Finishes, Finished-By
791. Precedes, During, Includes, Overlaps, Overlapped-By, Meets, Met-By, Starts, Finishes, Finished-By
792. Equals, Precedes, During, includes, Overlaps, Overlapped-By, Meets, Met-By, Starts, Finishes, Finished-By
793. Follows, During, Includes, Overlaps, Overlapped-By, Meets, Met-By, Starts, Finishes, Finished-By
794. Equals, Follows, During, Includes, Overlaps, Overlapped-By, Meets, Met-By, Starts, Finishes, Finished-By
795. Precedes, Follows, During, Includes, Overlaps, Overlapped-By, Meets, Met-By, Starts, Finishes, Finished-By
796. Equals, Precedes, Follows, During, Includes, Overlaps, Overlapped-By, Meets, Met-By, Starts, Finishes, Finished-By
797. Includes, Overlapped-By, Started-By, Finishes, Finished-By
798. Equals, Includes, Overlapped-By, Started-By, Finishes, Finished-By
799. Follows, Includes, Overlapped-By, Started-By, Finishes, Finished-By
800. Equals, Follows, Includes, Overlapped-By, Started-By, Finishes, Finished-By
801. During, Includes, Overlaps, Overlapped-By, Started-By, Finishes, Finished-By
802. Equals, During, Includes, Overlaps, Overlapped-By, Started-By, Finishes, Finished-By
803. Precedes, During, Includes, Overlaps, Overlapped-By, Started-By, Finishes, Finished-By
804. Equals, Precedes, During, Includes, Overlaps, Overlapped-By, Started-By, Finishes, Finished-By
805. Follows, During, Includes, Overlaps, Overlapped-By, Started-By, Finishes, Finished-By
806. Equals, Follows, During, Includes, Overlaps, Overlapped-By, Started-By, Finishes, Finished-By
807. Precedes, Follows, During, Includes, Overlaps, Overlapped-By, Started-By, Finishes, Finished-By
808. Equals, Precedes, Follows, During, Includes, Overlaps, Overlapped-By, Started-By, Finishes, Finished-By
809. During, Includes, Overlaps, Overlapped-By, Meets, Started-By, Finishes, Finished-By
810. Equals, During, Includes, Overlaps, Overlapped-By, Meets, Started-By, Finishes, Finished-By
811. Precedes, During, Includes, Overlaps, Overlapped-By, Meets, 5tarted-By, Finishes, Finished-By
812. Equals, Precedes, During, Includes, Overlaps, Overlapped-By, Meets, Started-By, Finishes, Finished-By
813. Follows, During, Includes, Overlaps, Overlapped-By, Meets, Started-By, Finishes, Finished-By
814. Equals, Follows, During, Includes, Overlaps, Overlapped-By, Meets, Started-By, Finishes, Finished-By
815. Precedes, Follows, During, Includes, Overlaps, Overlapped-By, Meets, Started-By, Finishes, Finished-By
816. Equals, Precedes, Follows, During, Includes, Overlaps, Overlapped-By, Meets, Started-By, Finishes, Finished-By

FIG. 4x

FIG. 4y

817. Includes, Overlapped-By, Met-By, Started-By, Finishes, Finished-By
818. Equals, Includes, Overlapped-By, Met-By, Started-By, Finishes, Finished-By
819. Follows, Includes, Overlapped-By, Met-By, Started-By, Finishes, Finished-By
820. Equals, Follows, Includes, Overlapped-By, Met-By, Started-By, Finishes, Finished-By
821. During; Includes, Overlaps, Overlapped-By, Met-By, Started-By, Finishes, Finished-By
822. Equals, During, includes, Overlaps, Overlapped-By, Met-By, Started-By, Finishes, Finished-By
823. Precedes, During, Includes, Overlaps, Overlapped-By, Met-8y, Started-By, Finishes, Finished-By
824. Equals, Precedes, During, Includes, Overlaps, Overlapped-By, Met-By, Started-By, Finishes, Finished-By
825. Follows, During, Includes, Overlaps, Overlapped-By, Met-By, Started-By, Finishes, Finished-By
826. Equals, Follows, During, Includes, Overlaps, Overlapped-By, Met-By, Started-By, Finishes, Finished-By
827. Precedes, Follows, During, Includes, Overlaps, Overlapped-By, Met-By, Started-By, Finishes, Finished-By
828. Equals, Precedes, Follows, During, Includes, Overlaps, Overlapped-By, Met-By, Started-By, Finishes, Finished-By
829. During, Includes, Overlaps, Overlapped-By, Meets, Met-By, Started-By, Finishes, Finished-By
830. Equals, During, Includes, Overlaps, Overlapped-By, Meets, Met-By, Started-By, Finishes, Finished-By
831. Precedes, During, Includes, Overlaps, Overlapped-By, Meets, Met-By, Started-By, Finishes, Finished-By
832. Equals, Precedes, During, Includes, Overlaps, Overlapped-By, Meets, Met-By, Started-By, Finishes, Finished-By
833. Follows, During, Includes, Overlaps, Overlapped-By, Meets, Met-By, Started-By, Finishes, Finished-By
834. Equals, Follows, During, Includes, Overlaps, Overlapped-By, Meets, Met-By, Started-By, Finishes, Finished-By
835. Precedes, Follows, During, Includes, Overlaps, Overlapped-By, Meets, Met-By, Started-By, Finishes, Finished-By
836. Equals, Precedes, Follows, During, Includes, Overlaps, Overlapped-By, Meets, Met-By, Started-By, Finishes, Finished-By
837. During, Includes, Overlaps, Overlapped-By, Starts, Started-By, Finishes, Finished-By
838. Equals, During, Includes, Overlaps, Overlapped-By, Starts, Started-By, Finishes, Finished-By
839. Precedes, During, Includes, Overlaps, Overlapped-By, Starts, Started-By, Finishes, Finished-By
840. Equals, Precedes, During, Includes, Overlaps, Overlapped-By, Starts, Started-By, Finishes, Finished-By
841. Follows, During, Includes, Overlaps, Overlapped-By, Starts, Started-By, Finishes, Finished-By
842. Equals, Follows, During, Includes, Overlaps, Overlapped-By, Starts, Started-By, Finishes, Finished-By
843. Precedes, Follows, During, Includes, Overlaps, Overlapped-By, Starts, Started-By, Finishes, Finished-By
844. Equals, Precedes, Follows, During, Includes, Overlaps, Overlapped-By, Starts, Started-By, Finishes, Finished-By
845. During, Includes, Overlaps, Overlapped-By, Meets, Starts, Started-By, Finishes, Finished-By
846. Equals, During, Includes, Overlaps, Overlapped-By, Meets, Starts, Started-By, Finishes, Finished-By
847. Precedes, During, Includes, Overlaps, Overlapped-By, Meets, Starts, Started-By, Finishes, Finished-By
848. Equals, Precedes, During, Includes, Overlaps, Overlapped-By, Meets, Starts, Started-By, Finishes, Finished-By
849. Follows, During, Includes, Overlaps, Overlapped-By, Meets, Starts, Started-By, Finishes, Finished-By
850. Equals, Follows, During, Includes, Overlaps, Overlapped-By, Meets, Starts, Started-By, Finishes, Finished-By 851. Precedes, Follows, During, Includes, Overlaps, Overlapped-By, Meets, Starts, Started-By, Finishes, Finished-By
852. Equals, Precedes, Follows, During, Includes, Overlaps, Overlapped-By, Meets, Starts, Started-By, Finishes, Finished-By
853. During, Includes, Overlaps, Overlapped-By, Met-By, Starts, Started-By, Finishes, Finished-By
854. Equals, During, Includes, Overlaps Overlapped-By, Met-By, Starts, Started-By, Finishes, Finished-By
855. Precedes, During, Includes, Overlaps Overlapped-By, Met-By, Starts, Started-By, Finishes, Finished-By
856. Equals, Precedes, During, Includes, Overlaps, Overlapped-By, Met-By, Starts, Started-By, Finishes, Finished-By
857. Follows, During, Includes, Overlaps, Overlapped-By, Met-By, Starts, Started-By, Finishes, Finished-By
858. Equals, Follows, During, Includes, Overlaps, Overlapped-By, Met-By, Starts, Started-By, Finishes, Finished-By
859. Precedes, Follows, During, Includes, Overlaps, Overlapped-By, Met-By, Starts, Started-By, Finishes, Finished-By
860. Equals, Precedes, Follows, During, Includes, Overlaps, Overlapped-By, Met-By, Starts, Started-By, Finishes, Finished-By
861. During, Includes, Overlaps, Overlapped-By, Meets, Met-By, Starts, Started-By, Finishes, Finished-By
862. Equals, During, Includes, Overlaps, Overlapped-By, Meets, Met-By, Starts, Started-By, Finishes, Finished-By
863. Precedes, During, Includes, Overlaps, Overlapped-By, Meets, Met-By, Starts, Started-By, Finishes, Finished-By
864. Equals, Precedes, During, Includes, Overlaps, Overlapped-By, Meets, Met-By, Starts, Started-By, Finishes, Finished-By
865. Follows, During, Includes, Overlaps, Overlapped-By, Meets, Met-By, Starts, Started-By, Finishes, Finished-By
866. Equals, Follows, During, Includes, Overlaps, Overlapped-By, Meets, Met-By, Starts, Started-By, Finishes, Finished-By
867. Precedes, Follows, During, Includes, Overlaps, Overlapped-By, Meets, Met-By, Starts, Started-By, Finishes, Finished-By
868. True

FIG. 4z

INITIAL SPECIFICATION MATRIX

| | A | B | C | D |
|---|---|---|---|---|
| A | = | MEETS | T | T |
| B | T | = | MEETS | T |
| C | T | T | = | MEETS |
| D | T | T | T | = |

| A | B |
|---|---|

| B | C |
|---|---|

| C | D |
|---|---|

SPECIFIED RELATIONS

==>

AFTER REPEATED SQUARING (CLOSURE)

| | A | B | C | D |
|---|---|---|---|---|
| A | = | MEETS | PREC | PREC |
| B | MET-BY | = | MEETS | PREC |
| C | FOLL | MET-BY | = | MEETS |
| D | FOLL | FOLL | MET-BY | = |

| A | B | C | D |
|---|---|---|---|

DEDUCED RELATIONS

Fig. 5

| | PI | GI | AI | BI | CI |
|---|---|---|---|---|---|
| PI | = | | | | |
| GI | S | = | | | |
| AI | S | | = | m | |
| BI | | | | = | m |
| CI | F | | | | = |

FIG. 6a

| | PI | GI | AI | BI | CI |
|---|---|---|---|---|---|
| PI | = | si | si | d | fi |
| GI | S | = | (= s si) | p | p |
| AI | S | (= s si) | = | m | p |
| BI | di | pi | mi | = | m |
| CI | F | pi | pi | mi | = |

FIG. 6b

INTERVAL RELATION TO ENDPOINT RELATION TABLE

Interval Relation Key

All -> True
NIL -> False
= -> Equals
< -> Precedes
D -> During
M -> Meets
O -> Overlaps
S -> Starts
F -> Finishes
> -> Follows
DI -> Includes
MI -> Met-By
OI -> Overlapped
SI -> Started-By
FI -> Finished-By '*' or '?' implies no relationship

| | | | | | |
|---|---|---|---|---|---|
| 1. | NIL | | | | |
| | | X- * Y-, | X- * Y+, | X+ * Y-, | X+ * Y+ |
| 2. | (=) | | | | |
| | | X- = Y-, | X- < Y+, | X+ > Y-, | X+ = Y+ |
| 3. | (<) | | | | |
| | | X- < Y-, | X- < Y+, | X+ < Y-, | X+ < Y+ |
| 4. | (>) | | | | |
| | | X- > Y-, | X- > Y+, | X+ > Y-, | X+ > Y+ |
| 5. | (D) | | | | |
| | | X- > Y-, | X- < Y+, | X+ > Y-, | X+ < Y+ |
| 6. | (= D) | | | | |
| | | X- > Y-, | X- < Y+, | X+ > Y-, | X+ < Y+ |
| 6a. | | X- = Y-, | X- < Y+, | X+ > Y-, | X+ = Y+ |
| 7. | (DI) | | | | |
| | | X- < Y-, | X- < Y+, | X+ > Y-, | X+ > Y+ |
| 8. | (= DI) | | | | |
| | | X- < Y-, | X- < Y+, | X+ > Y-, | X+ > Y+ |
| 8a. | | X- = Y-, | X- < Y+, | X+ > Y-, | X+ = Y+ |
| 9. | (O) | | | | |
| | | X- < Y-, | X- < Y+, | X+ > Y-, | X+ = Y+ |
| 10. | (= O) | | | | |
| | | X- < Y-, | X- < Y+, | X+ > Y-, | X+ < Y+ |
| 10a. | | X- = Y-, | X- < Y+, | X+ > Y-, | X+ = Y+ |
| 11. | (< O) | | | | |
| | | X- < Y-, | X- < Y+, | X+ <> Y-, | X+ < Y+ |
| 12. | (= < O) | | | | |
| | | X- < Y-, | X- < Y+, | X+ <> Y-, | X+ < Y+ |
| 12a. | | X- = Y-, | X- < Y+, | X+ <> Y-, | X+ = Y+ |
| 13. | (D O) | | | | |
| | | X- <> Y-, | X- < Y+, | X+ > Y-, | X+ < Y+ |
| 14. | (= D O) | | | | |
| | | X- ? Y-, | X- < Y+, | X+ > Y-, | X+ < Y+ |
| 14a. | | X- ? Y-, | X- < Y+, | X+ > Y-, | X+ = Y+ |
| 15. | (< D O) | | | | |
| | | X- <> Y-, | X- < Y+, | X+ <> Y-, | X+ < Y+ |
| 16. | (= < D O) | | | | |
| | | X- ? Y-, | X- < Y+, | X+ <> Y-, | X+ < Y+ |
| 16a. | | X- ? Y-, | X- < Y+, | X+ <> Y-, | X+ = Y+ |
| 17. | (DI O) | | | | |
| | | X- < Y-, | X- < Y+, | X+ > Y-, | X+ <> Y+ |
| 18. | (= DI O) | | | | |

Fig. 7a

```
                X- < Y-,   X-  <  Y+,   X+  >  Y-,   X+  ?  Y+
18a.            X- = Y-,   X-  <  Y+,   X+  >  Y-,   X+  ?  Y+
19.   (< DI O)
                X- < Y-,   X-  <  Y+,   X+  <>  Y-,   X+  <>  Y+
20.   (= < DI O)
                X- < Y-,   X-  <  Y+,   X+  <>  Y-;   X+  ?  Y+
20a.            X- = Y-,   X-  <  Y+,   X+  <>  Y-,   X+  ?  Y+
21.   (OI)
                X- > Y-,   X-  <  Y+,   X+  >  Y-,   X+  >  Y+
22.   (= OT)
                X- > Y-,   X-  <  Y+,   X+  >  Y-,   X+  >  Y+
22A.            X- = Y-,   X-  <  Y+,   X+  >  Y-,   X+  =  Y+
23.   (> OI)
                X- > Y-,   X-  <>  Y+,   X+  >  Y-,   X+  >  Y+
24.   (= > OI)
                X- > Y-,   X-  <>  Y+,   X+  >  Y-,   X+  >  Y+
24a.            X- = Y-,   X-  <>  Y+,   X+  >  Y-,   X+  =  Y+
25.   (D OI)
                X- > Y-,   X-  <  Y+,   X+  >  Y-,   X+  <>  Y+
26.   (= D OI)
                X- > Y-,   X-  <  Y+,   X+  >  Y-,   X+  ?  Y+
26a.            X- = Y-,   X-  <  Y+,   X+  >  Y-,   X+  ?  Y+
27.   (> D OI)
                X- > Y-,   X-  <>  Y+,   X+  >  Y-,   X+  <>  Y+
28.   (= DI OI)
                X- > Y-,   X-  <>  Y+,   X+  >  Y-,   X+  ?  Y+
28a.                 X- = Y-,   X-  <>  Y+,   X+  >  Y-,   X+  ?  Y+
29.   (DI OI)
                X- <> Y-,   X-  <  Y+,   X+  >  Y-,   X+  >  Y+
30.   (= DI OI)
                X- ? Y-,   X-  <  Y+,   X+  >  Y-,   X+  >  Y+
30a.                 X- ? Y-,   X-  <  Y+,   X+  >  Y-,   X+  =  Y+
31.   (> DI OI)
                X- <> Y-,   X-  <>  Y+,   X+  >  Y-,   X+  >  Y+
32.   (= > DI OI)
                X- ? Y-,   X-  <>  Y+,   X+  >  Y-,   X+  >  Y+
32a.            X- ? Y-,   X-  <>  Y+,   X+  >  Y-,   X+  =  Y+
33.   (D DI O OI)
                X- <> Y-,   X-  <  Y+,   X+  >  Y-,   X+  <>  Y+
34.   (= D DI O OI)
                X- ? Y-,   X-  <  Y+,   X+  >  Y-,   X+  ?  Y+
34a.            X- ? Y-,   X-  <  Y+,   X+  >  Y-,   X+  ?  Y+
35.   (< D DI O OI)
                X- <> Y-,   X-  <  Y+,   X+  <>  Y-,   X+  <>  Y+
36.   (= < D DI O OI)
                X- ? Y-,   X-  <  Y+,   X+  <>  Y-,   X+  ?  Y+
36a.            X- ? Y-,   X-  <  Y+,   X+  <>  Y-,   X+  ?  Y+
37.   (> D DI O OI)
                X- <> Y-,   X-  <>  Y+,   X+  >  Y-,   X+  <>  Y+
38.   (= > D DI O OI)
                X- ? Y-,   X-  <>  Y+,   X+  >  Y-,   X+  ?  Y+
38a.            X- ? Y-,   X-  <>  Y+,   X+  >  Y-,   X+  ?  Y+
39.   (< > D DI O OI)
                X- <> Y-,   X-  <>  Y+,   X+  <>  Y-,   X+  <>  Y+
40.   (= < > D DI O OI)
                X- ? Y-,   X-  <>  Y+,   X+  <>  Y-,   X+  ?  Y+
40a.            X- ? Y-,   X-  <>  Y+,   X+  <>  Y-,   X+  ?  Y+
41.   (M)
                X- < Y-,   X-  <  Y+,   X+  =  Y-,   X+  <  Y+
42.   (< M)
                X- < Y-,   X-  <  Y+,   X+  <=  Y-,   X+  <  Y+
43.   (O M)
```

Fig. 7b

```
            X- < Y-,   X-  <  Y+,   X+  >=  Y-,   X+  <  Y+
44. (= O M)
            X- < Y-,   X-  <  Y+,   X+  >=  Y-,   X+  <  Y+
44a.        X- = Y-,   X-  <  Y+,   X+  >=  Y-,   X+  =  Y+
45.  (< O M)
            X- < Y-,   X-  <  Y+,   X+  ?  Y-,   X+  <  Y+
46.  (= < O M)
            X- < Y-,   X-  <  Y+,   X+  ?  Y-,   X+  <  Y+
46a.        X- = Y-,   X-  <  Y+,   X+  ?  Y-,   X+  =  Y+
47.  (D O M)
            X- <> Y-,   X-  <  Y+,   X+  >=  Y-,   X+  <  Y+
48.  (= D O M)
            X- ? Y-,   X-  <  Y+,   X+  >=  Y-,   X+  <  Y+
48a.        X- ? Y-,   X-  <  Y+,   X+  >=  Y-,   X+  =  Y+
49.  (< D O M)
            X- <> Y-,   X-  <  Y+,   X+  ?  Y-,   X+  <  Y+
50.  (= < D O M)
            X- ? Y-,   X-  <  Y+,   X+  ?  Y-,   X+  <  Y+
50a.        X- ? Y-,   X-  <  Y+,   X+  ?  Y-,   X+  =  Y+
51.  (DI O M)
            X- < Y-,   X-  <  Y+,   X+  >=  Y-,   X+  <>  Y+
52.  (= DI O M)
            X- < Y-,   X-  <  Y+,   X+  >=  Y-,   X+  ?  Y+
52a.        X- = Y-,   X-  <  Y+,   X+  >=  Y-,   X+  ?  Y+
53.  (< DI O M)
            X- < Y-,   X-  <  Y+,   X+  ?  Y-,   X+  <>  Y+
54.  (= < DI O M)
            X- < Y-,   X-  <  Y+,   X+  ?  Y-,   X+  ?  Y+
54a.        X- = Y-,   X-  <  Y+,   X+  ?  Y-,   X+  ?  Y+
55.  (D DI O OI M)
            X- <> Y-,   X-  <  Y+,   X+  >=  Y-,   X+  <>  Y+
56.  (= D DI O OI M)
            X- ? Y-,   X-  <  Y+,   X+  >=  Y-,   X+  ?  Y+
56a.        X- ? Y-,   X-  <  Y+,   X+  >=  Y-,   X+  ?  Y+
57.  (< D DI O OI M)
            X- <> Y-,   X-  <  Y+,   X+  ?  Y-,   X+  <>  Y+
58.  (= < D DI O OI M)
            X- ? Y-,   X-  <  Y+,   X+  ?  Y-,   X+  ?  Y+
58a.        X- ? Y-,   X-  <  Y+,   X+  ?  Y-,   X+  ?  Y+
59.  (> D DI O OI M)
            X- <> Y-,   X-  <>  Y+,   X+  >=  Y-,   X+  <>  Y+
60.  (= > D DI O OI M)
            X- ? Y-,   X-  <>  Y+,   X+  >=  Y-,   X+  ?  Y+
60a.        X- ? Y-,   X-  <>  Y+,   X+  >=  Y-,   X+  ?  Y+
61.  (< > D DI O OI M)
            X- <> Y-,   X-  <>  Y+,   X+  ?  Y-,   X+  <>  Y+
62.  (= < > D DI O OI M)
            X- ? Y-,   X-  <>  Y+,   X+  ?  Y-,   X+  ?  Y+
62a.              X- ? Y-,   X-  <>  Y+,   X+  ?  Y-,   X+  ?  Y+
63.  (MI)
            X- > Y-,   X-  =  Y+,   X+  >  Y-,   X+  >  Y+
64.  (> MI)
            X- > Y-,   X-  >=  Y+,   X+  >  Y-,   X+  >  Y+
65.  (OI MI)
            X- > Y-,   X-  <=  Y+,   X+  >  Y-,   X+  >  Y+
66.  (= OI MI)
            X- > Y-,   X-  <=  Y+,   X+  >  Y-,   X+  >  Y+
66a.        X- = Y-,   X-  <=  Y+,   X+  >  Y-,   X+  =  Y+
67.  (> OI MI)
            X- > Y-,   X-  ?  Y+,   X+  >  Y-,   X+  >  Y+
68.  (= > OI MI)
            X- > Y-,   X-  ?  Y+,   X+  >  Y-,   X+  >  Y+
```

Fig. 7c

INCREMENTALLY BUILDING
A MEDIA SCHEDULE

Constituents

ConstituentMap
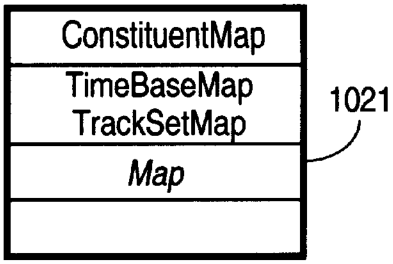
Composition.
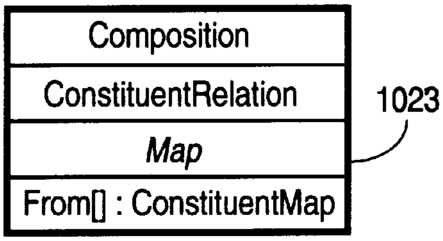
Representation.
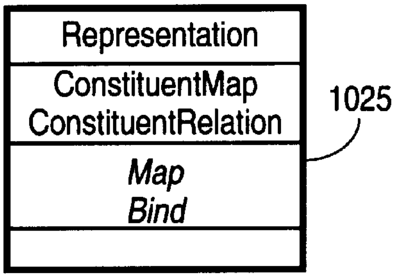
Association.
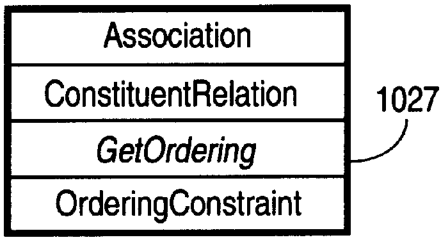
Fig. 10f

Proxy Support.
- Proxy Mixin
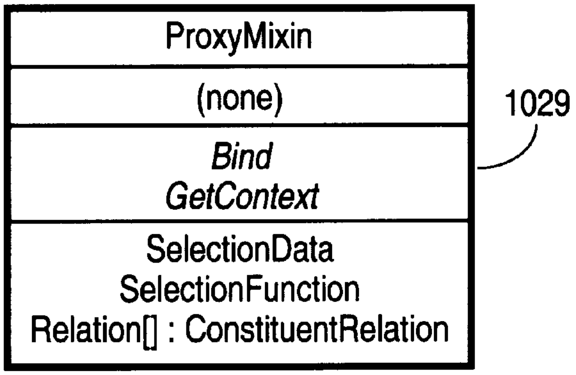
ProxyComposition.
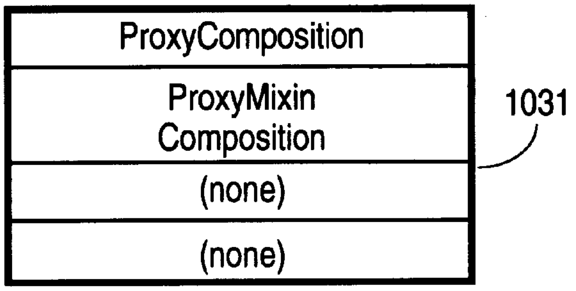
ProxyRepresentation.
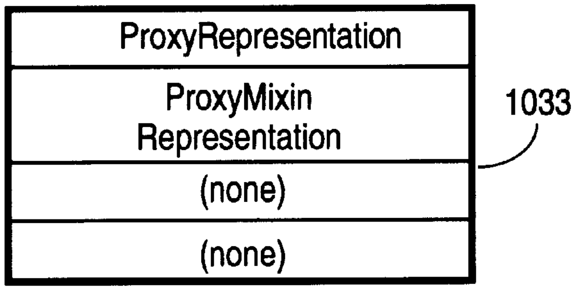
Fig. 10g

SIMPLE A MEETS B

| | |
|---|---|
| A | B |

TRANSLATES TO :

$A^- < A^+$
$B^- < B^+$
} BY DEFINITION $A^- < B^-$
$A^- < B^+$ $A^+ = B^-$
$A^+ < B^+$

AFTER TOPOLOGICALLY SORTING, WE GET THE SEQUENCE $A^- < \binom{A^+}{B^-} < B^+$

OR IN DIRECTED GRAPH FORM $A^- \longrightarrow \binom{A^+}{B^-} \longrightarrow B^+$

ANNOTATING DURATIONS GIVES $A^- \xrightarrow{30} \binom{A^+}{B^-} \xrightarrow{20} B^+$

FROM THE GRAPH AND DURATIONS

DURATIONS ARE EQUIVILENT TO AN OFFSET VALUE BETWEEN START AND END ENDPOINTS $X^- - X^+ =$ DURATION

OR $X^+$ OFFSET FROM $X^-$ BY DURATION

FIG. 22b

```
PLAY (elt: element)
  rep = GetRepresentation(elt)
  if rep != NULL
    PLAY(rep)
  else


  comp = Get Composition(elt)
  if comp = NULL
    error(no_playable_representation.elt)
  else
    ep_seq = GetEndPointSequence(comp)
    for each endpoint_set EPS in ep_seq DO
      for each endpoint EP in EPS DO
        if Timed(EPS)
          Wait(Timed(EPS))
        else if Trigger(eps)
          Wait(Trigger(EPS))
        endif
        if (is_start(EP))
          Play(FindElement(EP))
        else
          Stop(FindElement(EP))
        endif
      endfor
    endfor
  endif
 endif
end PLAY


PLAY (mat: material)
  rep = GetRepresentation(mat)
  if rep != NULL
    PLAY(rep)
  else
    comp = GetComposition(mat)
    if comp = NULL
      error(no_playable_representation,mat)
    else
      ep_seq = GetEndPointSequence(comp)
      for each endpoint_set EPS in ep_seq DO
        for each endpoint EP in EPS DO
          if TimedOrTrigger(EPS)
            Wait(TimeOrTrigger(EPS))
          endif
          if (is_start(EP))
            Play(FindMaterial(EP))
          else
            Stop(FindMaterial(EP))
          endif
        endfor
      endfor
    endif
  endif
end PLAY
```

Fig. 24a

```
Media play is simpler

PLAY (med: media)
  Start(med, GetTimes(med))
end PLAY

GetRepresentation(elt_or_mat : element or material)
  local rep
  set rep = internal slot value of representation
  if rep != NULL
    rep = Verify(rep) -- if this is a proxy, the proxy returns the best rep
  endif
  return rep



endGetRepresentation

GetComposition is the same

GetComposition(elt_or_mat : element or material)
  local comp
  set comp = internal slot value of composition
  if rep != NULL
    comp = Verify(comp) -- if this is a proxy, the proxy returns the bes
comp
  endif
  return comp
endGetComposition
```

Fig. 24b

METHOD AND APPARATUS FOR MANIFESTING REPRESENTATIONS OF SCHEDULED ELEMENTS IN A BROADCAST ENVIRONMENT

BACKGROUND OF THE INVENTION

1. Field of the Invention

The present invention relates to the field of broadcasting. More particularly, the present invention relates to computer control of broadcasts.

2. Art Background

When broadcast technology was in its infancy, the process of scheduling of broadcasts and control of the equipment to generate the broadcasts were quite simple and typically were done manually. However, as broadcast systems have become more sophisticated, the problem of managing broadcasts and scheduling events which form broadcasts have become quite significant.

Regarding management of broadcasts, the technology today provides broadcast events (e.g. programs) from a variety of sources. For example, feeds may originate from a satellite receiver, from a videotape, from a television camera, from an internal line from a computer, etc. The same event broadcast in two different time zones may use a live feed from a satellite for a broadcast in one time zone and a videotape of the earlier live feed for a later broadcast in a second time zone.

Scheduling of broadcasts have become complex too. The organization and broadcast of commercials during programming typically have many broadcast constraints that must be followed. Some events are of unknown duration, making it extremely difficult to program subsequent to that event. Some events are programmed in parallel with other events, the operator of the broadcast, at time of broadcast, deciding which event to broadcast.

In addition, the management of live broadcasts have become complex. This type of program, such as a news program, is difficult to schedule in advance as the timing of information received, the amount of time taken for different portions of the broadcast and the broadcast resources change. For example, the duration of lead ins provided by the news anchor can vary. The live feed showing the news reporter at the story location may not be available. The importance of certain stories may change. To address such issues, a news program director will have story segments of varying lengths available and will typically dynamically modify the news broadcast based on the various timing requirements and known available resources.

Therefore, it is desirable to have a multiple channel shared resource, broadcast capability that handles various activities such as editing, news and commercial insertion, including live events, definition of schedule patterns that apply across several channels, mapping output channels to different uplink channels at different times, and integration of digital data and control with the uplinked video signals.

Computer controlled equipment is already an integral element in today's broadcast industry. Automation systems provide frame-accurate control of equipment; non-linear editors assemble material without the restrictions of tape-based linear systems; traffic systems deal with the complexities of scheduling commercial and spot play; computer graphics systems create new video effects and illustrations; news systems edit scripts, tie them to clips, and provide searchable archives.

However, the increasing prevalence of these independently designed computer-based systems does not automatically guarantee the smooth integration of these systems into a coherent, unified broadcast operation. To the contrary, these systems typically cannot "talk" to each other without creation of specialized "gateways" which attempt to perform a translation between systems. A customer's only alternative to this problem is to purchase "single-vendor" systems which require the user to discard their investments in pre-existing systems and use equipment that does not always meet all of their needs.

Compounding this problem is the need for enhanced capabilities while maintaining a simple operational structure. For example, it is desirable to generalize programming, e.g., of particular commercial breaks, such that they can be used a number of times, varying the commercials that form the break. Prior art structures, e.g., Open Media Framework Interchange (OMFI), created by AVID Technologies, provides a unified data structure which maintains as a combined entity the programming and the material used to implement the programming.

In addition, the broadcast industry generally uses simple time-based techniques for specifying the order of events, such as program events, commercials, run-downs and edit lists. These techniques define some combination of exact or approximate values for the start and duration of each event, and typically add some constraints, such as auto-follow, hard start or manual trigger. The list is then sorted by time. Ripple rules, complex, specialized rules which adjust start times of subsequent events based on the change of start time or duration of an event, are applied to adjust the timing of events when needed.

While this approach works satisfactorily when the start or duration of each event are known, the increasing prevalence of untimed or live events place difficult burdens on the definition of timing and the processing of complex ripple rules for any such system. The term origination refers to when video transmission begins at the facility. Multichannel origination occurs, for example, when the signal representative of video to be broadcast comes from a tape, a disk drive, or be a live event being shot at the facility. Turnaround is used when the video signal originates somewhere else, is brought into the facility and immediately re-transmitted. Multichannel origination also complicates the definition of a broadcast. Furthermore, non-linear, disk-based playout, which refers to the current technology of disk drives which have both sufficient capacity and sufficient bandwidth to support the recording and real time playback of video, also causes problems as it is not sequential or linear as any frame of video can be directly accessed much as an individual record in a computer database. Thus significant problems can occur, particularly when there are live events with no duration and when there are subsequent events the start times of which cannot be changed. These systems fail to capture the basic time independent ordering constraints among the set of events to be defined for a broadcast or portion of a broadcast.

SUMMARY OF THE INVENTION

The present invention provides an innovative system and method of operating the same which provides broadcast personnel who schedule broadcasts, editors who edit all or portions of a broadcast, and operators who control the broadcast equipment or resources used to generate a broadcast, information and guidance regarding the broadcast schedule, constraints regarding timing and resource availability, and identification of resources to be used to generate broadcasts.

The system utilizes a data structure which separates broadcast information into three constituent types: a scheduling segment (when to play), a material segment (what to play), and a media segment (how to play) and three types of relationships among the constituents: composition (how to create), representation (how to manifest) and association (how to order). Using the three basic constituents and three basic relationships most any broadcast situation can be modeled. This integrated data structure, and process utilizing the same, supports the management of events, material, media and playback resources. The structure supports any number of levels of abstraction for dealing with the complexities of modern broadcast, editing and news room applications. The structure separates the compositional aspects of broadcast operations (the pieces that make up the compositional pieces, e.g., a program or story) from the representational aspects (the material that manifests the specified compositional pieces). As such, it differs significantly from other industry attempts to provide a unified data structure which do not separate the programmatic intent from the actual material which implements that intent.

In one embodiment, the data structure is a simple, recursive, two-level information structure that is easily conformed to the commonly accepted abstractions of the industry such as rundown, event, story, program, pod, schedule and channel, as well as new abstractions that meet the needs of an increasingly complex industry. Sequencing constraints may be applied to elements in a time-independent manner. In addition, this two-level recursive structure is independently applied to both the compositional and representational aspects, supporting a rich expressiveness for planning, operating and reporting the actions of a complete broadcast operation.

The model generated can then be used a variety of ways across varying pieces of equipment. For example, the model can be used to control access to broadcast equipment to insure that certain equipment, e.g., VTRs, satellite receivers, etc., are available when needed during a broadcast. The system can also provide the operator of the broadcast equipment programming guidance by identifying applicable parallel programming and eliminating parallel programming that was scheduled but can not be utilized. In addition, last minute changes that conflict with preexisting scheduling requirements can be immediately identified.

Furthermore, the scheduling process is simplified, by enabling the scheduler to reuse standard programming sequences, e.g., nightly news programs, certain commercial spot sequences, varying simply the material and/or media used to embodied the particular instance. In addition, the model can identify scheduling conflicts. In addition, the structure can be used in an editing system to enable the edit to immediately determine the effects of edits and whether certain edits can be implemented. Finally, the structure can be used to track what is actually broadcasted, a feature that is important for tracking costs and income generated.

In addition to the data structure, it is preferred that the system utilizes techniques which overcome the limitation of time-based solutions of event scheduling in broadcast programming. Thus, each event, for example, commercial, television program, public service announcement or news story, is defined relative to other events to be programmed. More particularly, each event is defined as either an instantiated or uninstantiated start point and end point. Once each event is defined, the relationships among the different events are generated. The resultant information provides a set of instructions regarding the order of the programming of the broadcast.

BRIEF DESCRIPTION OF THE DRAWINGS

The objects, features and advantages of the present invention will be apparent to one skilled in the art from the following detailed description in which:

FIG. 3 is a table illustrating atomic interval relationships that can be used to define the ordering of events.

FIGS. 4*a*, 4*b*, 4*c*, 4*d*, 4*e*, 4*f*, 4*g*, 4*h*, 4*i*, 4*j*, 4*k*, 4*l*, 4*m*, 4*n*, 4*o*, 4*p*, 4*q*, 4*r*, 4*s*, 4*t*, 4*u*, 4*v*, 4*w*, 4*x*, 4*y*, 4*z* list the subset of 868 interval relations.

FIG. 5 illustrate an example of a constraint matrix and a corresponding relationship matrix.

FIGS. 6*a* and 6*b* illustrate a simplified example of a constraint matrix and relationship matrix for a pod.

FIGS. 7*a*, 7*b*, 7*c* illustrates a portion of an exemplary table used to generate SOM and EOM for two intervals based upon interval relationships.

FIGS. 24*a* and 24*b* set forth exemplary pseudo code illustrating one embodiment of the broadcast process.

DETAILED DESCRIPTION

The system and method of the present invention provides an innovative structure that provides enhanced capabilities for different portions of the broadcasting process and easily lends itself to be implemented across varying platforms. More particularly, the system and method of the present invention utilizes an innovative structure that permits a flexible but definable schedule of broadcasts and the physical entities and devices used to generate the broadcasts. As the structure separates the compositional aspects of broadcast operations from the material that manifests the pieces of the composition, the structure supports multiple levels of abstraction and definition. In the following description, for purposes of explanation, numerous details are set forth, in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The system of the present invention and its operation is discussed in part in the context of object oriented technology. However, the present invention is not limited as such and can be implemented using other programming and data structure technologies and can be implemented as a series of procedures that embodied the relationships and functions described herein.

Figure 1:
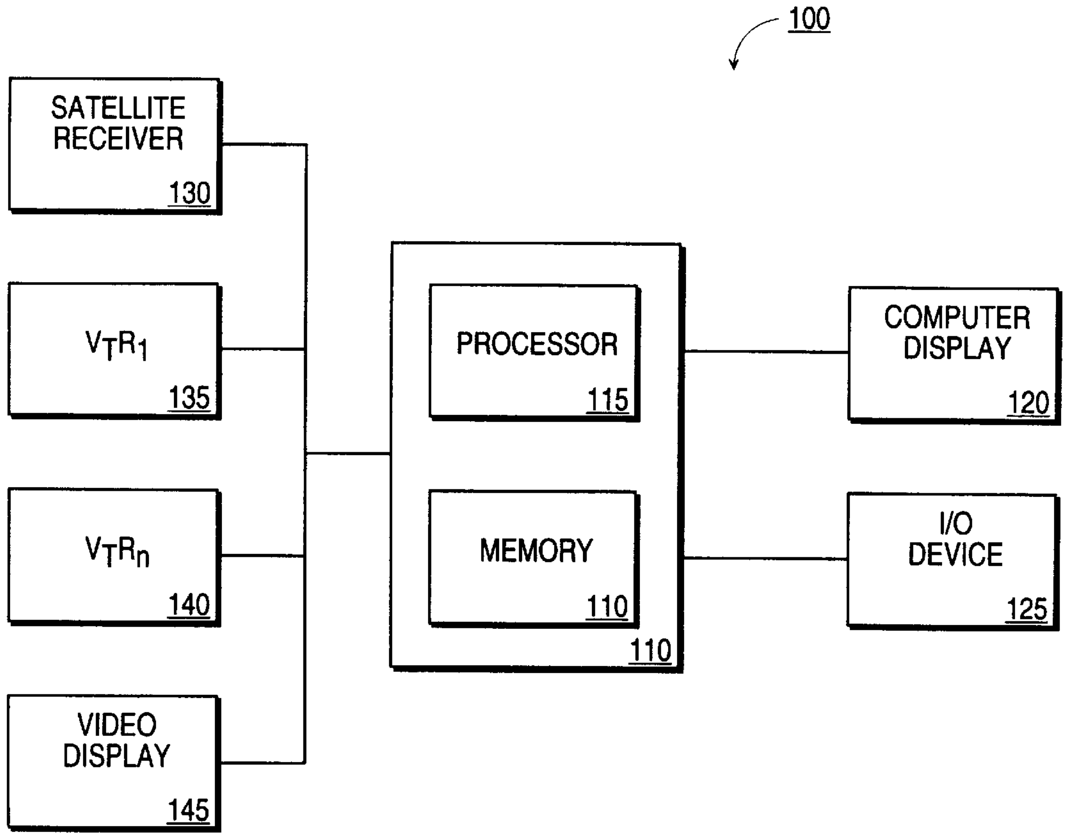
FIG. 1 illustrates an exemplary system which operates in accordance with the teachings of the present invention.

One example of a system that operates in accordance with the teaching of the present invention is illustrated in FIG. 1. The system illustrated in FIG. 1 is a simplified system so as to not obscure the discussion of the present invention. It is readily apparent to one skilled in the art that a variety of different systems may be used. For example, the system that will be described includes a number of video terminal recorders (VTR), a satellite receiver and the like. However, the teachings may be incorporated in a system without these devices. In particular, the configuration of the system utilized will be adapted to the end user. For example, the system may be an editing system, a control panel used by a news program director, a control system used by a broadcast operator, or an accounting system utilized by accountants and billing personnel for a particular station. The system is configured in accordance with the teachings of the present invention to provide guidance as to the constraints of the programming of a broadcast, and, subsequent to the broadcast, exactly what was broadcasted.

Furthermore, the teachings of the present invention may be incorporated into a complex broadcast system that is typically found in broadcast centers today. Such systems may include additional equipment such as editing equipment, switchers, and equipment used to support other media not discussed herein. In addition, it is contemplated that the system functions as a computer server wherein broadcast specific equipment or other computing devices access the server for broadcast information.

Referring to FIG. 1, the system includes a computer system 105, for example, a general purpose computer system or specially configured computer system. The system 105 includes memory 110 and a processor 115, as well as supporting peripheral devices. In addition, the system 105 is coupled to a display 120, which in the present embodiment displays the output generated by the system 105. An input/output device 125 also is provided to enable the user of the system to input information. Examples of such a device 125 include a keyboard, a mouse or other input device.

In the present embodiment, the system 105 is coupled to a variety of media devices that provide video output and video recording features. For example, a satellite receiver 130 receives programming for broadcast. VTRs 135, 140, can function to provide programming for broadcast, as well as record programming received through the satellite receiver 130 for later broadcast. A video display 145 may be coupled to the computer system 105 to generate a video display of programming provided by satellite receiver 130 or VTRs 135, 140. Using a system, the user can perform a variety of broadcast related operations.

The system described herein preferably includes an innovative system and method for sequencing complex and untimed events across broadcast activities, such as editing, programming of broadcasts, spot insertion and scheduling of events during news programs. In addition, it is preferred that the system includes a basic data structure that readily adapts itself to a variety of computing platforms and portions of the broadcasting process, including the scheduling, editing, broadcasting and accountings performed related to programs and broadcasts. However, it is contemplated that the system and method for sequencing complex and untimed events does not have to operate using the innovative data structure and associated processes described herein. Similarly, the data structure and associated processes described herein can utilize other techniques for specifying temporal relationships between scheduling constituents.

Figure 2:
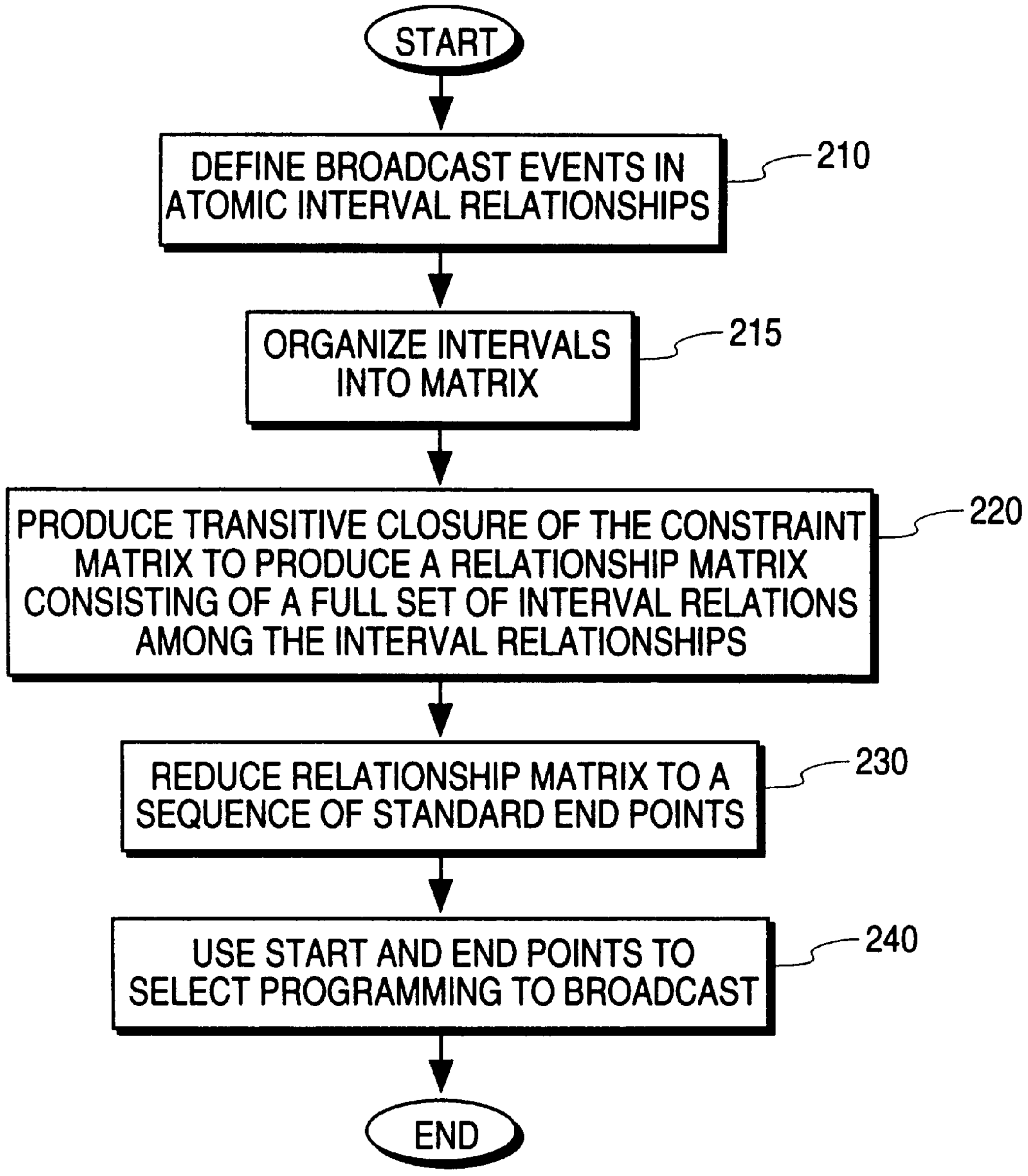
FIG. 2 is a flow chart illustrating one embodiment of the present invention.

The process for sequencing complex and untimed events is described with reference to FIG. 2. At step 210 the broadcast events are defined in terms of interval relationships between intervals (an interval, unless otherwise noted consists of start points and end points). At step 215, the intervals are organized in a matrix. At step 220 the transitive closure of the constraint matrix is performed to produce a relationship matrix consisting of a full set of interval relationships from the interval relationships defined. At step 230, the relationship matrix is reduced to a sequence of start and end points of the different events. These start and end points can be used to assist or constrain a user in performing programming of broadcasts. In addition, this information can be used to determine availability of the necessary equipment used to perform the actual broadcast, or to control the equipment needed to perform the broadcast.

Thus, the first step is to define the broadcast events and atomic interval relationships. An interval is a term given to a finite segment of time regardless of whether the interval specifies exact time values. Intervals without exact time values are identified to be uninstantiated. For example, an interval can be defined as a pair of end points (i.e., start point and end point) which can have real values. Intervals are instantiated by citing time values that correspond to the end points of the interval. For example, with respect to video that may be part of a broadcast, video clips are bound in segments containing one or more frames. The first frame of a clip is the start of message (SOM); the last frame is the end of message (EOM). In the present illustration in order that the matrix operates properly and to account for the peculiarities in which video frames are counted, the EOM is set to a value equal to EOM+1.

There are thirteen possible atomic relationships between any two intervals. These thirteen atomic relationships define most of the usual specifications of event sequencing of a broadcast. These atomic relationships are shown in FIG. 3. For example, with respect to broadcasting, the relationship can be used to define an auto-follow function, which is a function in which one program automatically follows a prior program broadcast, or the relationship can be used to trigger a broadcast of a certain program.

Some functions, such as alternate or parallel playlists of programming to be broadcast, must be expressed using disjunctive combinations of the atomic relations. To meet these requirements, a maximal subset consisting of 868 relations is used. This subset is referred to in published literature as the ORD-Horn Clause Set and is set forth in FIGS. 4*a*–4*s*. This subset of 868 relations is a subset of a total 8192 such combinations of the basic thirteen atomic relations. This subset enables the solution of the matrix subsequently solved to be performed in polynomial real time. Thus, given any set of video clips, the user need only specify pair wise relationships among the members of the set. For example, a commercial break can be specified by the clip that starts the break, the one which ends it, and the sequence of clips in between. In order to correctly and completely specify the endpoint sequence which results from this organization of clips, it is necessary to determine all unspecified relationships as well. The unspecified relations in the present example are the relationships between non-adjacent clips in the sequence.

Using a simple algorithm referred to as binary constraint propagation (BCP), these unspecified relationships can be determined. BCP is known in the computer art. For details on BCP, see, for example, Ladkin, P. and Maddux, R. "On Binary Constraint Problems", Journal of the Association for Computing Machinery, 41(3): 435–469 (1994).

To utilize BCP, the intervals defined are organized into a constraint matrix wherein the matrix entries are the interval relations between pairs of intervals. Thus one entry may be specified, for example, as "A meets B". Some interval relations may be unspecified. Any entry that is unspecified is set to "true" to indicate that the relation could be any one of the atomic relations and can also be used to state that one interval has no relation to the other interval.

The constraint matrix has certain properties that make it possible to use a simple algorithm to close or solve for the unspecified interval relations. The matrix lists the intervals relations across the rows and down the columns, wherein each entry defines the relationship between a pair of intervals. Entries on the diagonal therefore define how an interval relates to itself. Thus, the diagonal entries are equality (e.g., interval x=interval x), and the entry for any given row or column is the converse of the entry for the corresponding column or row (e.g., interval x follows interval y implies interval y precedes interval x). Thus, the constraint matrix is triangular with equality on the diagonal. Given these conditions, the constraint matrix can be closed in polynomial time by repeatedly squaring the matrix until the entries cease to change. An example of a constraint matrix and a corresponding relationship matrix are illustrated in FIG. 5.

FIG. 6*a* and FIG. 6*b* illustrate the following simplified example. A commercial pod F is defined as a group of three elements A, B, C which play in a back to back sequence starting at the beginning of a commercial break of a broadcast. The break is triggered by a GPI, G. By definition, each element has an interval which is identified by appending I to the name. The constraint matrix therefore looks like that shown in FIG. 6*a*, where=represents the equal relationship, s represents the starts relationship, m represents the meets relationship and f represents the finishes relationship. Those entries in the matrix not filled in default to the true relationship (true indicates that any relation is possible). As stated above and as shown in FIG. 6*a*, the diagonal is always set to the equality relationship.

FIG. 6*b* illustrates the relationship matrix generated using BCP, wherein si represents the started by relationship, d represents the during relationship, fi represents the finished by relationship, p represents the precedes relationship, pi represents the follows relationship, mi represents the met by relationship and di represents the includes relationship. A few things of note. This illustration shows the diagonal symmetry of the matrix where the transposed values are the converse of each other (e.g., meets and met by). In addition, there are three possible relations between GI and AI. GI either starts AI (GI is shorter than AI), is started by AI (GI is longer than AI) or is equal to AI (GI and AI are the same length). Similarly, although not illustrated in FIG. 6*b*, the p relations (for GI–CI) are really composed of p, m and o (precedes, meets or overlaps). However, as it is known the a GPI is the shortest element, the specification can be changed to state that GI starts AI and eliminate other possibilities. Similarly, the GI–CI relationship is simplified. Even if the specification was not performed to eliminate the other relations, the endpoint sequences specified for the pod are unambiguous and capture the autofollow relations intended.

Preferably, a table lookup is performed in place of an arithmetic application and the results are intersected instead of arithmetically added. For further information on closing the matrix using table lookup, see, Allen, J., *Temporal Reasoning and Planning*, in Allen, Kautz, Pelavin and Teneberg, eds, *Reasoning about Plans*, pp 1–67 (Morgan-Kaufmann 1991) and Ladkin, P and Maddux, R., *On Binary Constraint Problems*, Journal of the Association for Computing Machinery, 41(3):435–469 (1994) (see in particular the equations on page 439 and Table II). As noted above, due to the nature of the matrix, the closure process is guaranteed terminate. Furthermore, due to the subset chosen, the process executes in polynomial time, thereby providing a realistic implementation of the process for providing broadcast programming and operational information to the user.

The result of the closure operation is the full set of interval relations among all the intervals as define in the resulting relationship matrix. Any remaining entries still identified as "true" in the relationship matrix after closure, indicates that the user specified set of interval relations is incomplete and cannot be turned into a completed schedule of broadcasts. The relationship matrix also shows exactly if any pairs of intervals are in conflict. If any entries are identified as "false", then the user has specified an inconsistency in relationships which must be corrected before the schedule is complete.

The BCP algorithm is used in the present embodiment. However, other algorithms can be used to provide a solution to the constraint matrix. For example, one alternative is Path Consistency. Path Consistency can be used to find a single correct sequence of events through matrix (BCP will find all correct sequences). The thoroughness of BCP makes it a preferred technique for video broadcasts, since it calculates all possible paths, including alternate paths, and can identify any unspecified relationship. Path consistency is useful during dynamic operations such as a user manipulating a schedule where it is important to quickly determine if there is a feasible solution without having to calculate all side effects. Thus, another embodiment of the system may be one that provides BCP and path consistency based on the desired output needed.

The representations are illustrated herein using characters. As is readily apparent to one skilled in the art, a variety of encodings can be used. However, it is preferred that the relations are encoded as binary numbers where each bit represents one of the 13 atomic relations. An OR of relations is then expressed by setting multiple bits in the number. The true relation is thus specified as all bits are set and the false relation is specified as no bits are set. Thus in the present embodiment the following encodings are used (0x indicates to interpret the following value as a hexadecimal number).

| | | | |
|---|---|---|---|
| p | 0x0002 | pi | 0x0200 |
| d | 0x0004 | di | 0x0400 |
| s | 0x0008 | si | 0x0800 |
| f | 0x0010 | fi | 0x1000 |
| m | 0x0020 | mi | 0x2000 |
| o | 0x0040 | oi | 0x4000 |
| = | 0x0101 | | |
| t | 0xFFFF | | |
| f | 0x0000 | | |

This embodiment enables the creation of the converse of any relationship between endpoints by swapping the upper and lower bytes of the number. Since equals is its own converse, it is the only 2 bit relation.

To perform a lookup of the endpoint relations corresponding to any given interval relation, the endpoint relations are stored in a hash table whose key is the value of the interval relation encoded above. To look up the composition of two interval relations (needed during the matrix multiplication process), the composed values are stored in a 13×13 matrix where each entry is the composition of a single relation to a single relation. In practice, with the above encoding of relations, the proper row/column index is found directly as the bit position of each relation with appropriate adjustment for the equals position, and that not all of the low order bits are used in each byte. Therefore a table lookup is a composition of two simple (non-ORed) relations. When an OR is involved, e.g., compose (=p) with (m o), the algorithm looks up the four combinations of the individual relations and ORs them together to get the composition result.

It can therefore be seen that as BCP performs repeated squarings of the interval matrix, using a table look up the square operation is preferably performed exactly as multiplying two numeric matrices except that composition substitutes for multiplication and logical intersection substitutes for addition.

Once the relationships have been determined, the relationship matrix is reduced to a sequence of endpoints (SOM and EOM). The sequence is a list of endpoints in the order needed to satisfy the interval relations. Preferably the sequence is generated by referencing a table that provide the corresponding SOM and EOM for two intervals based upon the interval relationship between the two intervals defined in the relationship matrix. A portion of an exemplary table, for relations 1 through 68, used is shown in FIGS. 7_a_–7_c_.

It should be noted that some members of the sequence of endpoints may be a cluster of endpoints denoting simultaneity. For example, events in auto-follow mode will create EOM/SOM pairs to show that one starts exactly when the other one finishes. Therefore, preferably, the sequence of endpoints is created via a two-step process. First, the interval relation matrix is converted to a matrix of endpoint relations by a look-up process on each entry (one interval relation yields six endpoint relations). The endpoint relations are then sorted to produce the sequence. The sort should take account of possible bifurcation in the endpoint relations which may result in multiple sequences. Preferably, the matrix is topologically sorted to produce the final sequence. To topologically sort, a complete sequence of elements, for which there is only a partial ordering, is arranged. For example, if the endpoint relations are A<B, B<D, A<C, then there are several possible total sequences that satisfy the constraints: ABDC, ABCD, ACBD. This also is an example of how multiple possible sequences exist for a set of endpoint relations. Multiple sequences imply points of departure for alternate schedules where runtime choice is made. It may also be that multiple schedules converge back to a single endpoint which implies a rejoining of the schedules. In practice, as will be apparent to one skilled in the art, this two step process can be reduced to one step, requiring only a single traversal of the interval relations in the matrix.

The system and method of the present invention provide a powerful tool for a user to determine a schedule of programming as well as to allocate resources to use to provide programming.

One example is the use of the present invention to schedule operations which utilize broadcast equipment such as video tape recorder (VTR) equipment. In the broadcasting field, events can be viewed as something that happens to equipment, people or accounting/tracking systems. For example, an event might be a programmed event which is an event related to an actual programmed commercial break, a cut (A cut is a change in the video signal from one source to another. This change happens between 2 video frames, one from the first source, the second from the other source), a switcher event (a switcher is a device that has as input 2 video sources and transition the video output between the two sources over a period of time, e.g., 1 second), or a GPI trigger (a General Purpose Interrupt (GPI) is an electrical contact closure that causes some other action to occur, such as starting a VTR to play or stop). The above exemplary events can be defined by pairs of interval relations.

In the present example, the events are operations defined by the physical operation of the VTR, such as play video, stop video, trigger GPI start switcher action, etc. These actions are directly related to endpoints of an interval. For example, the physical act, start video, is the action that occurs coincident with the starting endpoint of a video clip. Some physical acts imply a relationship among several non-zero duration actions. For example, a switcher event is a non-zero duration action which overlaps portions of two other actions, each being plain video clips. The intervals would be specified as follows:

V1 overlaps V2—the first clip (V1) overlaps the second clip (V2)

S finishes V1—the switcher event ends V1

S starts V2—the switcher event begins V2.

The power of the present invention with respect to the present example is that it completely describes the ordering relationships among the physical actions performed with respect to a video system. For example, play a clip, transition between clips, trigger a clip, choose a clip from a set of alternates, and from the description, deduce all the single actions required to implement the specific relations. Patterns of event relationships can be reused in different schedules and different places in the schedules. For example, a pattern describing a (e.g. commercial) television show can be used many times in a broadcast schedule.

There are several very common events in video operations which are describable by fairly elementary interval relations. For example, cuts in editing, or auto-follow in playlists, specify that the end of one clip (A) is immediately followed by the start of another clip (B) with no intervening time. Thus, the interval relationship would be (A) meets (B). For a GPI trigger, a clip of (A) is started by the occurrence of a GPI trigger (G). The duration of a GPI always is less than the duration of a clip; thus, the interval relation would be (A) started-by (G). A switcher event involves two video clips (A), (B) and a switcher action (S) of finite duration which creates desired transition effect. Thus, the interval relations specified are (A) meets (B); (S) overlapped by (A); (S) overlaps (B). The specification (S) overlaps (B) is important since it defines that the switcher event terminates before event (B) terminates.

The following is a more complicated example in which alternate programming is defined. In particular, this case illustrates a common situation of a live program of indefinite duration (event L) which is followed by a pair of clips (C1, C2), having different durations and where the choice will be made at run time as to which clip C1, C2 to use. The clips are further followed by a single event (H) scheduled to start at a "hard" time. The end of the live event triggers C1 or C2 and the "hard" time triggers H; thus, the interval relations are:

L meets C1, C2=starts, or is started—by C1;

C1 precedes or meets H;

C2 precedes or meets H.

The relation L meets C1, C2=starts, or is started—by C1 specifies that L starts, L ends followed immediately by the start of C1. C2 begins at the same time as C1 but it is not known which one finishes first. In other words, C1 and C2 may be of different lengths and its not known which is longer, if any.

It be noted that it is irrelevant whether L is specified to meet C1 or meet C2. The constraint propagation algorithm will deduce the other given a second constraint. Likewise, a second constraint could correctly describe C1's relation to C2 and the algorithm would determine the constraint. The last two constraints define that no matter the run time choice of C1 or C2, the running clip will stop the moment it starts. Note that the running clip may finish leaving black video if the "hard" time start of H has not occurred.

The system and method of the present invention also support what is referred to herein as event variables. Event variables are events which can participate in a set of interval relations, but which do not indicate a specific playable entity, such as a clip or trigger. Event variables can act as sequencing space holders pending specification of the particular clip spot, trigger, etc. Event variables are identified herein by a name starting with "?" (e.g., ?X). Variables may also be defined to take the place of a particular type of event, such as a GPI program segment, etc. The convention used herein is to identify such a variable by the addition of a colon and the type name (e.g., ?X:GPI).

Thus, a variable is a kind of constituent which "takes the place of" a real one. In terms of implementation, the variable is used just as any other constituent in terms of creating a composition structure. A variable has no substructure and no representation itself, but it can be "bound to" (usage of the term bound to can be liken to usage of "bound" and "binding" in the computer art where variables are bound to values during the execution of the code). When queried, a constituent variable obtains its as-composed duration from the structure of the constituent bound to it and gets its as-represented duration from the representation of the constituent the variable is bound to.

For example, take a sequence of 3 elements: A, ?X, and B. Since ?X is not yet bound to a real element, any query directed at ?X will not return a definite value. But the sequence can still be placed into a pod, schedule, program, etc. At some time before the sequence is executed, ?X is bound to element E. Now, due to the binding process, the sequence appears to be A, E, B. Constituent variables support pre-defined patterns of constituents which can be re-used any number of times and only require specification of what real constituents are bound to the variables. This particularly advantageous for repetitive programming in which the content may vary, but the scheduling characteristics remain constant.

As noted above, in order to use variables in the specification of intervals, it is necessary to specifically provide a binding for each variable. A binding is established by specifying an interval relationship between the variable interval and a real event interval that is bound at run time. A variety of binding processes are known to those skilled in the art. However, it is preferred that an association specifying an equality relationship is specified such that it participates in the same interval algebra calculation and no further calculation is necessary. The context of the association dictates the event that the variable event is bound. This is discussed in further detail later in this document.

The use of variables can be expanded to include more than one variable in interval relationships. These variables are typically distinguished by name. For example, in the interval relation, ?L: Studio1 meets C1, or is started-by C1

C1 precedes or meets ?H;

C2 precedes or meets ?H

The live event "L" and "hard" time event "H" are not yet specified. However, when they are subsequently specified, the live event L must be an event of the type Studio1.

By establishing event variables, more complex relations can be specified. In addition, commonly used relations can be specified once and reused repetitively as needed. The following examples illustrates patterns of interval relations which are common in broadcast scheduling. It should be noted that lines of the code shown below that begin with a semicolon (;) denote a comment line commonly used in programming.

A "donut" is a pair of clips, commercials or spots (S1, S2), referred to hereinafter collectively as spots, which must be played as a unit but with exactly one other spot between the two.

Interval relation

S1 meets ?X

?X meets S2

S1 and S2 are two specified spots and X is a variable spot. Thus, when scheduled S2 will always be played after S1 and some spot later bound to X.

A bookend is a pair of spots (S1, S2), one of which occurs at the beginning of a commercial pod (?P) and the other at the end. A pod is a term used to define a group spots played together as a unit. Typically, the length of a pod corresponds to the length of a commercial break. The interval relation for a bookend is defined as:

Interval relation

S1 starts ?P:Pod

S1 precedes S2

S2 finishes ?P:Pod

The above defines that spot S1 starts the beginning of P which is of the type "pod". It is also stated that spot S1 precedes S2 and S2 finished the pod P. Note that the use of the operator "precedes" between the spots S1 and S2 specifies that there is room for any number of spots between S1 and S2, and that all of the additional spots also occur within the same break.

A straddle is a more complex pattern where there are related spots, for example, four spots (?S1, ?S2, ?S3, ?S4), each of which is placed at the beginning of a different break during predetermined period, e.g., hour, of broadcast. For this pattern, we assume 5 program segments (?P1 . . . ?P5) in the hour, where P1 is the 90 second lead-in segment that occurs at the top of the hour.

Interval relation

; program segment relations

?P1 precedes ?P2

?P2 precedes ?P3

?P3 precedes ?P4

?P4 precedes ?P5

; spots start at top of break

?P1 meets ?S1

?P2 meets ?S2

?P3 meets ?S3

?P4 meets ?S4

; other spots can be inserted

?S1 precedes ?P2

?S2 precedes ?P3

?S3 precedes ?P4

?S4 precedes ?P5

As the program segments ?P1 . . . ?P5 and spots ?S1 . . . ?S5 are variables, this structure can be used repeatedly by binding the variables to different constituents. It should be noted that integration of this with a more formal event compositional structure, such as is found in predicate calculus, can provide a level of modularization which would make this pattern and other patterns even more useful. For example, patterns can be used within patterns to generate even more complex patterns; furthermore, it is contemplated that pattern matching among common patterns can be used to deduce possible bindings for the variables.

Another pattern encountered is the "alternates with auto-follow". This pattern is a variation of the live event/alternate/timed-start pattern. The pattern includes a live event (L), two possible alternates (C1, C2), and an element (A) that auto-follows whichever of C1 or C2 is chosen at run time. To solve the problem of specifying the "meets" relationship between C1 and C2 to A, a variable, "G", which represents the alternate choice at run time, is used. The resulting pattern is:

Interval relation

L meet ?G

L meets C1

;provide a path from L to A

L precedes A

;C1 and C2 start simultaneously

C1 starts, equals, or started-by C2

; A auto-follows something

?G meets A

Thus, there is an indefinite period between the end of L and the start of A during which either C1 or C2 will run starting at the end of L. To establish the auto follow relationship between the running element (C1 or C2) and A requires that the choice of C1 or C2 be made by executing one of these rules at run time.

Interval relation

; one of the next two is chosen at run time

?G equals C1

?G equals C2

Once the link is established, the rules specify the desired effect. Note that the simultaneous start of C1 and C2 also means that the system will know to allocate sufficient resources to play both clips, assuring that a last-moment choice is possible. It is contemplated that such as system would prompt the operator to make such choices at run time in order to meet the interval relationships specified.

As can be seen above, interval relationships can be defined for a variety of broadcast programming situations. Furthermore, interval relationships can define usage of resources such as VTRs, satellite feeds and the like.

Interval relations provide time-independent (i.e., "uninstantiated") orderings of endpoints of events. Having reduced the problem to a set of endpoints and their relations, temporal constraints are then added to the existing structure by instantiating some or all of the endpoints of the events. Temporal constraints may be specified in a mix of two different ways, hard time constraints, and durations and offsets.

Hard time constraints specify exactly when an event starts or stops. Thus, particular endpoints are fully instantiated. An implementation may choose to instantiate the endpoints as absolute time values (12:00:00:012 May 12, 1997) or as an offset time to an externally specified value (30 min from start of playlist).

Endpoint differences such as durations or offsets can be stored in with the endpoint or interval relations. An example would be the interval relation: Y starts 5 seconds after X starts. This is illustrated below:

| | From | | To |
|---|---|---|---|
| Endpoint | X- | | Y- |
| Relation | | < | |
| offset | | 5 sec | |

Typically, offset values are used to specify start-to-start and end-to-start durations or offsets. As is readily apparent, durations and offsets can also be variable and bound subsequently.

By evaluating the endpoint sequences and applying simple arithmetic formulas to the values specified for the endpoints, durations or offsets, the exact structure of a series of timed events can be calculated. Further, any violations of ordering constraints are easily visible as a matrix entry containing a false value immediately identifies an inconsistency. The results of changing any time value can be calculated by following the sorted endpoint list and performing the indicated calculations until either some constraint is violated or some fixed time point is encountered. There are no fixed "ripple rules" which must be encoded into a playlist handler. The "rules" are a combination of the endpoint sequence paths and the local constraints at each endpoint in the list.

A local constraint is a property of the ordering edge that connects two endpoints. The edge specifies that, for example, E1<E2. This condition must always hold true. Endpoints may also contain information such as a time value which, when paired with another node in the endpoint in the network, must satisfy the time values as well. In the above example, there is a different kind of inconsistency if E1 has a start time of 1 pm and a duration of 5 minutes and E2 has a start time of 1:03 PM. This illustrates that at some point in time, the time constraints can not fall within the endpoint constraints. The local constraints can be tracked in a separate list or structure. In the present embodiment, local constraints are coded in the association between two intervals. Alternately, certain interval relations may carry externally specified offset relations between pairs of endpoints of the interval.

The constraints, as described above, can be viewed as ordinal (e.g., relative or qualitative) or cardinal (specific numeric). The constraints are created as a result of the specified interval relations and are recalculated when the relations change during any phase of the broadcast process, such as scheduling, editing or operating a broadcast schedule of programs, commercials and the like. The merger of ordinal and cardinal constraints enables immediate cross-checking for violation of ordering constraints when time values are changed or for violation of temporal constraints when the play structure (e.g., playlist) is changed. The process is so efficient that it can be used, for example, during a live broadcast to automatically eliminate schedule alternatives that will not be able to execute in the time remaining. In such a system, the system would evaluate the constraints after predetermined time period lapses, or on a continuous basis, to identify when certain constraints are violated and eliminate schedule alternatives based upon the constraints violated. For example, the operator is provided two programs, Pgm1 which is of one length and Pgm2 which is longer, that can follow a live broadcast of unknown duration. The interval relations specify constraints that the selected program must terminate before a specified hard time. The system accessible to the operator making the selection at run time evaluates the constraints, relative to the current duration of the live program, and eliminates the program(s), e.g., Pgm2, that is too long to play to completion following the live broadcast and completing before the specified hard time.

As is readily apparent from the description herein, the system can be configured for different portions of the broadcast process (e.g., scheduling, operating, relevant billing and accounting of commercials) by specifying a broadcast in terms of interval relations. Furthermore, the complexity and sophistication of the system can vary according to application. For example, the system can be configured to provide simple information and feedback to a user, such as a scheduler of broadcasts. Alternately, for example, the system can be configured as the basis of an automated broadcast generation system that accesses the necessary media for generating a broadcast specified in accordance with the teachings of the present invention. In addition, the information can be used to account for commercial broadcasts and insure the broadcast constraints (e.g., temporal or content) specified by the sponsor are met.

Below is a simple example combining the application of interval algebra, temporal constraints, event variables, and variable typing. The situation is the scheduling of a VTR to play a clip. VTRs require a pre-roll time (PRT) before playing a specified clip, but the scheduling of the clip must happen in relation to other scheduled clips.

Interval relation

; define a schedulable VTR entity

VP:VTR started-by PRT

VP:VTR finished-by ?V:VTR

; define VTR as pre-roll plus clip

PRT meets ?V:VTR

; create an external interface (?C)

?C equals ?V set the pre-roll time

Duration (PRT)=5

; add a real event binding

DNC-ad equals ?C

This set of rules defines a resource (VP) which is a VTR, can play some clip ?C and includes a pre-roll time (PRT) of 5 seconds. The externally visible interface is the clip variable ?C. ?C is bound to a commercial event named DNC-ad. Therefore, a restriction is specified on the start of VP that it begin 5 seconds before the DNC-ad. When this composite event is combined into a schedule, processing the interval relations results in a specification of the order and time to start the VTR. The power of system and method of the present invention is sufficient to detect a resource conflict (VTR not available at that time) or an inability to fix a precise offset to some preceding event, meaning that manual intervention is necessary to start the VTR.

The present invention is a powerful tool for the specification, sequencing and execution of events in a broadcast environment. These events include, for example, playing clips, triggering actions, cutting, switching, transmitting conditional access data, tuning receivers, choosing a story alternate, and any other machine-controllable or displayable action which must occur in the operation of a modern broadcast plant. It is independent of the specific applications such as spot insertion, news, or editing, and can be used to integrate the complete sequencing of all these applications. The ability to define patterns of event relations and include event variables within the interval algebra framework can be utilized to create more powerful scheduling, traffic and automation systems allowing these applications to retain the higher level semantic intent of the programmer or director.

The system is further enhanced by the utilization of the data structure described herein and the processes implemented to access the structure to perform a wide variety of broadcast functions. The basic component of the structure is a constituent. A constituent is the umbrella category for the types of data structures in the model. All constituents share certain attributes and behaviors. Although a specific set of attributes are described herein, it is contemplated that varying sets of attributes, including some of what is described here as well as additional attributes not described herein, can be used. In the present embodiment, the attributes include:

ID: A globally unique identifier which may be used to reference or retrieve the constituent from anywhere in the system.

Name: A human-readable designation for the constituent.

Temporal Specification: A specification of the starting, ending and duration values.

Track Set: A set of tracks (e.g., audio, video or control) defined by the constituent. The track set can have any number of tracks of any number of types.

There are three specializations (types) of the basic constituent: element, material and media. Each specialization models the behavior of one aspect of broadcast systems. For purposes of composition, each type can be composed from other members of that type. This provides recursion in the structure and additional flexibility in defining broadcasts and its constituents.

Elements are a type of constituent used for scheduling actions such as play a clip, trigger a GPI (General Purpose Interrupt), start an effect, or choose among alternative programming to broadcast. The element type of constituent can be representative of the element constituent as well as any of the higher order constituents such as a pod, program, etc. The element type is different from the other types in that a constituent of the type element is not bound to specified times but may be organized in a time-independent manner. This is particularly important for implementing the specification and handling of live events, default actions and alternative choices.

Elements can be represented by material. Material is a kind of constituent that represents the actual signals played or specific action that should occur during a broadcast. For example, material may be the signal in a turnaround feed at a broadcast center or the content of a syndicated program. In a digital sense, it is "the bits" without regard to where the bits are stored or where they come from. A material may also be a specification for a trigger action ("Take") although the specific GPI line, for example, is not specified. Material may also be non- audio/video data, such as conditional access data typically used in cable and satellite transmissions to control access to transmissions or scripts to be output on a teleprompter.

Material may be represented by media. Media is the constituent which represents the physical manifestation of a material. Media is the constituent that transports the material. It can be magnetic tape, files on a hard disk, an incoming signal feed, a GPI trigger line or any other physical representation of material.

Using the above three constituents, the identification broadcast elements, how the elements are embodied and how the element is physically manifested are described. As will be described below, this basic structure enables systems, for example, to identify what is broadcasted and the availablility of broadcast resources.

The capabilities of systems that operate in accordance with the teachings of the present invention are enhanced through the use of constituent variables. A constituent variable can be viewed as a place holder constituent which can be bound to a real constituent at a later time. There are three types of constituent variables corresponding to the three types of constituents. Constituent variables can only be bound to constituents of the same type. Constituent variables have neither compositions nor representations. Constituent variables are bound to constituents via association relationships where the relationship is defined as equality.

The naming convention used herein for constituent variables is ?name:type, where name is a user-chosen label and type is one of the element, material or media constituents described.

Constituent variables, in addition to substituting for a single constituent, can take the place of a list of constituents. This can be indicated, for example, by concatenating the '[ ]' symbol to the end of the variable's type indicator. Such a constituent variable can take the place of any number of constituents of that type. As will be described below, constituent variables can be used to construct common, re-usable patterns of broadcast elements.

Constituents may relate to each other in several different ways. A constituent relation is a three-way relationship among constituents such that the relation is defined between two constituents and that relation is valid in the context of a third (which may be one of the pair). The presence of the context constituent may introduce dynamism into the information structure in that, for some situations, the meaning of the structure at any point can be completely determined only by knowing how that point was reached in traversing the structure.

In the present embodiment, there are three different ways in which constituents may relate to each other, composition, representation and association.

The composition relation defines the set of subcomponents of a constituent and may provide additional information such as the time base or track mapping. Composition defines a child-parent, part-to-whole relationship. A composition is defined in the context of the parent constituent.

The representation relation defines how a constituent may be manifested by another constituent. The second constituent contains sufficient information and data to completely manifest the intent of the first constituent. Representation defines an equality relationship in time and track sets. A representation is defined in the context of the constituent whose representation is being defined or a compositional ancestor of that constituent. In particular, in the present embodiment, a scheduling element can be represented by a material and/or media.

The association relation defines arbitrary ordering relationships among constituents of the same type. These ordering relationships are based upon the context of the association wherein the context of the association is the composition. In the present embodiment, a composition object is created for the constituents which are composed of other constituents. The composition object identifies the parent as the contact and specifies any associations between siblings. Usually, associations are created between sibling constituents but are not restricted to siblings. The context of associations is usually the parent of the siblings involved. It may be an ancestor constituent of the siblings in the data structure. Associations control the relative ordering of elements in the context of the composition. For example, associations are used to define a temporal relationship between scheduling elements, e.g., that element 1 is to be played before element 2.

Constituent relations define two distinct mappings between constituents. One relationship, a time base transform, defines how to transform between the time specifications of each constituent. For example, different constituents describe time in different ways. For example, an element may be defined to start at 12 noon and the material that represents the element is identified to being at 1 hour, 6 minutes and 30 seconds. The time base transform in the example would generate an offset value (e.g., 1 hour, 6 minutes, 30 seconds) to identify where to go in the material for the element. The time base transform may also adapt a shorter segment in the media constituent to the longer material constituent, or a longer media constituent into a shorter material constituent. A second relationship, a track set transform, defines how to select and merge tracks of one constituent into the tracks of the containing constituent. Signals, audio video or control, come across tracks. The types of tracks are defined as to the kind of input it can handle. For example, audio tracks convey audio information. A track transform may be a simple 1:1 correspondence wherein the track material corresponds to a specific track media. The transform also can function to combine two tracks into one. This is particularly useful when the media contains more track than the material. A predetermined mix function, e.g., 50/50 mix, a mix function that is a function of time, or other mixing function can be used. The time base transform is reversible (i.e, it can go in either direction). The track set transform may not be reversible. This would be the case when, for example, the track set transform specifies a mix-down of four audio tracks into one.

Containment refers to the ability of one constituent to use another as a portion of its content. This is seen in the present embodiment wherein one scheduling element can be composed of one or more scheduling elements of the same or lower order. The data model enforces a containment restriction that constituents can contain only constituents of the same general type.

Scheduling constituents are arranged in a hierarchy defining what kind of constituent can contain another. One embodiment of a scheduling hierarchy is illustrated in FIG.

8. The hierarchy is defined by current broadcast conventions of terminology and usage and is not a fixed requirement of the data model. The implication of the hierarchy is that a scheduling constituent at some level can contain constituents of that type and ones lower in the hierarchy. Thus, a channel broadcast can contain a schedule which can contain a program which can contain a pod which can contain an element. However, for example, a pod can contain elements but not programs.

An element is the lowest level scheduling component. For example, a clip or spot may be considered as an element. An element can contain only other elements. This situation occurs, for example, in the specification of an editing sequence of clips, a particular grouping of related spots such as a donut, or a choice of alternative clips or news stories, one of which is subsequently selected to play at time of broadcast.

A pod is a grouping of short-form elements (spots) into a commercial break. In the news program context, new stories correspond to the pod structure. A program is a grouping of long-form elements and pods into a broadcast segment (typically an hour or half hour). Programs are also known as rundowns in news operations.

A schedule is a grouping of programs, pods and other elements into a meaningful broadcast unit such as "Prime Time" (e.g., from 8:00 PM to 11:00 PM) or "Morning News". One illustration of the recursive nature of a schedule are daytime schedules which are often built from other schedules reflective of schedules of portions of the day.

A channel is a grouping of schedules and other subordinate elements into a continuous stream of input or output. Channels may be grouped into other channels. For example, in a multi-channel facility, a transmission channel may be formed from several different facility channels during a broadcast day.

As noted above, the scheduling constituents can be represented by other constituents such as material and media. When one constituent represents another, the one constituent has the property of being able to manifest the intent of the represented constituent. For example, a tape cassette is a media which can represent a material constituent, e.g., the 6 o'clock news.

In the present illustration, a constituent may be represented by one other constituent not of the same constituent type. For example, a material can represent an element and media can represent material. Note that the representation relation is transitive. That is, an element can be represented by a material which is in turn represented by a media. It is correct to assume that the media can represent the elements.

The representation of one constituent by another has the property of that duration of the representing constituent, as mapped to the presented constituent, equals the as presented duration of the represented constituent. It follows that, since the context of a representation may be anywhere in the represented constituent's composition hierarchy, the as-represented duration is dependent on the traversal history of the information structure. The context of a representation is the "represented" constituent or one of the represented constituent's ancestors in the composition or scheduling hierarchy. Unlike composition, the context is dependent on the dynamic behavior of the structure-traversing algorithm. Thus, the context of the representation depends on how the represented constituent was reached in traversing the structure. As should be readily apparent, different structure traversing algorithms may dictate different context.

Preferably, in order to track the context, and as will be illustrated below, the traversing algorithm should implement a form of push-down automaton (a finite state machine combined with a stack). For example, when walking or traversing the tree structure, as each node is reached, the constituent is pushed on a stack (the stacks indicating the path traversed). Furthermore, each association encountered is in the context of its composition. Therefore, when a composition, i.e., composition object, is encountered, the object is pushed on the stack and subsequently is traversed and executed when the child nodes are traversed.

An association is an ordering relationship between a pair of constituents, usually used in the context of a composition to provide relative ordering information between sibling constituents in the composition. For example, three elements are composed together where the first two are audio-video (a/v) elements and the third is a GPI trigger. While the composition defines that all three make up the parent constituent, e.g., a pod, associations are used to specify that the GPI element and the first a/v element start together (the GPI triggers the first element) and the second element starts sometime after the first (e.g., an offset voice-over). Note that associations can be independent from any time base specifications.

The context of an association is the parent or ancestor constituent of one of the associated constituents. It is recommended practice that associations be used between constituents of the same type in order to avoid significant computational complexity.

Any constituent can have at most one composition and one representation. However, it is also necessary to accommodate the possibility that some constituents might have alternative compositions or multiple representations. Alternative compositions occur in elements when there are alternative possible actions in a playlist, for example, following a live event. Multiple representations occur in elements where there may be several materials which represent the element or in material where there may be multiple tapes ("clones") that each store a copy of the desired program. The model handles this situation by providing the concept of a proxy relation.

A proxy relation is a container for a set of possible relations of the same type. The proxy appears to any user to be a constituent relation in terms of methods and attributes it exports. However, in addition to the contained relation set, the proxy also carries a set of selection rules that are executed at runtime to determine which relation, if any, is appropriate. A proxy relation is owned by the creating constituent. It is this constituent which specifies the selection rules for the proxy.

Proxies which have not calculated a constituent relation to return are said to be "unresolved". Proxies may be resolved dynamically during active traversal of the structure or at any other appropriate time. The context of an unresolved proxy is the creating or owning constituent. The context of a resolved proxy relation is the same as that of the selected relation.

The selection rules may be implemented as a computer function, a set of logic rules, a pattern for a pattern-matching algorithm, or any other computable entity. It is possible to have proxies for compositions and representations. A proxy is created by an uncomposed constituent, the parent constituent of a composition, or a represented constituent.

Figure 9:
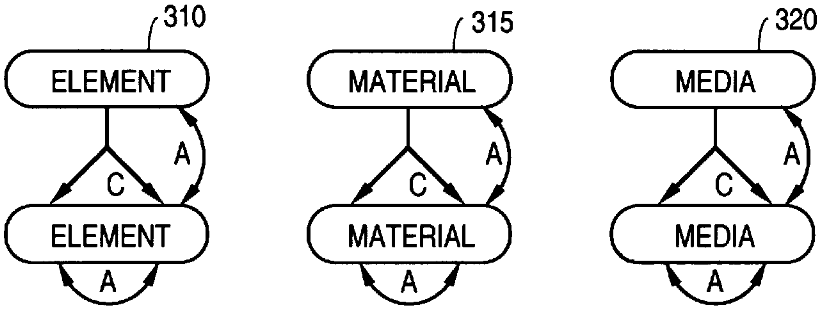
FIG. 9 illustrates the representations that can be provided in accordance with the teachings of the present invention.

FIG. 9 is a simplified illustration of the representations used to track programming and associated media used to generate broadcasts. Referring to FIG. 9, a broadcast is said to be composed of elements 310 that are represented (R) by material 315 which are represented by media 320. The elements, materials and media are recursive in nature enabling, for example, element 310 to be composed of (C) element 325. As is readily apparent and as will be illustrated in subsequent examples, a higher level element, material or media can be composed of one or more lower level elements, materials or media, respectively, thereby generating a hierarchy of materials and/or media.

As one moves to the right of the illustration, through element 310, material 315 and media 320, more details of the manifestation of the constituent in time and physical attributes are provided. As one moves down the hierarchy illustrated, more details of the formation of the constituent (element 310) are provided. Associations (A) enforce ordering constraints on constituents of the same type. Association may cross multiple levels of composition to connect arbitrary constituents. Associations may also relate constituents that are not in the same compositional structure, enabling multiple structures, perhaps originating from a variety of interconnected computing resources, to generate structures that can be used in conjunction with each other to provide the broadcast functionality.

Figure 10A:
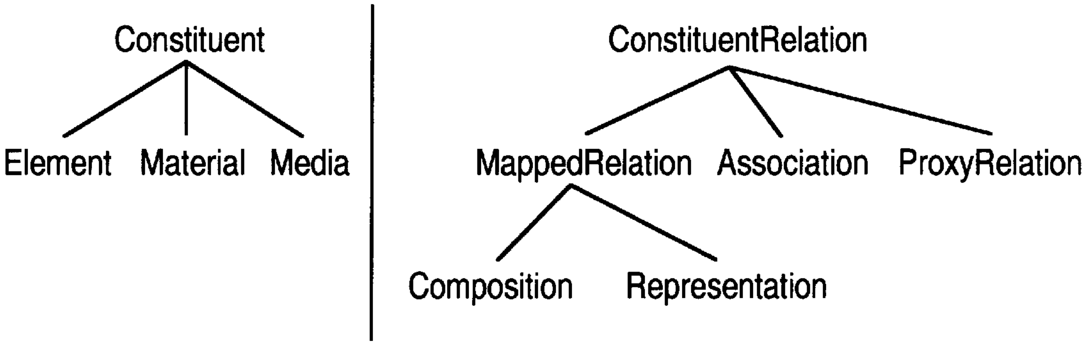
FIGS. 10*a* and 10*b* illustrate the constituents and their relations in one embodiment utilizing object oriented technology and FIGS. 10*c*, 10*d*, 10*e*, 10*f*, 10*g* provide illustrative object oriented structures.

In the preferred embodiment, the system is implemented using object oriented technology. FIG. 10*a* illustrates the object classes which implement the semantics of the structure described herein and further shows the relationships among instances of those classes. Referring to FIG. 10*a*, a constituent class is composed of an element class, material class and media class. Constituents relate to one another through mapped relations, associations and proxy relations. Mapped relation includes composition and representation. The composition relation defines the set of subcomponents of a constituent and may provide additional information such as time base of clips and track mappings. For example a commercial break constituent is composed of a determined number of spots or commercials. The representation relation defines how a constituent may be manifest by another constituent. The representation relation is used to manifest the intent of the constituent and can be said to define an equality relationship between the time and track sets.

Figure 10B:
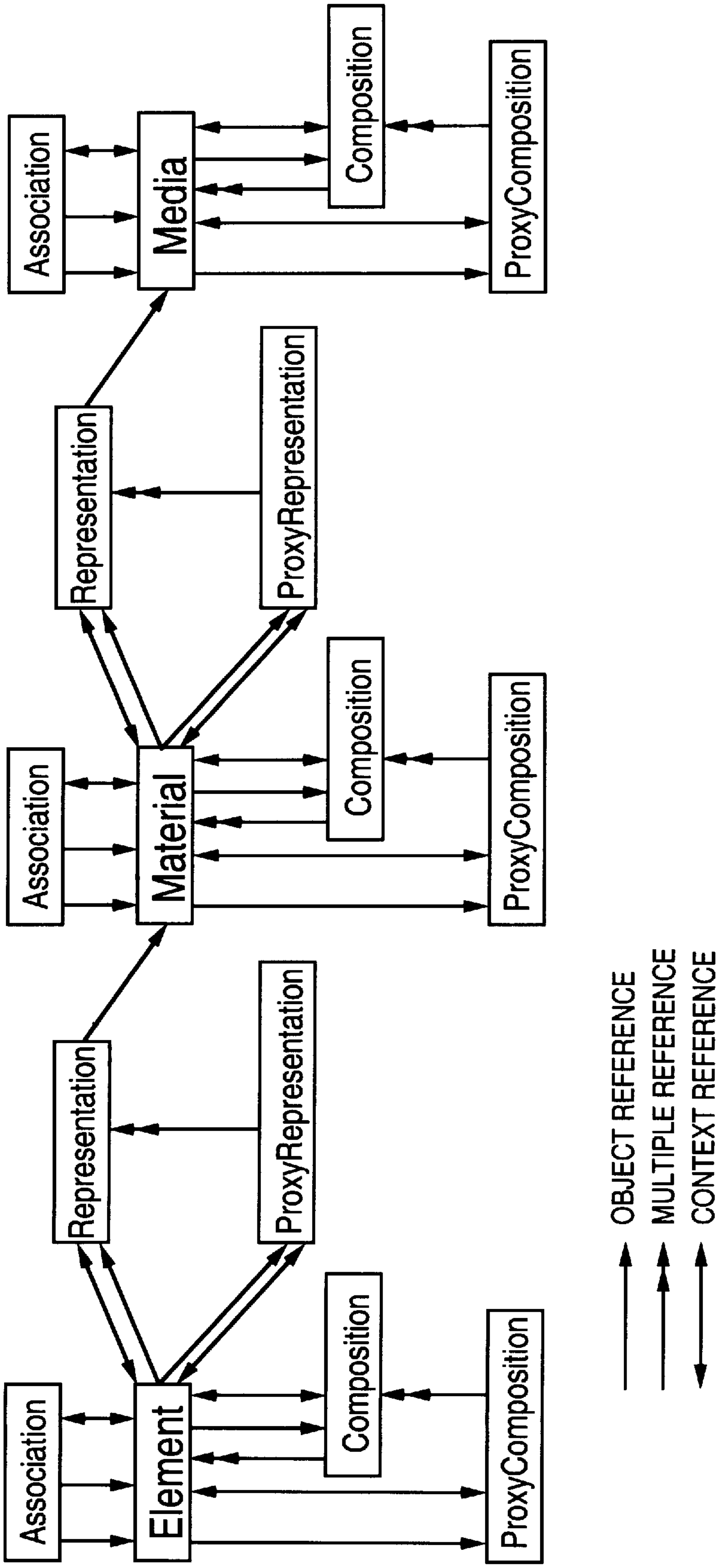

FIG. 10*b* illustrates the relationships of instantiated objects. In particular, FIG. 10*b* shows that an element can be represented by material which is represented by media. The representation can be specifically identified at the time the schedule is created or specified using proxy representation wherein a variable object is bounded to a real object at a later point in time. This would be used when alternative programming is provided for selection during the actual broadcast. Each instance of an element object can be composed of other elements, either by proxy composition, wherein the constituent the element is composed of is selected at a later time, or by direct composition. Furthermore, each element object can be associated with other elements, usually in the context of a parent object of which the element is a constituent.

Figure 10C:
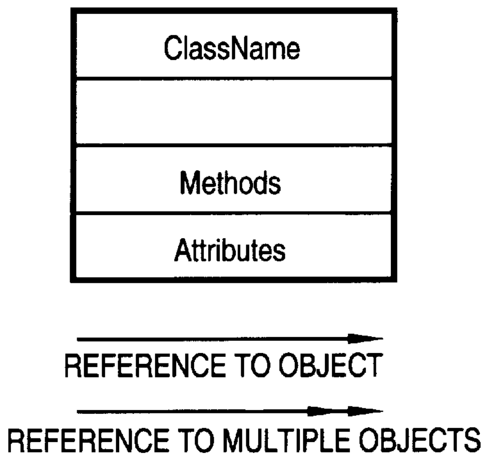
Figure 10D:
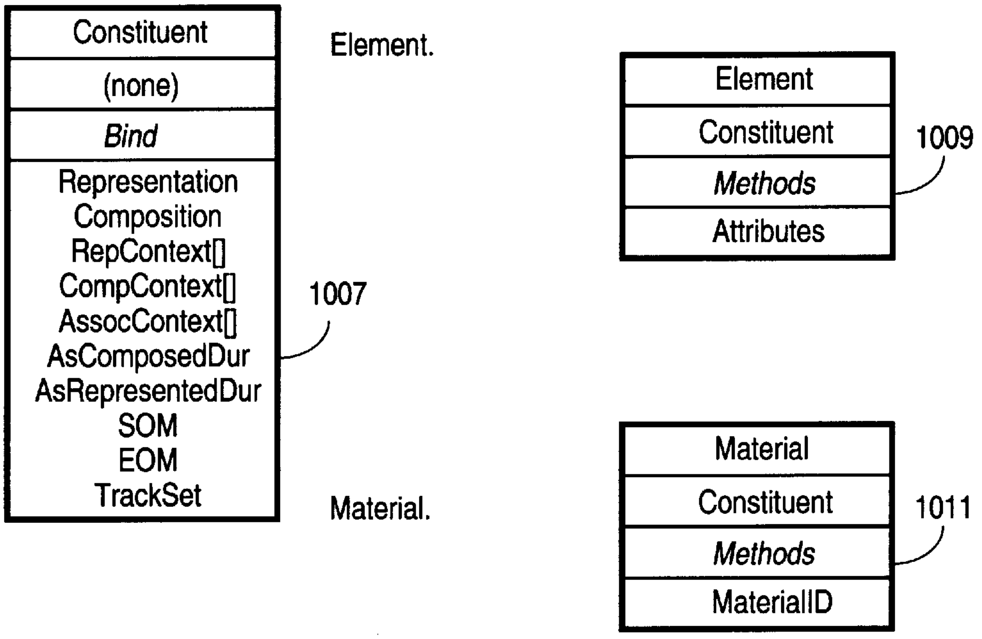
Figure 10E:
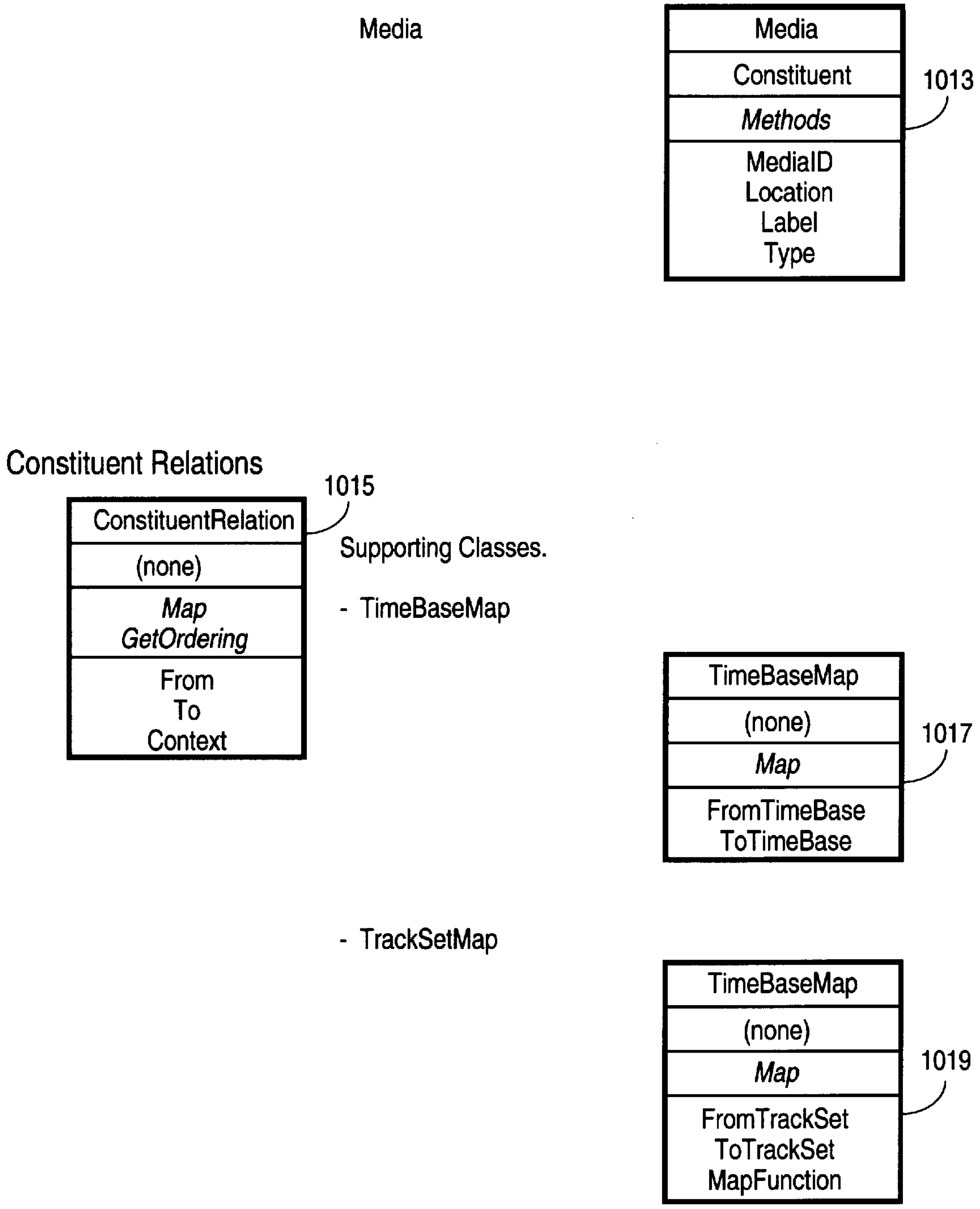

FIGS. 10*c*–10*g* illustrate a representative object oriented description of the data model used herein. The illustrations are simplified for purposes of explanation and are not meant to convey all of the attributes nor all the methods which might exist in a complete implementation. Such additional attributes and methods would be apparent to one skilled in the art and may be particular to specific implementations. FIG. 10*c* sets forth the conventions used to depict the various object types in the information structure. These include the following:

class name—the name of the object class superclasses—a list of the class from which this class inherits. Multiple inheritance is use, for example, in the definition of proxy relations where a proxy mixing class is defined. In the present illustration the remaining classes singly inherit.

methods—this abbreviated definition gives only the name of the methods for an object class without the parameter signature. The intent is that the method name is a key to its functioning, and a strict signature definition will be provided by the implementation.

attributes—attributes are listed which are relevant to illustrating the function of the object class.

FIGS. 10*d*, 10*e*, 10*f* and 10*g* illustrate the various objects that may be used in one implementation include a constituent object 1007, element object 1009, material object 1011, media object 1013, constituent relation object 1015, time base map object 1017, track set map object 1019, constituent map object 1021, composition object 1023, representation object 1025, association object 1027, proxy object 1029, proxy composition 1031 and proxy representation 1033.

Thus by using the above described structure to specify broadcasts on one or more channels, broadcast operations can be simplified. For example, using the structure, an innovative method for setting up commercials can be used. In particular, a particular commercial break structure, for example a doughnut, can be easily specified numerous times for different spots by reusing the same structure and identifying different material for the different spots to use. Programming in different time zones is also simplified. For example, in an earlier time zone, the broadcast may be live; therefore the media would be identified as a live feed from a particular resource. However, in the later time zone, a tape of the live broadcast is broadcasted. Thus, the element and the material that represents the element is the same as before, but the media is changed to identify a certain tape that is contains the recorded broadcast.

A number of illustrations of the flexibility of the system and method of the present invention are described below. It will be apparent to one skilled in the art that these illustrations are exemplary and numerous other situations not described herein can be addressed utilizing the teachings of the present invention.

Figure 11A:
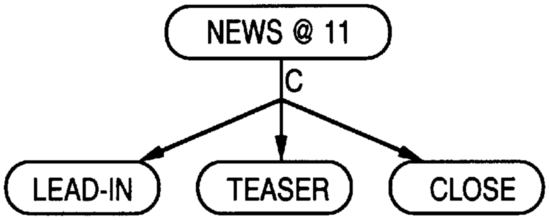
FIGS. 11*a*, 11*b*, 11*c*, 11*d* and 11*e* illustrate one example of processes performed in accordance with the teachings of the present invention.
Figure 11B:
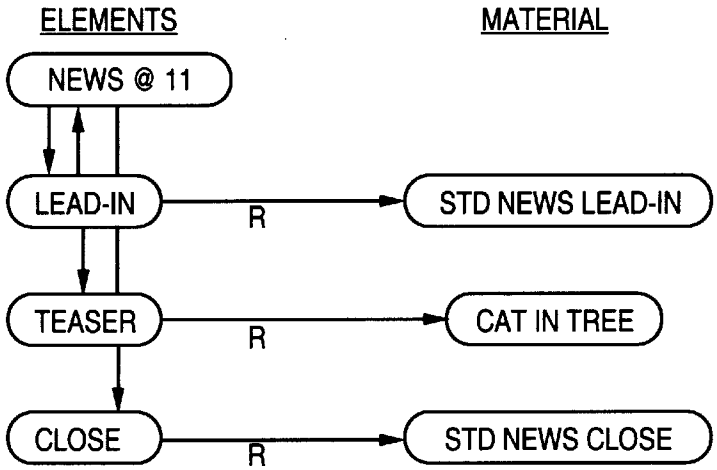

Spots or commercials for upcoming news broadcasts are quite common. Typically, as shown in the compositional structure of FIG. 11*a*, these spots consist of three elements: a lead in, a teaser and a close. A news spot "News @ 11" is illustrated in FIG. 5*a*. Implicit in the illustration is the left to right play sequence of elements. FIG. 11*b* shows the representation of the News @ 11 spot. In this situation, the lead in is a standard news lead in, i.e., the lead in is represented by the material "Std News Lead In". The teaser is a short description of a story "Cat in tree" and the close is a standard news close "Std News Close". It should be noted that the element News @ 11 is not represented by any material; thus the search process for identifying the material which represents the spot must be identified by looking to the constituents which form the spot. Thus to play the News @ 11 spot, the system must assemble the constituent elements and their representation (i.e., materials) and play the individual representations in order. As noted earlier, each constituent has a time value associated with it. Thus the element News @ 11 has a duration identified that corresponds to a scheduled duration (typically used for planning purposes). For example, the News @ 11 may be planned as a 20 second spot. The as-composed and as-represented durations are derived from, and the values depend on, the respective durations of the component spots which form the spot News @ 11. For example, the as-composed duration is derived from the scheduled durations of the elements Lead-in, Teaser and Close. The as-represented duration is derived from the durations of the representing materials. Typically the values of all three durations are close but are not required to be exactly the same.

Figure 11C:
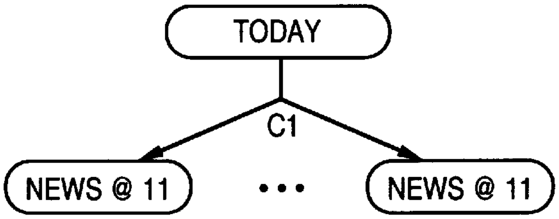
Figure 11D:
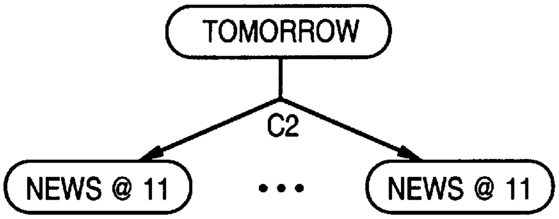

This example can further be used to show how an element an be repetitively used. A spot, such as News @ 11 will typically be used in a number of schedules. For example, it would be run every day and several times a day. Scheduling this spot consists of composing it into higher order element structures. FIGS. 11*c* and 11*d* provide simplified examples. FIG. 11*c* shows for the schedule "today", at least part of the composition is News @ 11 spots. Similarly, FIG. 5*d* shows that for the schedule "tomorrow", at least part of the composition is News @ 11 spots.

Each mapping of a News @ 11 into another element provides a unique context for the News @ 11 element. There are two direct implications from this mapping requirement. First any structural change made to the News @ 11 element will be directly and immediately reflected in all uses of the element. Second, each unique context can be the context for a representation of News @ 11 for its subordinate elements, implying that in every place it is scheduled to execute, it may have a different representation based on which schedule (e.g., day) it is composed into.

Proxy representations can also be used to provide different representations of one or more of the constituents which compose the News @ 11 spot. Unlike specifying representations in the context of a composition, proxy representations enable the specifications of multiple representations in the context of the element it represents. A proxy representation allows an element to maintain multiple possible representations with the choice made at runtime. One or more of the elements, for example, those which compose a higher order element, can have proxy representations. The use of a proxy representation will be illustrated below.

Figure 11E:
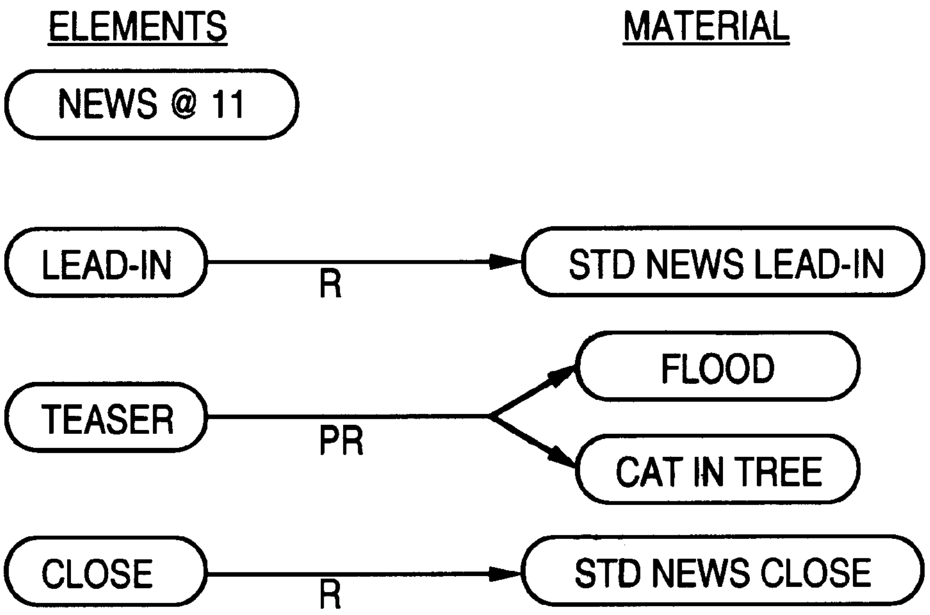

The structure enables the change of the composition of the spot to be easily performed. Continuing with the illustration shown in FIG. 5, suppose a news team arrives with footage of a breaking story regarding a flood with more audience value than the cat in the tree story currently scheduled in the News @ 11 spot (see FIG. 11*b*). An editor calls up the stored footage, or accesses the scheduled structure for the News @ 11 spot (e.g., it is stored on a RAID server) and finds that the spot is composed of three elements. The lead in and close does not change; therefore, the editor needs only to prepare new material to represent the teaser element. From the footage just arrived, a teaser is constructed that is of about the same duration as the scheduled duration of the teaser and stores the new footage on a media and adds to the schedule an additional representation by using a proxy representation. The new scheduling hierarchy is illustrated in FIG. 11*e*.

Thus when an automated broadcast system, which accesses the scheduling hierarchy to determine what to play next, reaches the News @ 11 spot, it sees three representations in the context of the Today playlist available, one for the lead in constituent, one for the teaser constituent and one for the close constituent. For the teaser constituent, however, there is a proxy. Thus the teaser constituent asks the proxy representation execute the selection rules defined to select an appropriate representation, i.e., the flood segment or the cat in the tree segment. The proxy representation contains a selection rule to pick the most recently created representation and therefore returns the new flood clip just created by the editor.

It can be seen that because of the knowledge built into the information structure, only one person, the editor, had to take an action to change the execution of the spot. This edit did not involve changing the definition of the structure of News @ 11 so the scheduling department of the broadcast facility was not involved. An as there was no change to the running playlist as the scheduled spot remained the same, the operator did not have to take any action. This example illustrates the benefit to a system that utilizes such a unified structure as it brings together broadcast automation, commercial insertion and editing into a unified operation.

Figure 12A:
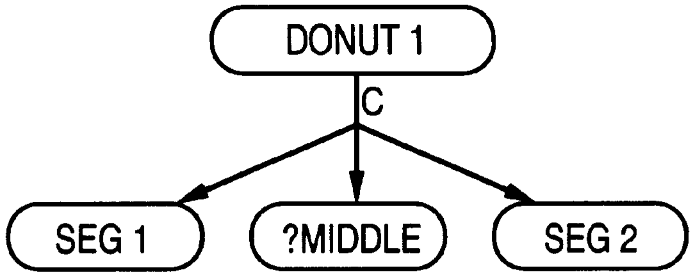
FIGS. 12*a* and 12*b* illustrate another example of processes performed in accordance with the teachings of the present invention.

The advantages are further illustrated by the repetitive utilization of commonly used commercial pod structures. One commonly used structure is a donut. A donut is a commercial insertion specification between two spots, one of which is composed of two segments. The donut plays the first segment followed by the second (unrelated) spot followed by the second segment. The following illustrates how the same donut structure can be reused using different second spots. To provide this feature, the schedule is set up with the second spot identified as a variable element. FIG. 12*a* illustrates the compositional pattern of donut1. The pattern specifies that Seg 1 plays followed by one other element unspecified, ?Middle, followed by Seg 2.

As noted above, an element is bound to a variable element at runtime. The runtime representation of the variable element is determined by the choice of representation made by the element to which the variable is bound at runtime.

The Donut1 element (e.g., pod) can be composed into any schedule just as any other spot. However, the binding of ?Middle is created by an association between ?Middle and the schedule element the broadcast programmer (or traffic system) wishes to place between the two segments Seg 1 and Seg 2. The association specifies that the relationship is equality, therefore the new element can be substituted for ?Middle. The context of the association, which determines the active binding, is the composition of the element the donut is composed into. So this same pattern could be reused in any number of other places with a different binding context in each.

Figure 12B:
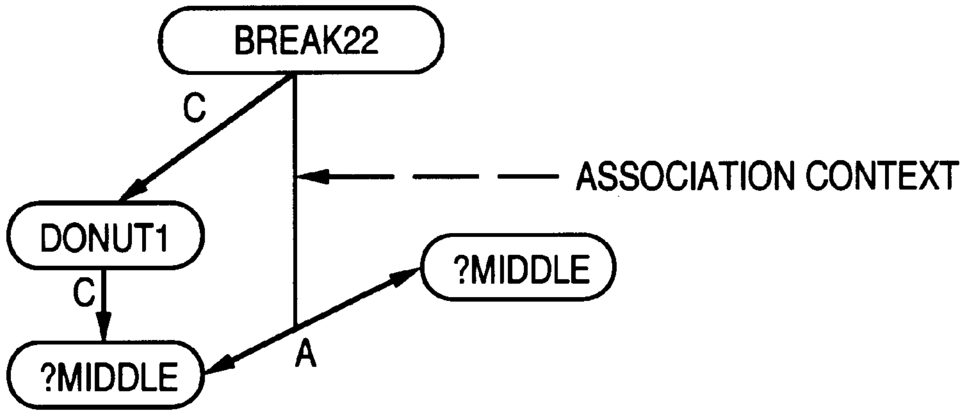

FIG. 12*b* illustrates the association binding. By this pattern, during the execution of Break22, which is composed (C) of Donut1, Donut1 is played, wherein Spot31 plays between Seg 1 and Seg 2 of the donut. Preferably Spot31 is not specifically composed into Break22 which may affect the binding for any representations or element variables contained within Spot31.

Figure 13:
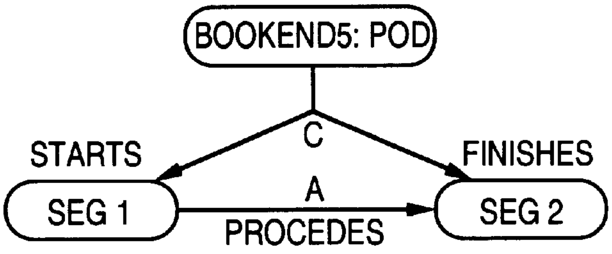
FIG. 13 illustrates a broadcast pattern implemented in accordance with the teachings of the present invention.

FIG. 13 illustrates another pattern referred to as a bookend. This example illustrates a reusable pattern which has temporal specification. A bookend is similar to a donut except that the specification states that the first segment plays at the beginning of a commercial break and the second segment terminates the commercial break. Thus there can be any number of spots in between the two segments. The compositional structure shown in FIG. 7 restricts the type of constituent to a pod, as opposed to identifying it as a general element as in the donut case, restricting the use of this pattern to compositions (i.e., schedules) where pods can be contained. This is desirable as the intent is specify the beginning spot and the ending spot of a commercial break, the entity a pod typically represents.

It should be noted that there is an association relation defined between the child elements of the pod restricting the possible ordering relations. The structure defines specific interval relations which must exist among the various elements. The "Starts" relation between Seg 1 and the parent Bookend5 means that no other element can come between the beginning of the pod and the beginning of Seg 1. Similarly, the "Finishes" relation between Seg 2 and the parent pod means that nothing can come between the end of Seg 2 and the end of the pod. These restrictions are implied by not enforced in a donut pattern which is typically identified as a pod. In addition, the use of the precedes relation between Seg 1 and Seg 2 means that there is an indeterminate gap between the two which is filled by other spots.

Use of the interval relations makes explicit and visible the semantics of the bookend pattern. As in the case of a donut, this allows an automatic broadcast system playing a schedule to retain the semantics and aid the transmission operator when changes are made to the schedule. Although the pod would be organized in the proper sequence, the conventional playlist, for example, would not explicitly indicate that Seg 1 must start the pod and that Seg 2 must end the pod. Thus subsequent changes in the playlist may unknowingly change the sequence and therefore the original structure. This can be particularly problematic with respect to commercial spots as advertisers only play when the play requirements are met.

The next example illustrates the scheduling and playing of a live event. The live event is the classic, hard to handle situation in a broadcast. Most current broadcast systems depend on the specification of time. Live events, however, do not have exact time specifications (particularly duration) making it difficult for broadcast operators to manage. An operator will typically find that they must continually update an estimate of an end time of a live event in order to keep the broadcast automation system from improperly cutting off the event or running long and not switching properly. The broadcast automation system that generates the broadcast must have a complex special case set of "ripple rules" for understanding how to propagate time changes to programs following a live event.

The present invention enables the handling of live events when there is an incomplete time specification and further enables the handling of downstream events without resorting to special case ripple rules.

Figure 14:
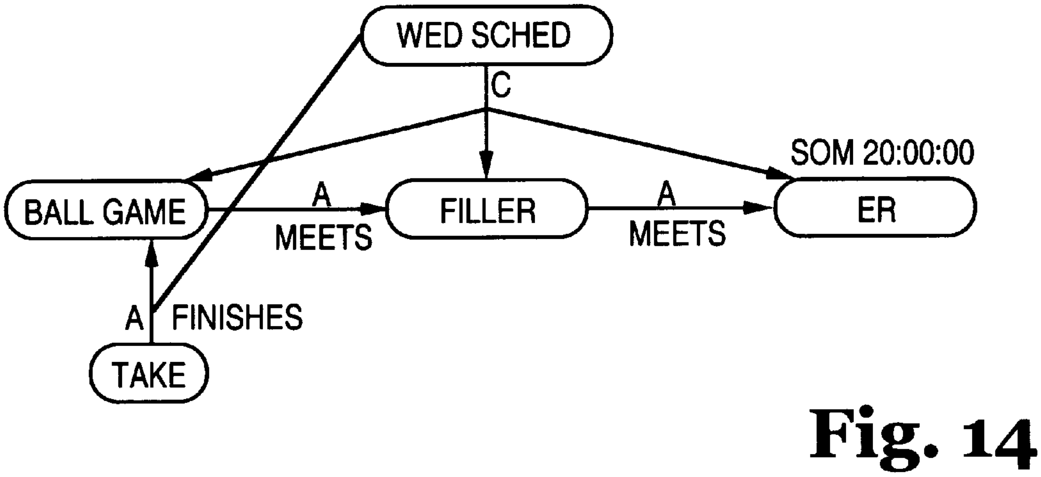
FIG. 14 illustrates the example of the handling of live events in accordance with the teachings of the present invention.

The present example further shows how to relate the derived start and end relations to SOM/EOM specifications. This example further shows how manual triggers can be treated as just another kind of element within the model and not handled as special attributes of events. FIG. 14 illustrates the composition a schedule, Wed Sched, which includes a live event, ball game, followed by a filler of indeterminate duration followed by an event, ER, with a hard start time of 20:00. The "meets" relation used in this example defines that whatever the time values are, filler starts exactly when the ball game ends (as ballgame meets filler) and that the filler ends exactly when ER starts. Only the ER start time is defined in the schedule. The "finishes" association between the Ball game and the Take element (The take element indicates a manual operation or trigger to begin a broadcast of an something) defines that these two elements complete at the same time. Since we know that the Take element is manifested by a GPI, without showing it here we can correctly infer that the Ball game event is ended by the Take element.

From this structure, the broadcast automation system knows that it must maintain Filler in a ready state so that it is ready to be broadcast after the end of the Ball game which occurs when the operator presses the Take button. The system can also trivially update the expected start time of Filler since it is always the current time. The system also knows the ending time of Filler (20:00:00) and can therefore continually update the expected duration of Filler. However, if the Ball game is still running at 20:00:00, the system will switch to ER as it has a defined start time.

Although this appears to be a simple illustration, extending this slightly creates situations that prior art time based broadcast systems find difficult. If the Ball game were followed by a series of events each defined to automatically follow the previous one, a conventional broadcast automation system would require an approximate specification of the end time of the Ball game so that it could calculate the start times of each succeeding event. Having calculated these times, as the Ball game goes on, the automation system must continually ripple the time changes through the playlist according to it built in set of ripple rules. These rules must, among other conditions, recognize and differentiate between calculated start times (soft starts) and specified start time (hard starts). The one time calculation of end point sequences using interval relations produces a simple dependency chain which renders ripple rules unnecessary.

Figure 15:
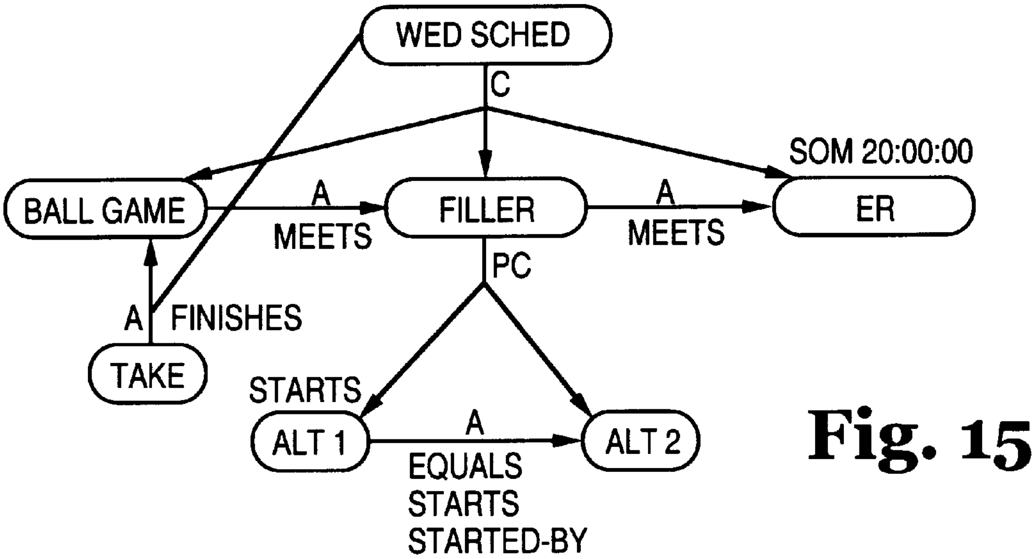
FIG. 15 illustrates the example of using alternates in accordance with the teachings of the present invention.

As is well known in broadcasting, broadcast playlists or news room rundowns often contain alternates which the operator can choose at different points during operation. Often the alternates have different durations. One example where alternates may be used is following a live event. Continuing with the example of Wed Sched composed of the Ball game followed by Filler and ER, Filler is defined to be composed of alternates Alt 1 and Alt 2. This is illustrated in FIG. 15. The alternates are specified by use of proxy compositions. This mechanism enables the resulting end point relations to be used to eliminate possible alternates. In particular, during the course of the live event, alternate playlists are evaluated in view of the time remaining and whether there is enough time to play the alternate before the next event is broadcast at the fixed time.

Referring to FIG. 15, the first layer of composition operates exactly as it did in the previous example. However, the definition of the Filler element now provides a different behavior. By using the proxy composition (PC) to define Filler, we have explicitly stated that there are two entirely different ways, Alt 1 and Alt 2, to define Filler and that the choice will be made at runtime. In this situation, the Filler element does not specify a scheduled duration; its as-composed duration will be taken from the duration of the chosen element.

The set of interval relations within Filler defines how the two alternatives relate to each other and to their parent Filler. Here Filler and Alt 1 are defined to start at the same moment as specified by "starts". But Alt 1 and Alt 2 have a relation between them even though only one will pay. This disjunctive relation specifies that both will start at the same time, but when one ends bears no relation to when the other would end. This specifies that the two elements may have very different durations. The runtime choice of Alt 1 or Alt 2 creates an equality relationship between Filler and the chosen alternative, defining at runtime that Filler ends whenever that alternative ends. Furthermore, since the end time of Filler is known (20:00:00) by deduction from the hard start of ER), the alternative ends at that time also.

The broadcast automation system can therefore be programmed to automatically prune or eliminate alternatives that can no longer be completed in the time left by monitoring the progress of the end of the live event (e.g., Ball game) and updating the expected duration of Filler. By comparing the expected duration of Filler to the known durations of the alternatives, those alternatives that are too long can automatically be eliminated from the available alternatives from which the operator selects from at the end of the Ball game.

This concept can also be applied to news program rundowns. News stories in a rundown often have alternate versions which are chosen at runtime. It can readily be seen that alternate versions, typically having different durations can be chosen based on available time left before a commercial break or the hard time specified for a segment, such as weather, or before the end of the program.

Not only does the system and method of the present invention enable the scheduling and the broadcasting of schedules programmed, in one embodiment, the system generates "as run" logs reflective of the actual material executed (i.e., broadcast). To generate an as run log, new material and media representations are generated that define exactly what was broadcast. To generate an as run log, the play start and stop functions used to perform broadcast operations of constituents are modified. The play function takes a new argument: a parent representation. The parent representation identifies the material, and therefore through the representation, the media that functions as the parent material for the sibling materials form the as run log material. When an element or material is played a new representation (labeled as a type "as-run") is created, and attached by representation to itself, adding a proxy representation if at least one other representation exists prior. The proxy includes selection rules that ignore the as run representation unless the proxy is executed in one context of generating an as run log.

The new representation representative of what is aired is composed into the parent representation (e.g., material media). The start and stop functions are also modified to generate an as run log. When the start function detects the as run constituent, it records the start time (current time or SOM depending upon the media type) and other needed information. For example, the start function of a media for a tape will record which VTR it was played on and the SOM of the tape. The stop function will record the end time (current time or EOM). Just prior to completion of play, the play command records the last recorded end time into the end time field of the parent representation.

Figure 16A:
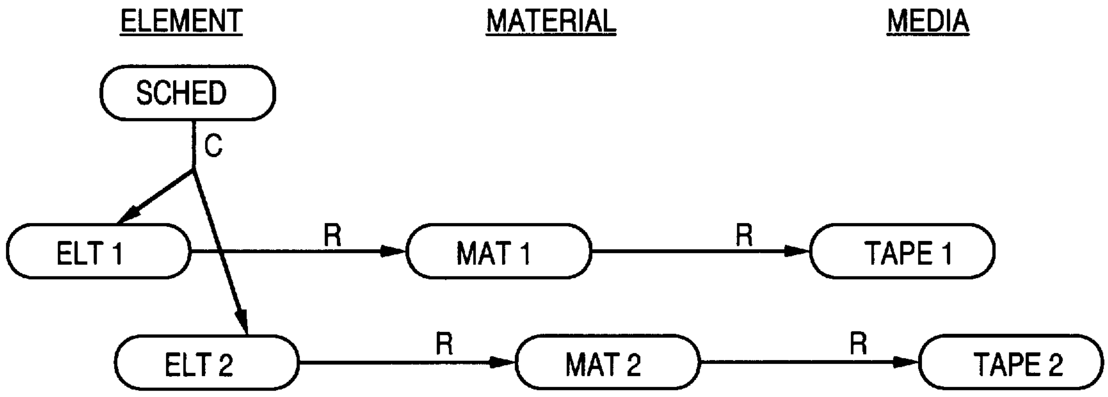
FIGS. 16*a*, 16*b*, 16*c* and 16*d* illustrate the process of generating an as run log n accordance with the teachings of the present invention.

Thus, creation of an as run log is performed by creating compositions of material and media as a result of executing the specified schedule composition. FIG. 16a shows a simple schedule composition, Sched, composed of Elt 1 and Elt 2, each having basic material and media representations.

Figure 16B:
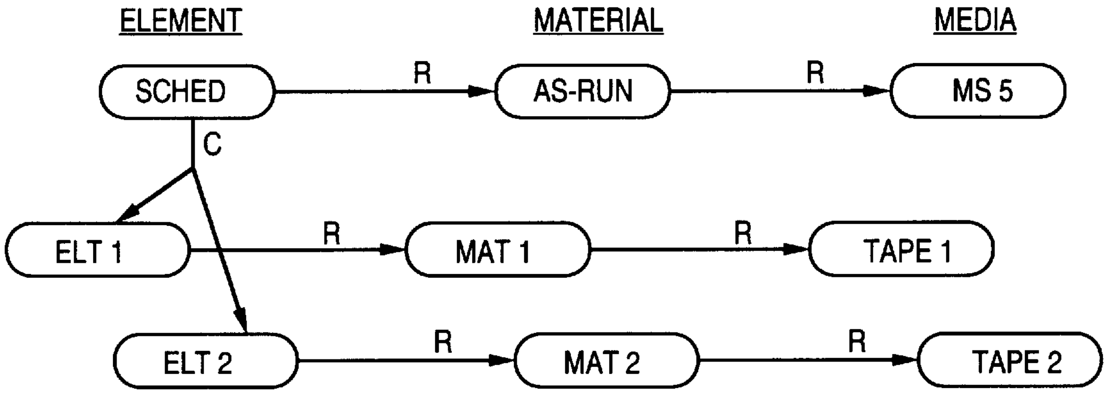

The as run log creation process starts with the execution of the parent element Sched. The broadcast automation system first creates a new material representation "as-run" for Sched. The new material will by definition be the combined as executed signal. The system also creates a new media representation for the new material. This new media might be a router crosspoint or switcher where the material signal is manifest as a whole unit. This is illustrated in FIG. 16*b*.

Figure 16C:
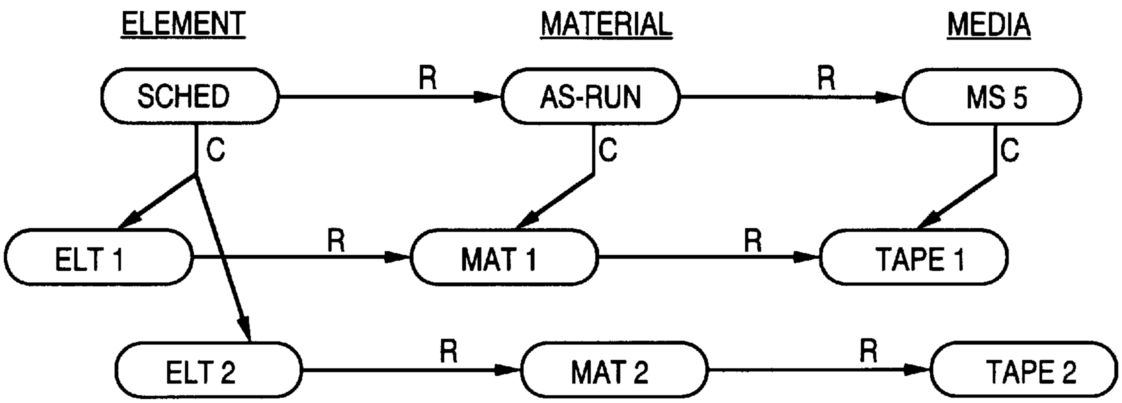
Figure 16D:
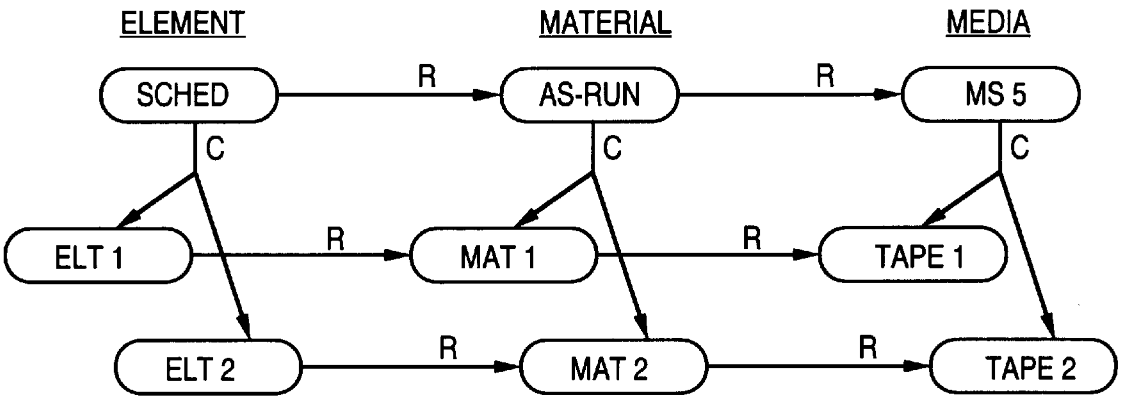

At the start of play Elt 1, see FIG. 16*c*, Elt 1 receives the parent representation As-Run and generates a new material mat 1 and media tape Z. The broadcast automation system creates new compositions (e.g., composition objects) on the As-Run material and the MS 5 media. These compositions map Mat 1 and Tape 1 to their respective parent constituents, As-Run and MS 5. The time base mappings of the compositions reflect the exact SOM/EOM of the child material and media. At the start of Elt 2, see FIG. 10*d*, the automation system completes the material and media composition structures. As each element finishes, the systems performs any additional accounting processes such as recording the actual EOM values in their respective compositions. FIG. 16*d* illustrates a completed as run log.

To produce a convention as run log from the present structure, the system, e.g., the broadcast automation system, would walk the tree rooted as the as run material constituent. The tree walk can be composed of any search algorithm that visits the desired nodes in the correct order. For example, to list only the individual low level constituents and the media which manifest them, the search visits all the leaf nodes of the material tree and lists the corresponding media nodes. To list the complete structure, the walk would be an in order traversal of all nodes in the tree.

As is illustrated in the above examples, the flexibility achieved and the advantages enjoyed using this structure are great. As noted earlier, the structure may be utilized by a variety of systems in the broadcast field to program schedules, edit schedules, edit elements of schedules, execute schedules and generate as run logs of executed schedules. The following discussion provides further discussion of the processes executed by the broadcast systems in accordance with the teachings of the present invention.

Figure 8:
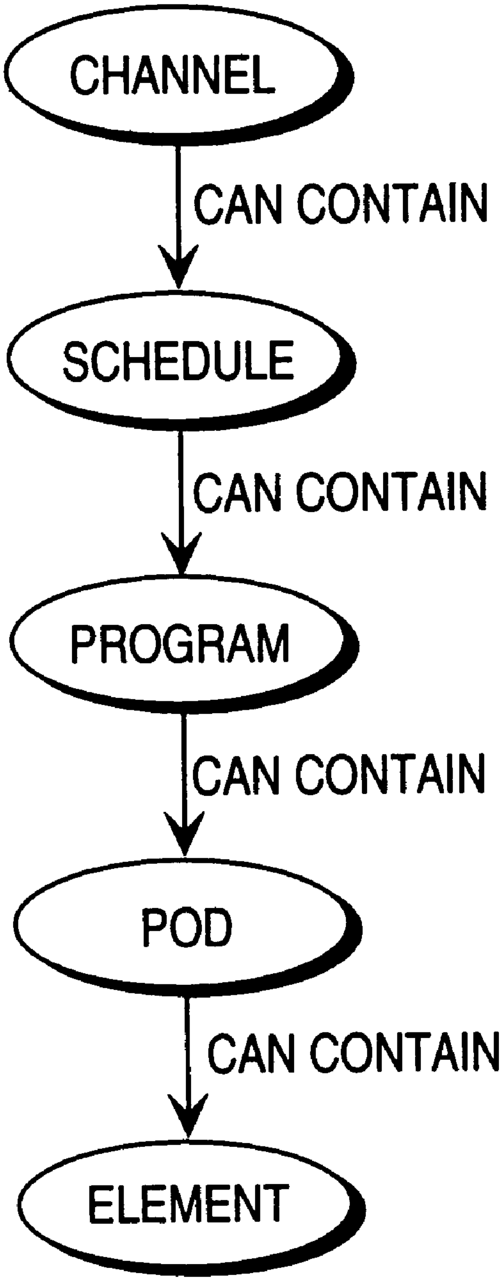
FIG. 8 illustrates a scheduling hierarchy that operates in accordance with the teachings of the present invention.
Figure 17:
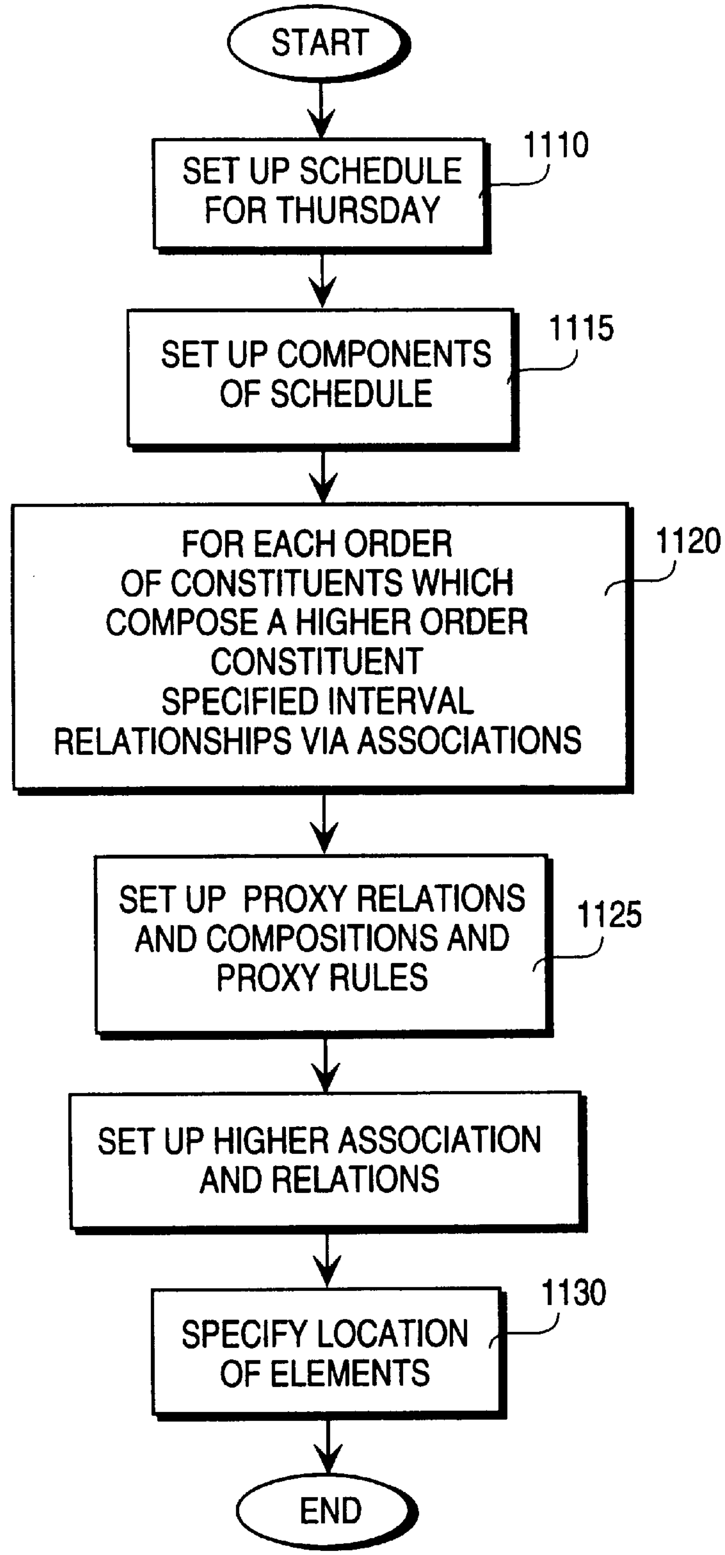
FIG. 17 is a flow chart illustrating an exemplary process for generating a schedule.
Figure 18A:
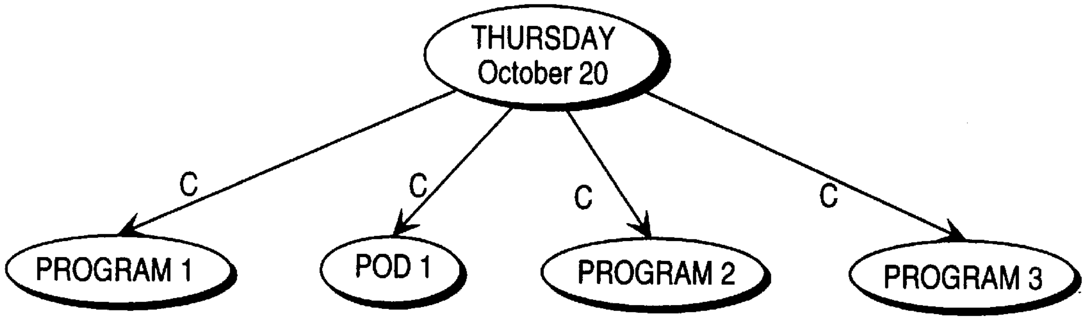
FIGS. 18*a*, 18*b*, 18*c* and 18*d* is an example illustrating the process of FIG. 17.
Figure 18B:
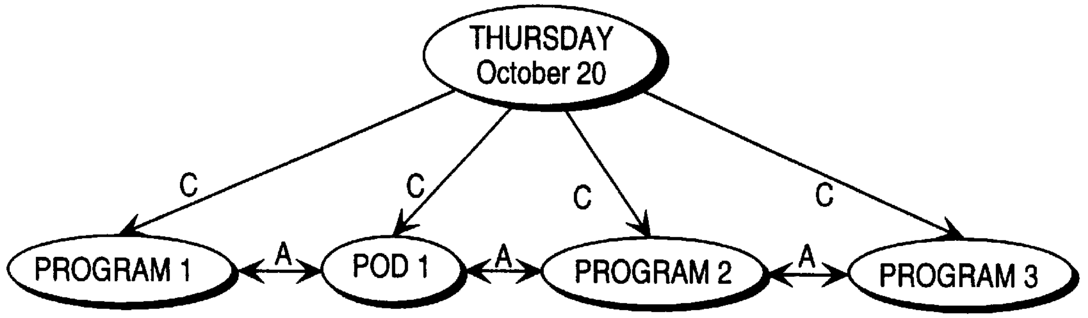

An exemplary process for generating a schedule is illustrated in FIG. 17. As is shown in the structure of FIG. 8, a channel can be composed of one or more schedules, e.g., a schedule for Monday, a schedule for Tuesday, etc. Thus, at step 1110, the broadcast programmer will specify, preferably with a user friendly graphical user interface or some other input means, that the schedule for a particular day, e.g., Thursday, October 20, is to be created. The programmer then proceeds, at step 1115, to specify the constituent that compose the schedule. See for example, FIG. 18*a*. The interval relationships, via associations, are specified, step 1120, in accordance with the relative order the programmer wishes the elements to execute to subsequently generate a broadcast. See FIG. 18*b* in which the associations (A) are simply specified to be that the end of program 1 precedes the beginning pod1, the end of pod 1 precedes the start point of program 2 and the end point of program 2 precedes the start point of program 3. The composition of each constituent, e.g., program 1, pod 1, program 2, program 3, is further specified as needed.

Figure 18C:
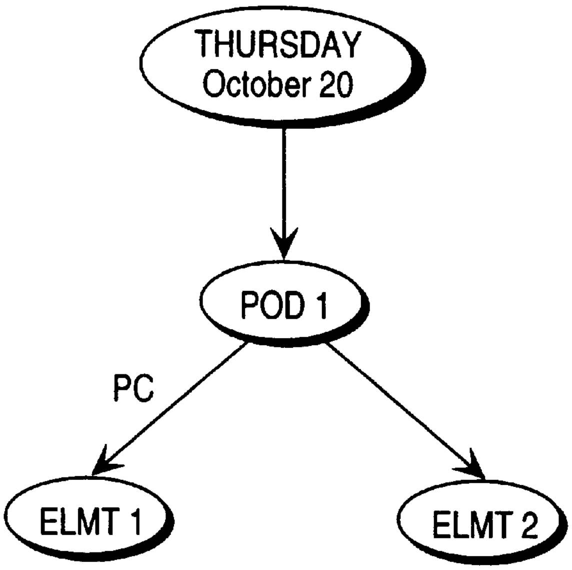

The programmer can also specify and addition relations and compositions, including proxy relations and compositions, step 1125, setting the proxy rules for execution when the proxy is subsequently executed during run time. See FIG. 18*c* which shows that the pod 1 is composed of proxy composition which will select the latest compiled components which have a duration less than or equal to the duration of pod 1.

Figure 18D:
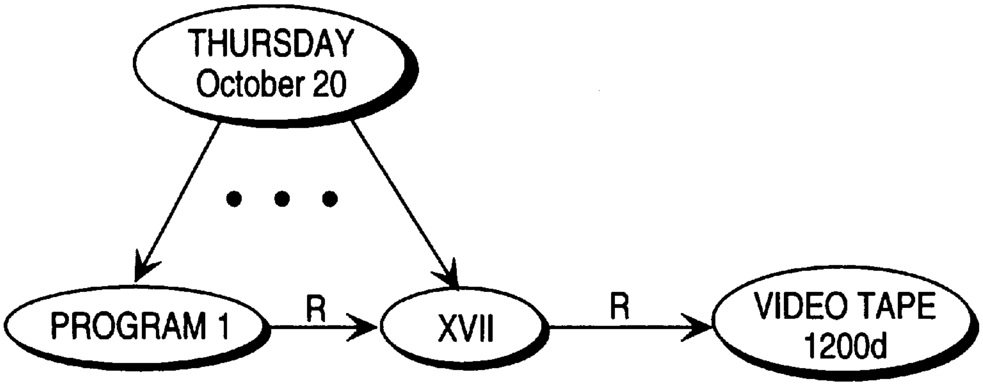

The programmer also can specify where the program elements can be found so the broadcast automation system, when executing a schedule, can identify where the broadcast material should originate from. Thus the programmer specifies the material and media for a particular constituent. See FIG. 18*d* which shows that program 1 is represented by material "XVII" which is represented by videotape "1200d".

The programmer can use the variety of programming techniques described herein to generate a schedule. The system can then perform a check of consistency to determine whether there are any problems with the schedule and the resources needed for the schedule. For example, the system can automatically identify conflicts in the schedule. Furthermore, in view of the media specified, available resources can be determined.

Figure 19:
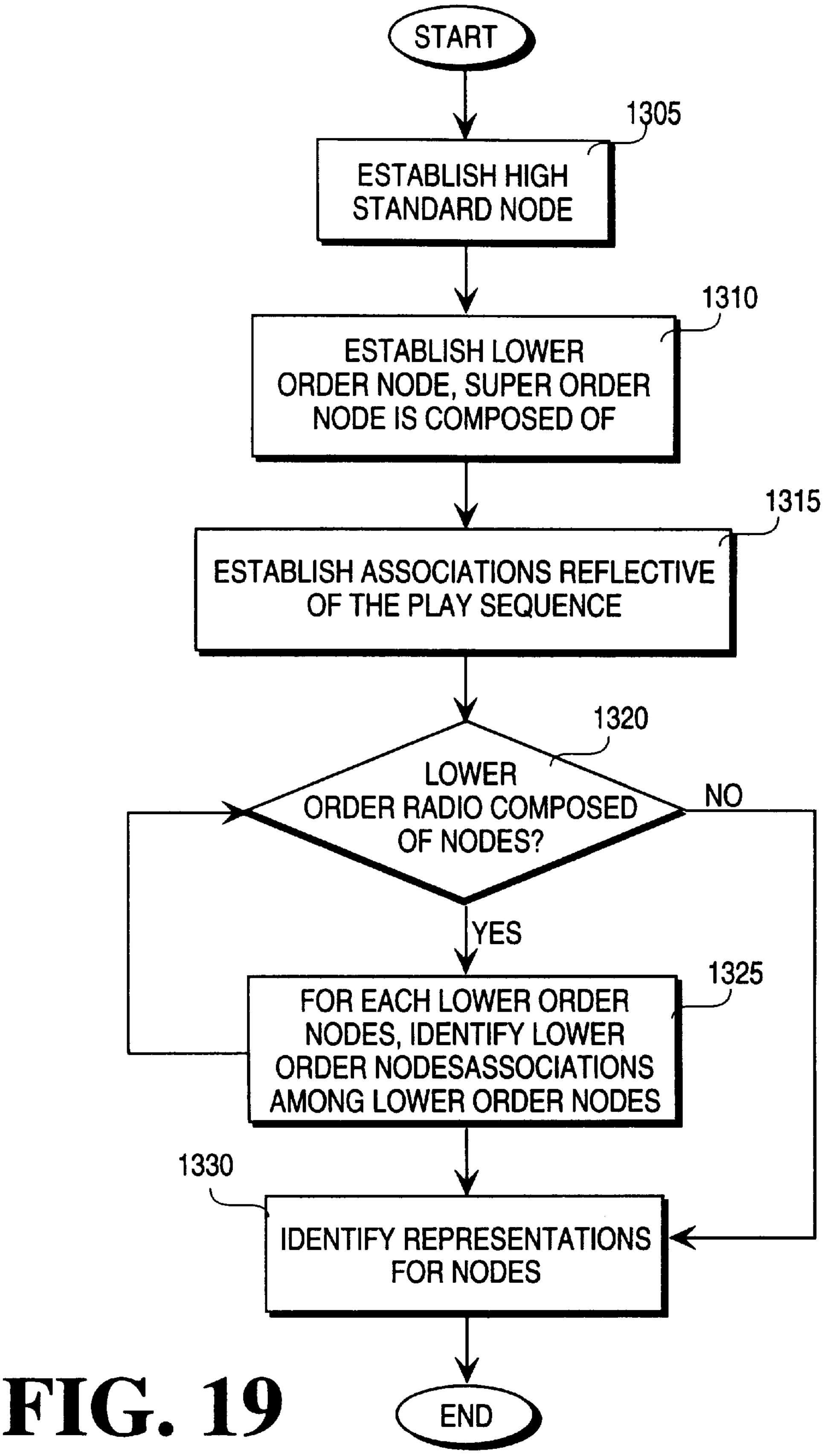
FIG. 19 sets forth an alternate process for generating a schedule in accordance with the teachings of the present invention.

A simplified process for generating a schedule is illustrated in FIG. 19. It is noted that FIG. 19 sets forth a simplified version of an exemplary process. It should be readily apparent to one skilled in the art, that a variety of scheduling processes can be used, having varying degrees of complexity and sophistication. Referring to FIG. 19, at step 1205, the highest order or root node for the schedule to be programmed is established. It should be recognized that this process can be used to generate smaller portions of the schedule that are later inserted into a larger entity, such as the schedule for a particular day. Furthermore, this process can be used to generate structures that can be reused in the same or different schedules at different times.

If generating a component for insertion into a schedule, the root node can be any type of element, such as those set forth in FIG. 8. However, when generating a schedule for a channel, for example, the root node would typically be identified as the channel which can be composed of one or more schedules, such as a Monday morning schedule.

To establish a root node, the parameters for the node are entered into the same, including the name of the element, temporal information and track information. In addition, representations that manifest the node may optionally be identified at this time.

Once the root node is established, at step 1310, lower order nodes which compose the root node are entered into the system. As with the root node, the parameters of each node are entered and any corresponding representations can also be entered. Thus, for example, if the root node is a schedule element, a first level of lower order nodes may consist of a plurality of programs. In order that it is clear in what order the nodes which are the composition of a higher order node play, associations are established reflective of the sequence the nodes play, step 1315. Although any temporal or relative technique can be used to indicate the sequence, it is preferred that interval algebra as discussed herein is used.

At step 1320 it is determined whether the lower order nodes are further composed of lower order elements. If so, for each lower order node, the elements are identified, parameters provided and associations established, step 1325. This process, steps 1320, 1325 is repetitively performed until the lowest order constituent is identified. At the time the nodes are established, or at a later point, representations are provided identifying material and media which represent the scheduling constituent.

Figure 20A:
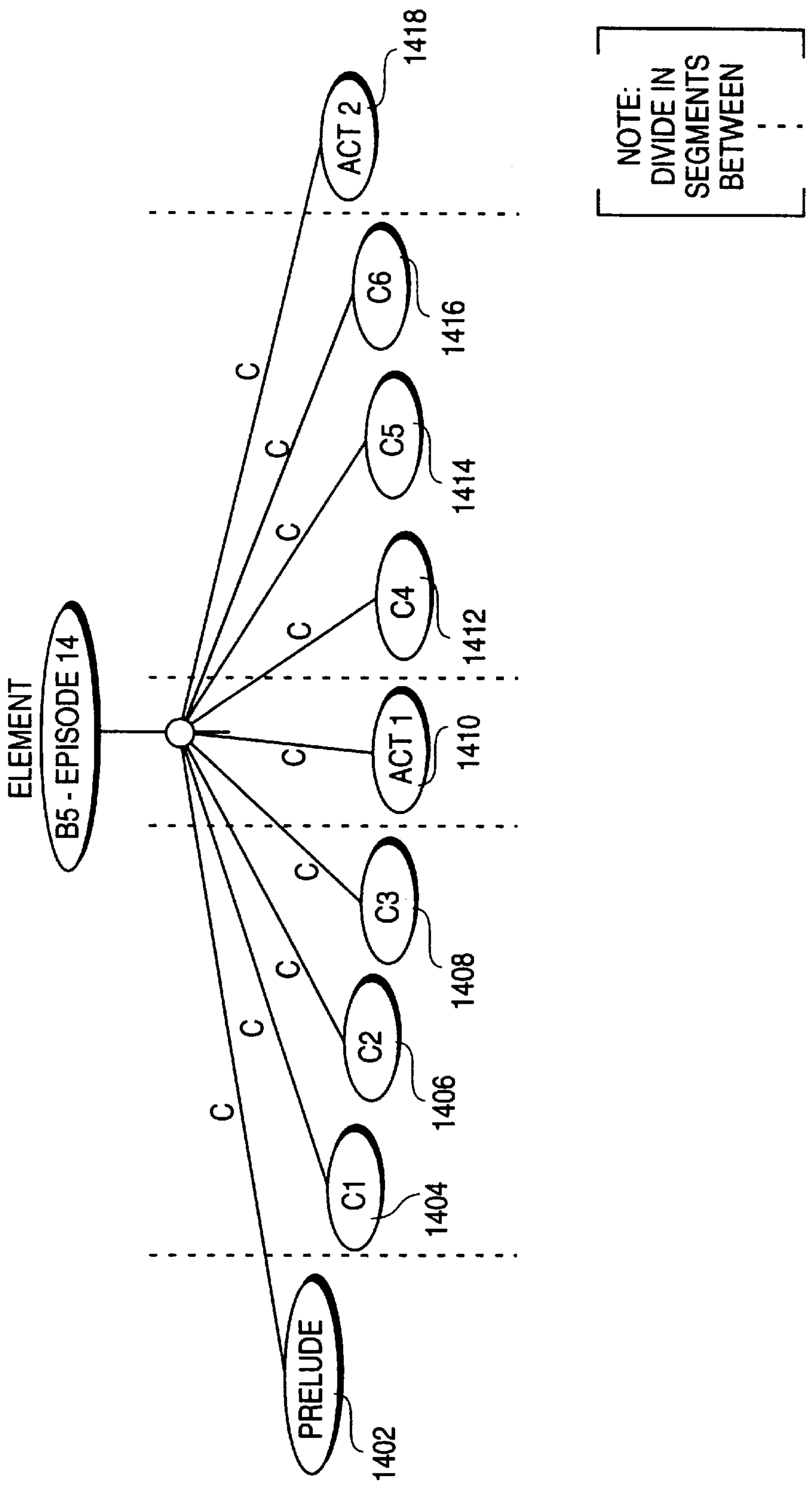
FIGS. 20*a*, 20*b*, 20*c* and 20*d* illustrate the building of a program.
Figure 20B:
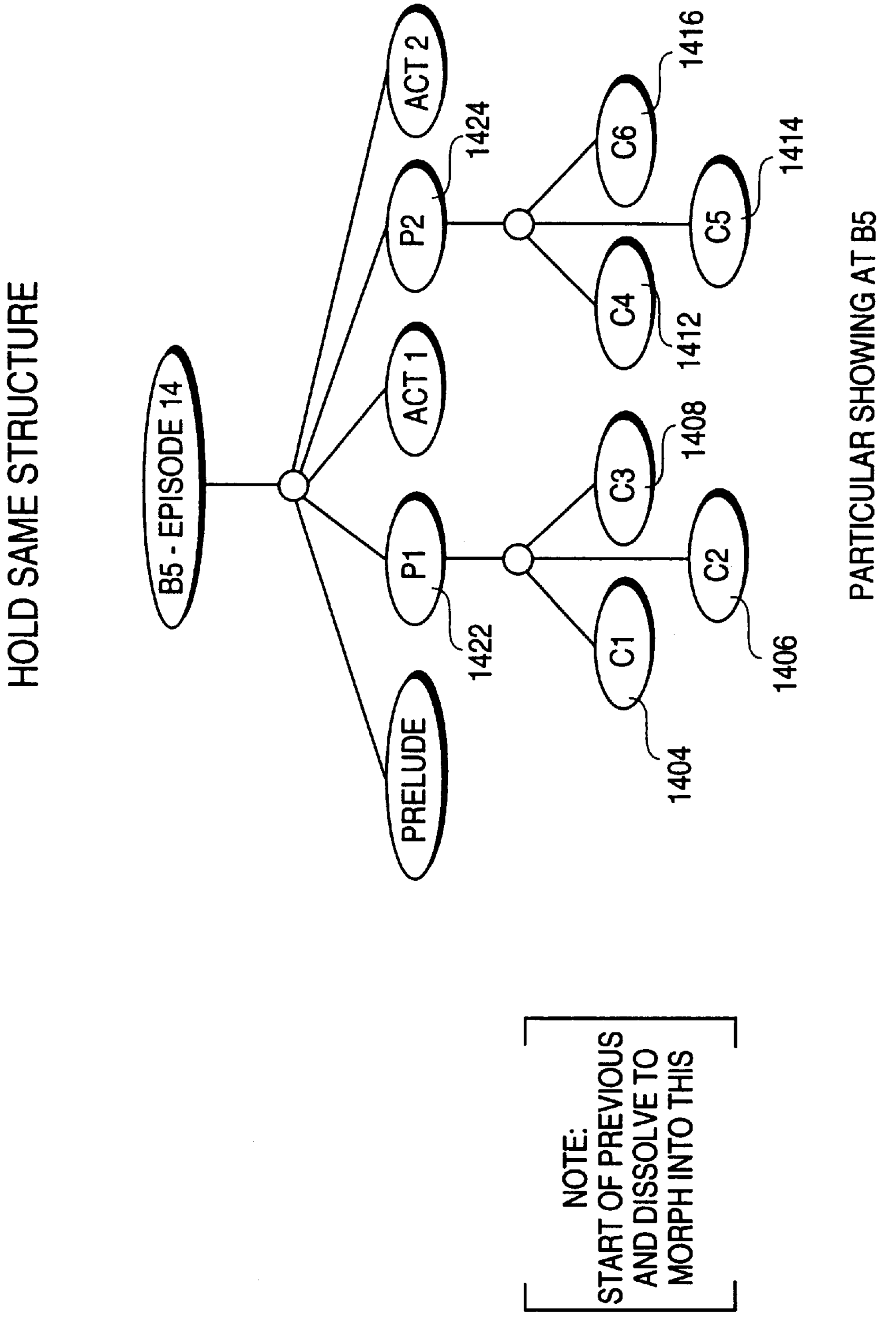

FIGS. 20*a*–20*d* illustrate the building of a program. Referring to FIG. 20*a*, the element B5-episode 14 is established and is composed of a number of lower order constituents, such as a prelude 1402, clips 1404, 1406, 1408, Act 11410, clips 1412, 1414, 1416 Act 2 1418, etc. FIG. 14*b* shows a more structured representation wherein the clips 1404, 1406, 1408, 1412, 1414, 1416 are representative of commercial spots and are organized into pods P1 1422 and P2 1424.

Figure 20C:
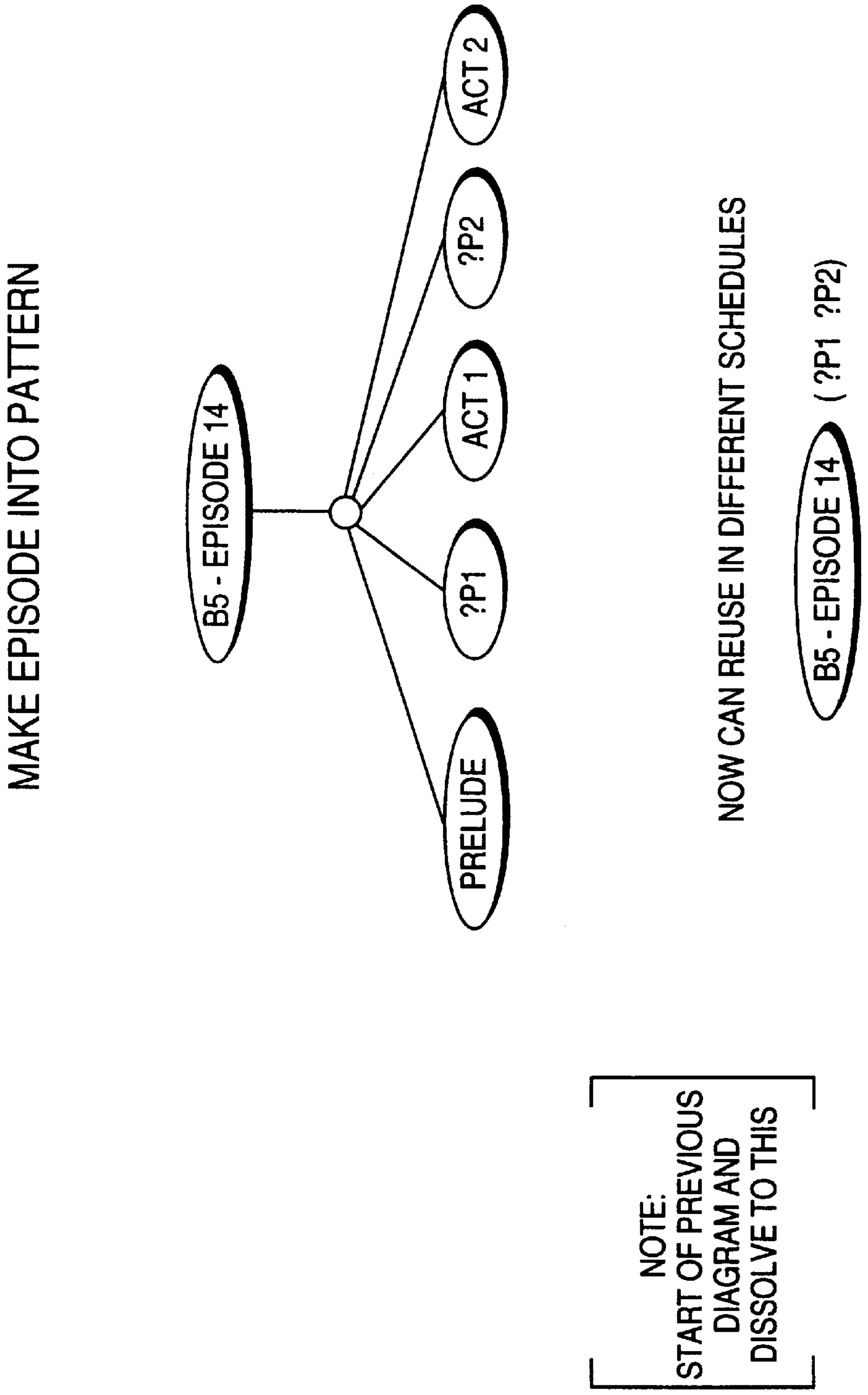
Figure 20D:
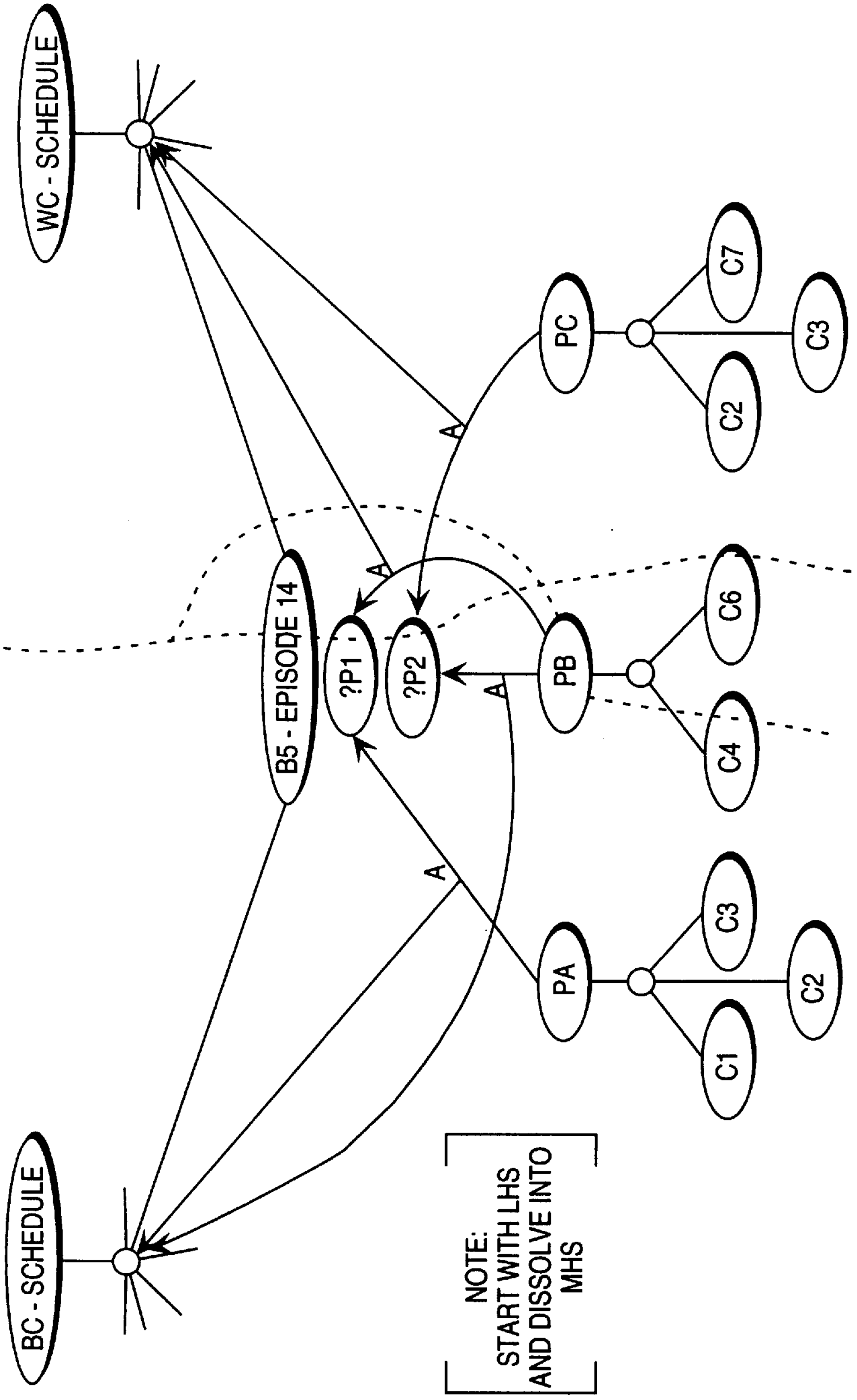

Both embodiments shown in FIGS. 20*a* and 120*b* are representative of a particular broadcast of the program. The program B5-episode 14 can be structured for repetitive use. In particular, it is desirable to change the clips, e.g., constituents 1404, 1406, 1408, 1412, 1414, 1416, to be selected depending upon when the program is broadcast. FIG. 20c illustrates the structure of program B5-episode 14 for repetitive use. In this example, the pods P1 and P2 are established as a variable pod ?P1 and ?P2. As the pods ?P1 and ?P2 are variable, the program can be instantiated or broadcast multiple times with differing commercial spots. For each broadcast an association is established with the pods ?P1 and ?P2 are respectively to be bound to. The association is one of equality wherein the context, e.g., the day or time zone the program is broadcast, specifies the particular pods the variable constituents are to be bound to. This is illustrated in FIG. 20*d* which shows two schedules, one for the east coast, EC_Sched and one for the west coast WC_Sched. Both schedules are to broadcast the program B5 episode 14. Depending upon the context which in the present example would be the schedules EC_Sched or WC_Sched , the broadcast automation equipment will select one of pods PA, PB or PC to be bound to variable pod ?P1 and one of pods PA, PB or PC to be bound to variable pod ?P2 and therefore broadcasted.

The issue with different time zones and use of a common schedule is further complicated when dealing with a live broadcast in one time zone and a recording of the live broadcast in the later time zone. Proxy representations enable a programmer to schedule the same constituent multiple times with different representations playing at different times. This situation typically occurs in a broadcast when a similar program airs on different days. For example, a program The Evening News is a ½ hour news show broadcast every evening at 6 PM. It is very convenient to set up the same element to be scheduled every day. However, each day will provide a different actual show. To address this issue, each day's show is represented by a different material representation of the element coordinated by a proxy representation.

A constituent, e.g., a program is created and titled "The Evening News". A proxy representation is generated for The Evening News. the selection criteria programmed into the proxy representation is "pick the latest version". As each day's program is edited, a new material and media is created for the show (representing the show for that day). This new material is attached to the proxy representation by updating the proxy representation object to include the representation in its list of possible representations.

When the evening schedule is played and it is determined that The Evening News is to be played, a play command is sent from the broadcast process to the constituent The Evening News. The Evening News, finding that it has a representation, tells the representation to play. The proxy representation in response to the play message, searches its list of material representations and find the latest one created (in accordance with its search criteria). This material representation identified is sent a play message by the proxy representation. The material representation, finding that it has a representation, passes the play message to its media that it is represented by. The media broadcasted is the most current version of The Evening News.

This process can be used to update components of a higher order constituent, such as elements, pods, programs and schedules and can be used to affect a subset of components which compose a higher order constituent.

Proxy representations can also be used to manage the play out of alternative compositions or playlists. A common situation in broadcast or news programming is the run-time selection of one constituent or event to air from a set of alternative events. For example, in news programming, stories will often have multiple versions of the same news piece, each one edited to a different length. The news piece of the desired length is then chosen during the news broadcast. Furthermore, following a live event in broadcasting, there often will be several alternative scheduling constituents (e.g., programs), only one of which will air depending on how long the live event runs. Another common situation in broadcast is that there will be an alternate playlist either executing in parallel with the main list or ready to start on command. This may be performed when one of the schedules includes a line broadcast. Proxy representations can be used to address the above situations.

As noted previously, proxy compositions allow the specification of different children for the same parent constituent. The proxy is created by the parent and is given a set of rules or criteria is must use to select at runtime from among the set of compositions the proxy owns. In all cases, the proxy is told which composition is the default, i.e. which one to return if it can't make any other determination.

For purposes of discussion, we will assume a parent P, a proxy Px, and two compositions C1 and C2. As is readily apparent, the discussion can be generalized to any number of compositions.

The first illustration of the use of a proxy representation in scheduling is with respect to news programs. Suppose P is an element designated to be the general story that plays (e.g. "Dog Saves Kitten"). There are 2 different versions of the story, described by C1 and C2 respectively. P is composed into the news rundown (playlist) as the third story to play. The news director designates C1 as the preferred or default version. This information is placed in Px. During execution of the rundown, when the controlling system starts playing the second element in the rundown, the system sends a message to P to ready itself for play. P passes this message to Px which in turn tells both C1 and C2 to get ready to play. Each composition then allocates the resources it needs (VTR, media, disk, router, etc.) to execute a play function. Up until a short period of time before P is told to play, the news director may designate C2 or C1 as the preferred composition. This designation is made by sending a message to Px to change the preferred composition to C1 or C2 as appropriate. Play of the particular story is initiated by starting P in response either to time or more usually in news operations by an operator-initiated trigger. Once the trigger is received, a Play message is sent to P. P in turn sends the Play message to Px which passes a play message on to either C1 or C2 as previously designated. Preferably, px also sends a message to the non-playing composition to free its resources back to the system.

Alternate programming following a live event can be similarly specified. In this example, the prior live event element is designated as L and L and P are specified as composed into the schedule element and an association is created between L and P which states that L is meets P (L ends and P starts immediately). The broadcast system is configured to notify P to get ready at the start of L. L is typically ended by a manual trigger from an operator. At any time before the ending of L, the operator can select C1 or C1 as the composition to play at the end of play of L. Once the trigger is sent to tell L to stop, P is immediately started by the schedule element because of the meets association between L and P. The proxy relation specified to select C1 and C2 operates as in the news program example.

Proxy relations also enable alternate constituents to execute in parallel with the preferred constituent. In this example, the designation of the preferred playlist is identified and played as the preferred constituent. Typically the constituent P is usually composed at a higher level such as a 4 hour schedule or a channel. Thus P in this example embodies a set of lengthy playlists. The behavior of proxy relation px in this case is somewhat different. As before, when px receives a ready command, it tells C1 and C2 to get ready. However, when px receives the play command, it sends the play command to both C1 and C2, causing them both to begin execution of play. The proxy relation px is further programmed to command the broadcast facility's routing equipment to switch the signal generated by the preferred composition to broadcast to air. During the execution of the preferred composition, the proxy relation px can receive a message telling it to switch the preferred composition. Px responds to this command by telling the plant's routing switcher to take the new preferred composition's output (already in progress) to air. When the preferred composition finishes execution, Px stops the operation of the other compositions and returns control to P which in turn passes control on to the main schedule.

A variation on this example is that when Px is told during play to change the preferred composition, it controls the routing switcher to take the new preferred composition's signal to air and tells the prior composition to suspend its operation rather than continue in parallel. If px is subsequently told to change the preferred composition back to the suspended one, it tells that composition to resume play from the point it was suspended.

All of the above possibilities and other variations can be programmed into the proxy relation at the time Px is created or changed or added after Px is created. Preferably the proxy relations is coded using object oriented programming and created a object that is of a proxy class. However, it is readily apparent that the proxy relation can be embodied a variety of ways using a variety of programming technologies.

The structure and processes described herein lend themselves to a variety of innovative applications in the broadcast scheduling and broadcast operations areas. In one embodiment of the scheduling process of the present invention, a scheduling system includes a module to automatically detect inconsistencies in a schedule programmed by a programmer. When generating a complex schedule such as those typically generated in a modern broadcast facility (referred to in the art as scheduling a playlist), it is possible that the scheduling operator can enter conflicting specifications such as constituent A follows B which follows A (this is obviously a inconsistent specification of a schedule. In a more complex system, it is possible to generate inconsistencies which are subtle an not so easily apparent.

As noted above, when processing the interval algebra matrix representative of the scheduling relations among constituents, a false entry in the constraint matrix is indicative of an inconsistency. As is apparent, there are no false entries at the start of the multiplication of the matrix to resolve all interval relations. However, the propagation algorithm may produce one or more false entries which can be detected during propagation to catch the inconsistencies early in the scheduling process.

Figure 21:
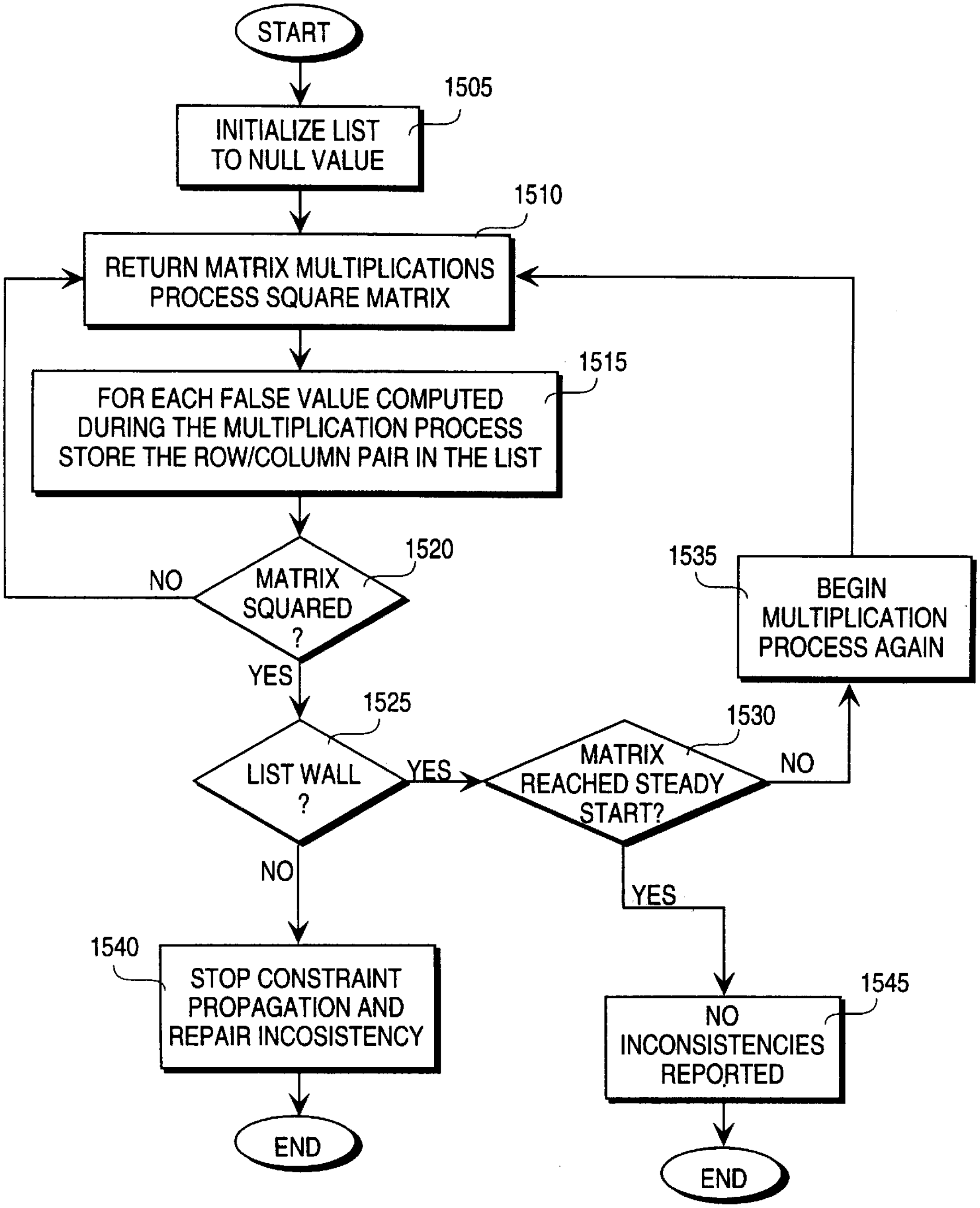
FIG. 21 is a flow diagram illustrating one embodiment of a process for identifying inconsistencies in a schedule.

An illustrative process is set forth in the simplified diagram of FIG. 21. Referring to FIG. 21, a list is initialized to some predetermined value indicative of null, step 1505. The matrix multiplication process to square the matrix is performed, step 1510. As each new matrix entry is computed, if the value is false, the row/column pair is stored in the list, step 1515. Once one iteration is performed, step 1520, the list is reviewed to determine whether it contains any entries, step 1525. If the list does not contain any entries, at step 1530 it is determined whether the matrix has reached a steady state indicative that the process for resolving all interval relations for a particular schedule is complete. If the matrix has reached steady state, it is preferred that the programmer is notified that no inconsistencies have been reported, step 1545. If the matrix has not reached steady state, the multiplication process for the next squaring of the matrix is initiated, step 1535 and the process, steps 1510, 1515, 1520, etc. is repeated.

If the list contains some row/column pairs indicative of false entries, the constraint propagation process is halted and the programmer is notified of the inconsistencies, step 1540. Preferably, the process checks each row/column pair from the list to the originally specified entries in the matrix. Those initial entries in the matrix stated as other than true (the default entry) is reported to the programmer as the possible source of the inconsistency.

Figure 22A:
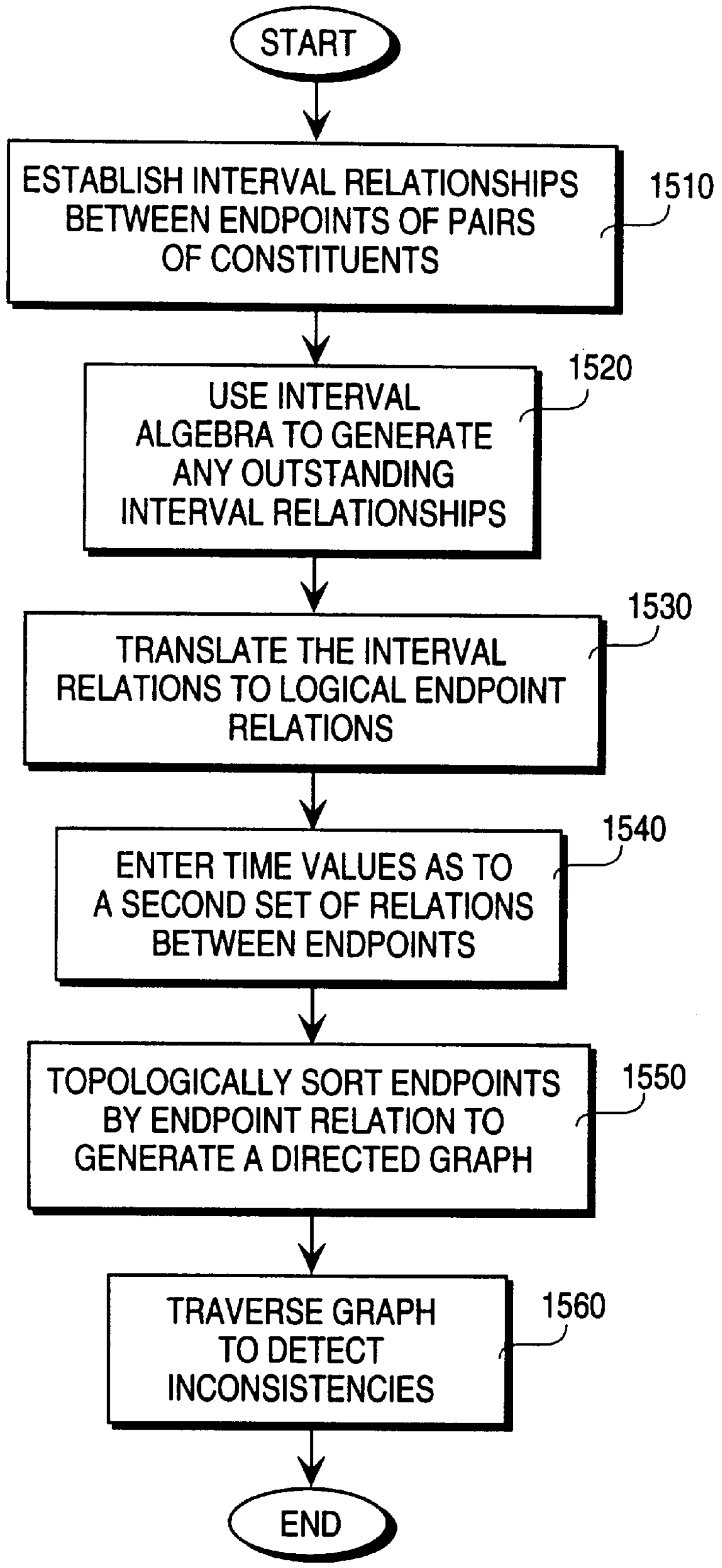
FIG. 22*a* is a flow diagram illustrating another embodiment of a process for identifying inconsistencies in a schedule and FIG. 22*b* provides an example of a directive graph of orderings of endpoints.

In addition to detecting scheduling inconsistencies without a time specification, the system can provide a module to automatically check for inconsistencies in a schedule that temporal values, e.g., specific start times, have been specified for. A simplified flow chart illustrating one embodiment of the process to check for inconsistencies is shown in FIG. 22*a*.

As noted above, the associations among constituents are indicative of the sequence the constituents are to be played.

In the present embodiment, interval relations are set between pairs of constituents, step 1610. Using interval algebra, the balance of the relations between pairs of constituents are established, step 1620. At step 1630, the interval relations are translated to logical endpoint relations. Although any form can be used, in the present embodiment, the interval relations take the form of <, <=, =, <>, >=, and >. These logical endpoint relations are the constraints that must be obeyed in the system.

At step 1640 a set of temporal relations is generated from time values associated with the constituents. For example, the programmer may have already assigned specific time values to each constituent. Each temporal relation in the second set is an offset between two endpoints. A positive value indicates that the second endpoint follows the first endpoint by the specified period of time. For example, the duration of a constituent's interval is the offset of the second endpoint from the first. A zero value indicates that the endpoints are coincident.

Using the set of temporal relations, which are the values of endpoints and the temporal relations between endpoints, and the set of logical endpoint relations, the system can detect inconsistencies. At step 1650, the endpoints specified in the set of logical endpoint relations, are topologically sorted by endpoint relation. This creates a directed graph of the orderings of the endpoints. An example is set forth in FIG. 22*b*. The graph is then traversed, step 1660, summing offset values and comparing to any specified times in the set of temporal relations. Any path that has no offset value causes the path duration to become undefined indicating an error in scheduling. Furthermore, for any endpoint for which there is no temporally defined path reaching it, e.g., running into a live event, the inconsistency calculation must restart at that point using no history of the traversal.

Prior art broadcast automation systems typically use a time based playlist to determine what to execute or play next. A broadcast automation system that operates in accordance with the teachings of the present invention preferably traverses the tree in a systematic manner to determine what is the next element to execute and the media that manifests the element to execute. However, it is contemplated that a translation process can be provided to translate the tree structure to a playlist backwards compatible with existing systems. Thus the flexibility of programming the schedule is achieved, while retaining existing broadcast equipment.

Figure 23:
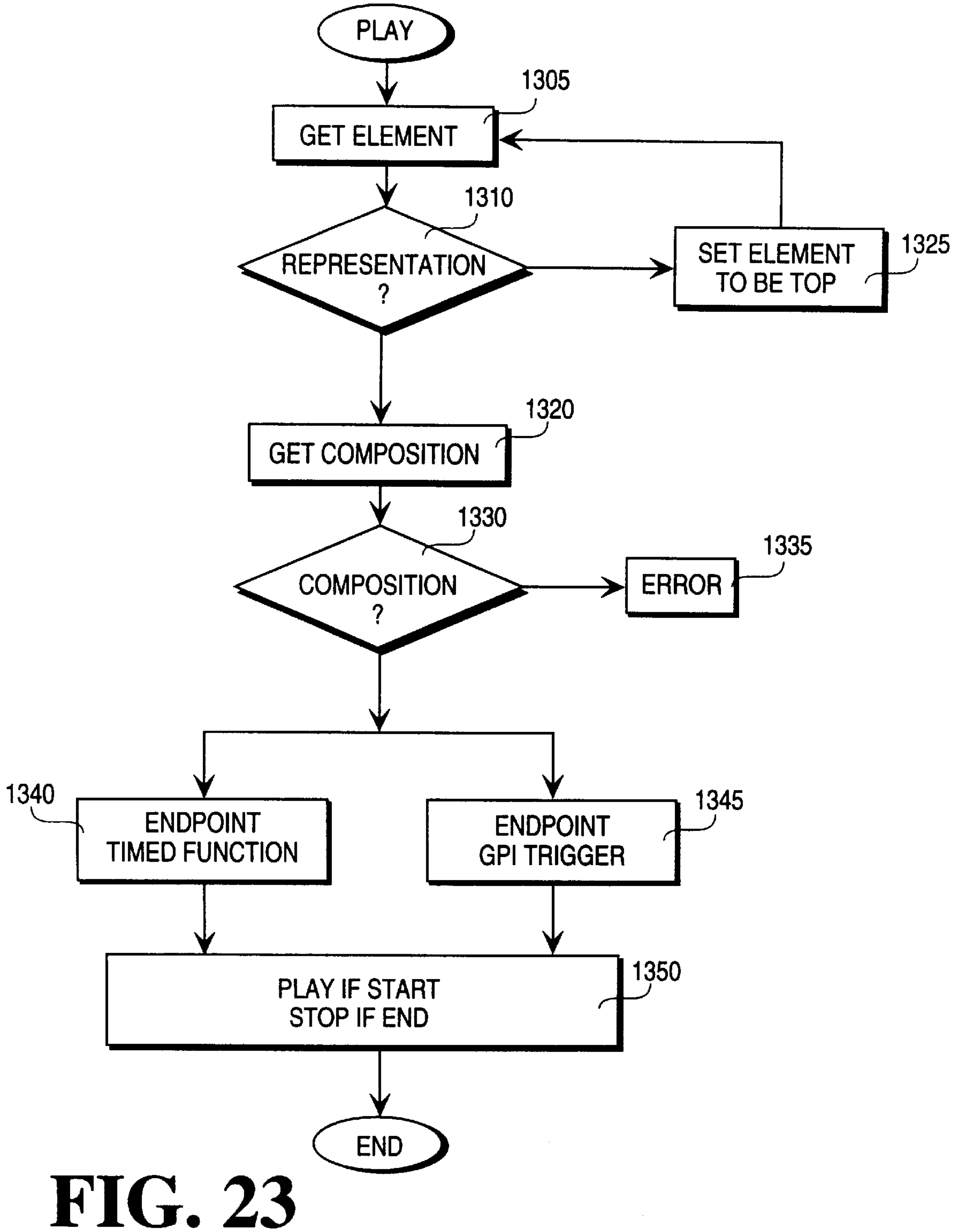
FIG. 23 is a simplified flow diagram illustrating one embodiment of the broadcast process in accordance with the teachings of the present invention.

FIG. 23 is a flow chart of a simplified version of one exemplary process that can be executed on a broadcast automation system for generating a broadcast. Referring to FIG. 23, at step 1305, the element and its attributes are retrieved. The attributes include the name of the element, the temporal specification, such as start time and duration, and track sets. Also retrieved are the corresponding representations and associations. If there is a representation for the element, step 1310, then the representation is set to be the element to be played, the play process is initiated again for the new element. Thus Steps 1305, 1310 and 1315 are repetitively performed until no further representations are retrieved. Thus, for example, for a particular element represented by a material, the process examines the material to determine the media that the material is represented by.

Once an element has been reached that has no representations, at step 1320, the composition is retrieved. If there is no composition, step 1330, an error is detected, step 1335. Otherwise, the endpoints (i.e., start and end points) of the element are examined to determine whether it is a timed endpoint or manually triggered endpoint (GPI Trigger), and the system waits until the time, step 1340, or corresponding trigger, step 1345, occurs before starting or stopping the element, step 1350. It should be noted that the stop command applied to media immediately stops play. However, the stop command applied to an element or a material may have to clean up pending plays/stops if the element or material is in a wait state for some action.

FIG. 24 sets forth exemplary pseudo code of a simplified version of one embodiment of a process for executing or playing a broadcast. It is readily apparent that this pseudo code is only one example and a variety of different approaches can be used. The pseudo code illustrates that the play process is includes the recursive descent through the composition structure (the tree) to find a constituent with a valid representation and a lateral search across representations to find the best media to play in response to the scheduling needs of the constituent. This also demonstrates how the endpoint relations (derived from the interval relations) are used to determine whether to start or stop a constituent. As noted previously as each node is traversed, the node information, e.g., a pointer to the node object, is pushed onto the stack. To traverse back up the tree, for example, to return to the level of parent constituent which is associated with other constituents, the node information is popped off the stack.

Preferably a stack structure is used to execute the process. Stack are also used to track associations during a tree walk. As associations are encountered at nodes during a tree walk, the associations are pushed onto a stacks. The associations identify the context of the association which is the composition (e.g., composition object). Preferably two stacks are used. One stack is for ordering associations relative to their play sequences, e.g., A precedes B. Another stack is used for associations of equality which are used in the process of binding variable constituents to real constituents. When traversing down to the lower order constituents, the associations are popped off the stack and used to bind variables or sequence the play of the lower order constituents. In addition, the wide variety of scheduling and playing options, the ones above only specifying a few of the options and features, the system can be used to perform tasks typically addressed by a completely separate mechanism from the scheduling process.

The scheduling process can also be configured to determine whether sufficient resources exist to support the schedule. For example, the media which manifests different elements which require concurrent usage are determined from the scheduling structure. Preferably the process takes into account time required to queue up certain media or to change data in certain media. The process may also include timing requirements that, for example, specify that all the equipment required to play the media scheduled to play during the next hour must be available. Thus the process performs a traversal of the tree structure, determining the timing of play of certain scheduling constituents, identifying the media represented by the constituents, identifying the resources required to play the media and determining whether the sufficient resources actually exist. As is readily apparent, a number of embodiments can be programmed into the system. For example, this check of available resources can be done as each constituent is scheduled, generating a message to the programmer when a resource violation is detected. Alternately, this process can be performed in a batch manner at completion of a schedule or even during broadcast as variables are bound. It is preferred, however, that resources are available for all possible elements that may bind to scheduled variable elements.

In addition, using the structure described herein, the control of primary and backup media is easily managed through the use of proxy relations. In broadcasting, important channels or events are played using a 1 for 1 backup scheme for redundancy in case of failure. This involves playing the same signal via two completely different sets of resources (e.g., VTRs, effects units, character generators, etc.). In case of failure with any of the primary resources, the second of backup signal will be switched to air so that there is little or no interruption of service. One way to support this is through the use of proxy representations for the material representations of elements.

To provide backup a constituent, e.g. an element E, is composed into a schedule. The material representation is identified, e.g., as constituent M. A proxy representation, e.g., px, is added to M. The proxy function is to cause all attached representations to play. Thus the proxy function will cause both the primary and the backup to play. For example, if the signal has been recorded on two tapes, T1 and T2 and the tapes are respectively identified in the system as media MD1 and MD2. Both MD1 and MD2 are attached to proxy representation px. When E is set to play, E finding that it has a representation, sends the play command to px which in turn sends a play command to both MD1 and MD2 causing them both to play. Px is further configured to control the station routing switcher. In this embodiment, the proxy relation further includes functions that issue the proper commands to control the routing switcher. The proxy represented defaults to select the signal from MD1 to air. If in the middle of play a problem with MD1 is incurred, the system sends the proxy representation a message to use the backup. The proxy representation executes it functions to generate a command to control the station router to air the signal from MD2.

The structure also enables the recording of new media that is synchronized with the re-broadcast (turnaround) of an incoming signal. In particular, it is quite common that a recording of a live broadcast is subsequently played in a later time zone. Thus it is desirable to record an incoming feed at the same time as it is broadcast, so that the recording can later be rebroadcast. For this purpose the system includes an element type referred to herein as RecordElement. RecordElement functions as any other constituent defined herein and similarly processes play, start and stop functions initiated by the system; however, in response to a play message, RecordElement initiates a record of its media.

Thus, to schedule a simultaneous play and record operation in a schedule, an element E is composed into a schedule S. E's representation is defined to be a material M (which is the incoming feed) whose media is D (the source point for the signal). The RecordElement R is created and its representation is set to be M. A new media DR is created in the structure specifying the tape the broadcast is recorded on. The media DR is attached to material M via a proxy relation which performs the function of selecting the media when the as run log is to be played back to view or for purposes of generating a log in list format. The new media DR is also marked such that it is not considered valid to represent M according to the selection criteria of the proxy relation. In addition, an association of equality is set between RecordElement R and element E so that R plays when E plays.

Thus, when E receives the message to play, it performs the process steps similar to those set forth in FIGS. 24*a* and 24*b* and locates the material M and the media D that represents E. Because of the equality association, R plays at the same time as E. As noted above the RecordElement executes the play function to record on its media. One example of the RecordElement play function is set forth in the pseudo code below. It will be readily apparent to one skilled in the art that the pseudo code is illustrative and other code and steps can be performed to achieve a similar result.

Play (elt: RecordElement)

rep=GetRepresentation (elt)—gets M med=GetRepresentation(rep)—gets the incoming signal media allmed=GetAllRepresentations(rep)—gets all the representation M may have rec=GetRecordMedia(allmed)—function special to RecordElement that gets the tape Record(rec,med)—starts recording the incoming feed end play The stop function for RecordElement stops the recording and sets the media to be valid starting at the current time. Thus, the next time E is told to play, the corresponding proxy relation which evaluates the dates of the media will find the new tape media to be valid (the incoming will not be since it was defined for a specific time now passed).

Figure 25:
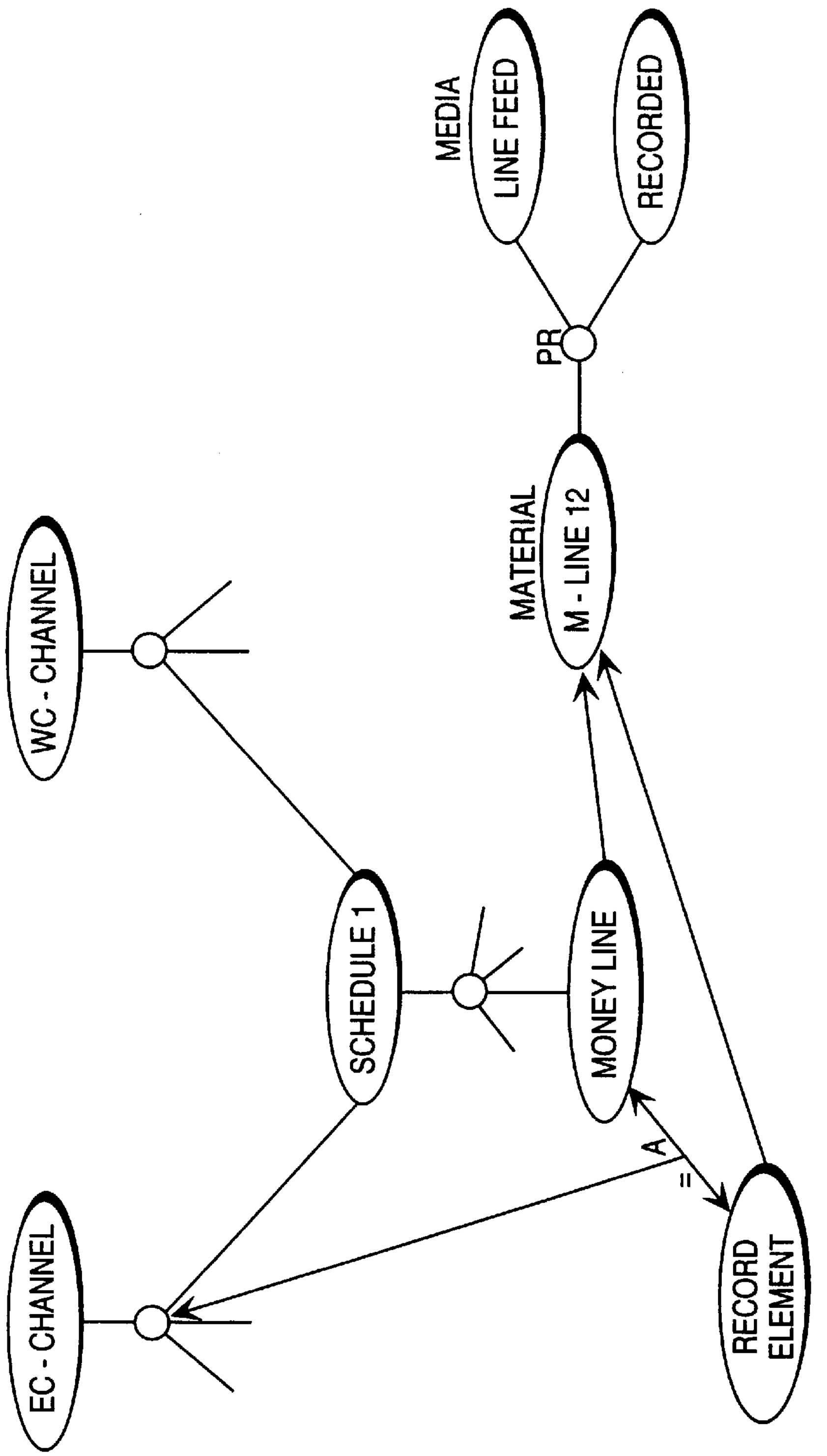
FIG. 25 illustrates the automated recording of live events for subsequent playback.

As can be seen from the diagram of FIG. 25, the association which equates the Record Element to the playable element, Maney Line, exists only in the context of the composition of Sched 1 into the EC-Channel. The recording is established as the second media representation for the material M_Line12 and is selected by the proxy representation which selects either the line feed or recording based upon its selection rules, such as select media having valid date and time. The line feed has a valid date and time reflective of the broadcast and the recording has a valid date and time which begins after the line broadcast.

The structure further lends itself to editing operations. For example, a linear editor operating on a general purpose or specially configured computer system creates a material structure that represents the materials created during the editing process. Typically each material includes multiple representations as different forms of the clips of the represented elements are typically stored on the system on a hard disk in compressed form, accessed for multiple edit operations, and on a tape in its original form, typically accessed with the final edited version of the material created via the edits is generated. Using this structure, the edits are manifested as compositions of higher order materials in order to build larger structures reflective of constituents of longer durations.

The invention has been described in conjunction with the preferred embodiment. It is evident that numerous alternatives, modifications, variations and uses will be apparent to those skilled in the art in light of the foregoing description.

What is claimed is:

1. In a broadcast system, a method for identifying for media for manifesting a scheduled broadcast element, comprising the steps of:

specifying at least one broadcast element;

for each element, specifying at least one corresponding material that represents the broadcast element, said material identifying a signal which represents the broadcast element;

for each material, specifying at least one corresponding media that represents the material, said media identifying a media from where the signal is transferred; and for a particular broadcast element, identifying the media that manifests the broadcast element based upon the material and media specified.

2. A broadcast system comprising:

a processor;

a plurality of media devices comprising media coupled to the processor a memory coupled to the processor, said memory storing a broadcast schedule data structure comprising;

at least one scheduling element, for each scheduling element, at least one corresponding material that represents the scheduling element, each corresponding material identifying a signal which represents the scheduling element, and for each material, at least one corresponding media that represents the material, said media identifying a media from where the signal is transferred;

said processor searching the data structure for the scheduling element, determining the material representing the scheduling element and determining the media representing the material to identify the media device to use to generate a broadcast of the scheduled element.

* * * * *